US012670388B2

(12) United States Patent
Readick et al.

(10) Patent No.: US 12,670,388 B2
(45) Date of Patent: Jun. 30, 2026

(54) AGRICULTURAL DATA INTEGRATION AND ANALYSIS PLATFORM

(71) Applicant: OPTI-HARVEST, INC., Los Angeles, CA (US)

(72) Inventors: Jodd Readick, New York, NY (US); Jonathan Destler, Los Angeles, CA (US); Nicholas Booth, Covina, CA (US); Yosepha Shahak Ravid, Visalia, CA (US); Nadav Ravid, Visalia, CA (US); Daniel L Farkas, Los Angeles, CA (US)

(73) Assignee: Opti-Harvest, Inc., Los Angeles, CA (US)

( * ) Notice: Subject to any disclaimer, the term of this patent is extended or adjusted under 35 U.S.C. 154(b) by 927 days.

(21) Appl. No.: 18/047,148

(22) Filed: Oct. 17, 2022

(65) Prior Publication Data

US 2023/0177330 A1 Jun. 8, 2023

Related U.S. Application Data

(63) Continuation of application No. PCT/US2021/028322, filed on Apr. 21, 2021.

(Continued)

(51) Int. Cl.
*G06N 3/08* (2023.01)
*A01G 7/02* (2006.01)
(Continued)

(52) U.S. Cl.
CPC .............. *G06N 3/08* (2013.01); *G06Q 10/04* (2013.01); *G06Q 50/02* (2013.01); *A01C 21/007* (2013.01);
(Continued)

(58) Field of Classification Search
CPC .......... G06N 3/08; G06N 3/044; G06N 3/045; G06N 3/0895; G06N 3/09; G06Q 10/04;
(Continued)

(56) References Cited

U.S. PATENT DOCUMENTS

| | | | |
|---|---|---|---|
| 2,009,867 A | 7/1935 | Ball | |
| 2,940,219 A | 6/1960 | Schiller | |

(Continued)

FOREIGN PATENT DOCUMENTS

| | | |
|---|---|---|
| CN | 1559175 A | 1/2005 |
| CN | 1582110 A | 2/2005 |

(Continued)

OTHER PUBLICATIONS

Ahmadi et al. The effect of greenhouse covering materials on phytochemical composition and antioxidant capacity of tomato cultivars. Journal of the Science of Food and Agriculture 98(12):4427-4435 (2018).

(Continued)

*Primary Examiner* — Manuel A Rivera Vargas
(74) *Attorney, Agent, or Firm* — Mintz, Levin, Cohn, Ferris, Glovsky and Popeo, P.C.

(57) ABSTRACT

Provided herein are methods, systems, and media that implement machine learning algorithms to determine a cultivar regimen recommendation for a crop based on crop yield and cultivar condition data.

3 Claims, 16 Drawing Sheets

Related U.S. Application Data

(60) Provisional application No. 63/016,816, filed on Apr. 28, 2020, provisional application No. 63/014,072, filed on Apr. 22, 2020.

(51) Int. Cl.

| | |
|---|---|
| *G06Q 10/04* | (2023.01) |
| *G06Q 50/02* | (2024.01) |
| *A01C 21/00* | (2006.01) |
| *A01G 7/04* | (2006.01) |
| *A01G 25/16* | (2006.01) |

(52) U.S. Cl.
CPC .............. *A01G 7/02* (2013.01); *A01G 7/045* (2013.01); *A01G 25/165* (2013.01); *A01G 25/167* (2013.01)

(58) Field of Classification Search
CPC ........ G06Q 50/02; A01C 21/007; A01G 7/02; A01G 7/045; A01G 25/165; A01G 25/167; A01G 7/00; A01B 79/005
See application file for complete search history.

(56) References Cited

U.S. PATENT DOCUMENTS

| | | | |
|---|---|---|---|
| 3,206,892 A | 9/1965 | Maria et al. | |
| 3,923,381 A | 12/1975 | Winston | |
| 3,931,695 A | 1/1976 | Widmayer | |
| 4,002,499 A | 1/1977 | Winston | |
| 4,003,638 A | 1/1977 | Winston | |
| 4,249,340 A | 2/1981 | Maes, Jr. et al. | |
| 4,653,223 A | 3/1987 | Mori | |
| 4,662,106 A | 5/1987 | Mori | |
| 4,901,514 A | 2/1990 | De Morais Zoio | |
| 4,969,288 A | 11/1990 | Mori | |
| 4,992,917 A | 2/1991 | Earnshaw | |
| 5,022,181 A | 6/1991 | Longstaff | |
| 5,063,709 A | 11/1991 | Whittaker | |
| 5,067,275 A | 11/1991 | Constance | |
| 5,412,905 A | 5/1995 | Allison | |
| 5,692,337 A | 12/1997 | Motz, Jr. | |
| 5,953,857 A | 9/1999 | Aiga et al. | |
| 6,037,535 A | 3/2000 | Yoshino | |
| 6,110,867 A | 8/2000 | Glenn et al. | |
| 6,263,613 B1 | 7/2001 | King et al. | |
| 6,357,172 B1 | 3/2002 | Risgaard et al. | |
| 6,701,665 B1 | 3/2004 | Ton et al. | |
| 8,171,668 B2 | 5/2012 | Lais et al. | |
| 8,307,580 B2 | 11/2012 | Lais et al. | |
| 8,458,954 B2 | 6/2013 | Yamada et al. | |
| 8,522,991 B2 | 9/2013 | Skelton et al. | |
| 9,310,540 B2 | 4/2016 | Boonekamp et al. | |
| D803,017 S | 11/2017 | Lais et al. | |
| 10,132,457 B2 | 11/2018 | Farkas et al. | |
| 10,255,670 B1 | 4/2019 | Wu et al. | |
| 10,699,185 B2 * | 6/2020 | Guan ..................... | G06Q 10/06 |
| 10,765,071 B2 | 9/2020 | Bottari | |
| 10,891,482 B2 * | 1/2021 | Gurzoni, Jr. .......... | G06V 20/64 |
| 10,955,098 B2 | 3/2021 | Farkas et al. | |
| 11,263,707 B2 * | 3/2022 | Perry ..................... | G06Q 50/02 |
| 2002/0056225 A1 | 5/2002 | Shahak et al. | |
| 2002/0170229 A1 | 11/2002 | Ton et al. | |
| 2003/0029079 A1 | 2/2003 | Kleinert | |
| 2004/0062023 A1 | 4/2004 | Elsegood | |
| 2004/0088916 A1 | 5/2004 | Ton et al. | |
| 2005/0172549 A1 | 8/2005 | Allen | |
| 2007/0151149 A1 | 7/2007 | Karpinski | |
| 2008/0298052 A1 | 12/2008 | Hurst et al. | |
| 2009/0021934 A1 | 1/2009 | Chu | |
| 2009/0148931 A1 | 6/2009 | Wilkerson et al. | |
| 2009/0272029 A1 | 11/2009 | Aiking et al. | |
| 2009/0300983 A1 | 12/2009 | Tilford et al. | |
| 2010/0139739 A1 | 6/2010 | Ashkin | |
| 2010/0299993 A1 | 12/2010 | Lais et al. | |

| | | | |
|---|---|---|---|
| 2011/0041397 A1 | 2/2011 | Kamahara | |
| 2011/0067692 A1 | 3/2011 | Dopp et al. | |
| 2011/0197317 A1 | 8/2011 | Wong | |
| 2011/0211250 A1 | 9/2011 | Laine et al. | |
| 2011/0226311 A1 | 9/2011 | Sun et al. | |
| 2011/0265378 A1 | 11/2011 | Callaway | |
| 2012/0198762 A1 | 8/2012 | Lee | |
| 2013/0219783 A1 | 8/2013 | Toye et al. | |
| 2013/0326941 A1 | 12/2013 | Pickett et al. | |
| 2015/0121753 A1 | 5/2015 | Jenner | |
| 2015/0173302 A1 | 6/2015 | Duncan et al. | |
| 2015/0223402 A1 | 8/2015 | Krijn et al. | |
| 2015/0223411 A1 | 8/2015 | Toye et al. | |
| 2015/0313091 A1 | 11/2015 | Ara et al. | |
| 2016/0000018 A1 | 1/2016 | Van Elmpt et al. | |
| 2016/0064204 A1 | 3/2016 | Greenberg et al. | |
| 2016/0157439 A1 | 6/2016 | Greene et al. | |
| 2016/0174474 A1 | 6/2016 | Toye et al. | |
| 2016/0302367 A1 | 10/2016 | Sokhi | |
| 2016/0309659 A1 | 10/2016 | Guy et al. | |
| 2016/0309660 A1 | 10/2016 | Duncan et al. | |
| 2016/0314542 A1 | 10/2016 | Vollmar et al. | |
| 2016/0316643 A1 | 11/2016 | Guy et al. | |
| 2016/0327228 A1 | 11/2016 | Farkas et al. | |
| 2016/0374275 A1 | 12/2016 | Galdi | |
| 2017/0188531 A1 | 7/2017 | Daniels | |
| 2017/0231151 A1 | 8/2017 | Cartwright | |
| 2017/0233690 A1 | 8/2017 | Pickett et al. | |
| 2017/0354097 A1 | 12/2017 | Hadley | |
| 2018/0014486 A1 | 1/2018 | Creechley et al. | |
| 2018/0332779 A1 | 11/2018 | Reach et al. | |
| 2019/0037779 A1 | 2/2019 | Chirco | |
| 2019/0050948 A1 * | 2/2019 | Perry ..................... | G06Q 50/02 |
| 2019/0137060 A1 | 5/2019 | Farkas et al. | |
| 2019/0228477 A1 * | 7/2019 | Carter ..................... | G01W 1/10 |
| 2020/0042890 A1 | 2/2020 | Merrill et al. | |
| 2020/0045895 A1 | 2/2020 | Shahak Ravid et al. | |
| 2020/0296906 A1 * | 9/2020 | Sun ..................... | G01N 33/246 |
| 2020/0344961 A1 | 11/2020 | Guy et al. | |
| 2021/0315168 A1 | 10/2021 | Readick et al. | |
| 2021/0388959 A1 | 12/2021 | Farkas et al. | |
| 2022/0067614 A1 * | 3/2022 | Guan .............. | G06Q 10/06315 |
| 2022/0124988 A1 | 4/2022 | Booth et al. | |

FOREIGN PATENT DOCUMENTS

| | | | |
|---|---|---|---|
| CN | 101027794 A | 8/2007 |
| CN | 101162384 A | 4/2008 |
| CN | 104520419 A | 4/2015 |
| CN | 204350751 U | 5/2015 |
| CN | 204616588 U | 9/2015 |
| CN | 105210704 A | 1/2016 |
| CN | 205357445 U | 7/2016 |
| CN | 205615105 U | 10/2016 |
| CN | 107371959 A | 11/2017 |
| CN | 107509596 A | 12/2017 |
| CN | 207135703 U | 3/2018 |
| EP | 0875724 A2 | 11/1998 |
| EP | 1370126 A2 | 12/2003 |
| EP | 1411757 A4 | 4/2008 |
| EP | 2278870 A1 | 2/2011 |
| EP | 2874488 A2 | 5/2015 |
| JP | S613104 A | 1/1986 |
| JP | H06205615 A | 7/1994 |
| JP | 2003304750 A | 10/2003 |
| TW | 200905120 A | 2/2009 |
| TW | 201131108 A | 9/2011 |
| WO | WO-9608960 A1 | 3/1996 |
| WO | WO-0058849 A1 | 10/2000 |
| WO | WO-0219800 A2 | 3/2002 |
| WO | WO-0235193 A2 | 5/2002 |
| WO | WO-02084248 A2 | 10/2002 |
| WO | WO-0235193 A3 | 10/2003 |
| WO | WO-2009141287 A1 | 11/2009 |
| WO | WO-2015092799 A1 | 6/2015 |
| WO | WO-2015092800 A1 | 6/2015 |
| WO | WO-2015103310 A1 | 7/2015 |
| WO | WO-2016093397 A1 | 6/2016 |
| WO | WO-2018222923 A1 | 12/2018 |

(56) References Cited

FOREIGN PATENT DOCUMENTS

| | | | |
|---|---|---|---|
| WO | WO-2019032648 A1 | 2/2019 | |
| WO | WO-2019125882 A1 | 6/2019 | |
| WO | 2020012259 A1 | 1/2020 | |
| WO | WO-2020086763 A1 | 4/2020 | |
| WO | WO-2021021916 A1 | 2/2021 | |
| WO | WO-2021216655 A1 | 10/2021 | |

OTHER PUBLICATIONS

Antignus. Chapter 1: Management of Air-Borne Viruses by "Optical Barriers" in Protected Agriculture and Open-Field Crops. Advances in Virus Research 90:1-33 (2014).

Antignus et al. Ultraviolet-absorbing barriers, an efficient integrated pest management tool to protect greenhouses from insects and virus diseases. In Insect Pest Management. pp. 319-335 (2004).

Bagdonavičienė et al. Cultivation of sweet pepper (*Capsicum annuum* L.) transplants under high pressure sodium lamps supplemented by light-emitting diodes of various wavelengths. Acta Sci. Pol. Hortorum Cultus 14:3-14 (2015).

Ballare: Illuminated behaviour: phytochrome as a key regulator of light foraging and plant anti-herbivore defence. Plant Cell Environ. 32(6):713-725 doi:10.1111/j.1365-3040.2009.01958.x (2009).

Baranov. Device for Restricting in one plane the Angular Aperture of a Pencil of Rays from a Light Source. (in Russian). Russian certificate of authorship 200530, published Oct. 31, 1967.

Baranov et al. Study of the illumination characteristics of hollow focons. Soviet Journal of Optical Technology 33:408-411 (1966).

Baranov. Geliotekhnika 2:11-14 [English transl.: Parabolotoroidal mirrors as elements of solar energy concentrators. Appl Sol Energy 2:9-12.] (1966).

Baranov. Properties of parabolic focons. Opt Mekh Prom 6:1-5 (1965).

Basile et al.: Regulation of the vegetative growth of kiwifruit vines by photo-selective anti-hail netting. Scientia Horticulturae 172:300-307 doi:10.1016/j.scienta.2014.04.011 (2014).

Bauerle et al. A fiberoptic-based system for integrating photosynthetically active radiation in plant canopies. HortScience 39(5):1027-1029 (2004).

Baylor et al. Light and photon capture in turtle receptors. J Physiol248:433-464 (1975).

Beggs et al. Photocontrol of flavonoid biosynthesis. In: Photomorphogenesis in Plants, pp. 733-751 (1994).

Ben-Yakir et al. Chapter12. Optical Manipulations: An advance Approach for Controlling Sucking Insect Pests. In: Advanced Technologies for Managing Insect, pp. 249-267 (2012).

Ben-Yakir et al. Colored shading nets impede insect invasion and decrease the incidences of insect transmitted viral diseases in vegetable crops. Entomol. Exp. et Appl. 144:249-257 (2012).

Ben-Yakir et al. Optical manipulation of insect pests for protecting agricultural crops. Acta Hort 956:609-616 (2012).

Ben-Yakir et al. Photoselective nets and screens can reduce insect pests and diseases in agricultural crops. Acta Hort 1015:95-102 (2014).

Ben-Yakir et al. The effects of UV radiation on arthropods: a review of recent publications (2010-2015). Acta Hortic. 1134: 335-342 (2016).

Bettiga: Comparison of bilateral cordon training methods on the development and productivity of Chardonnay and Pinot noir grapevines. In Proceeding of the 20th International Meeting of the Group of International Experts of Vitivinicultural Systems for CoOperation (GiESCO) 20:576-581 [English Abstract Only] (2017).

Bian et al. Effects of light quality on the accumulation of phytochemicals in vegetables produced in controlled environments: a review. Journal of the Science of Food and Agriculture 95(5):869-877 (2015).

Briggs et al. Photomorphogenesis—from One Photoreceptor to 14: 40 Years of Progress. Mot Plant 5(3):531-532 (2012).

Briggs et al. Photoreceptors in Plant photomorphogenesis to date. Five phytochromes, two cryptochromes, one phototropin, and one superchrome. Plant Physiol. 125:85-88 (2001).

Bryla et al. Root respiration in citrus acclimates to temperature and slows during drought. Plant, Cell and Environment 20:1411-1420 (1997).

Buthelezi et al. Spectral quality of photo-selective nets improves phytochemicals and aroma volatiles in coriander leaves (*Coriandrum sativum* L.) after postharvest storage. Journal of Photochemistry and Photobiology B: Biology 161:328-334 (2016).

Carvalho et al. Green light control of anthocyanin production in microgreens. Acta Hortic. 1134:13-18 (2016).

Carvalho et al. Light Quality Dependent Changes in Morphology, Antioxidant Capacity, and Volatile Production in Sweet Basil (*Ocimum basilicum*). Front. Plant Sci. 7:1-14 (2016).

Chen at el.: Light signal transduction in higher plants. Annu Rev Genet 38:87-117 doi:10.1146/annurev.genet.38.072902.092259 (2004).

Chen et al. Growth and nutritional properties of lettuce affected by mixed irradiation of white and supplemental light provided by light-emitting diode. Sci. Hortic. (Amsterdam). 200:111-118 (2016).

Comas et al. Canopy and environmental control of root dynamics in a long-term study of Concord grape. New Phytologist Trust 167(3):829-840 (2005).

Coombe. Visual behaviour of the greenhouse whitefly, Trialeurodes vaporariorum. Physiological Entomology 7:243-251 (1982).

Coombe. Wavelength specific behaviour of the whitefly *Trialewodes vaporariorum* (Homoptera: Aleyrodidae). J Compl Physiol 144:83-90 (1981).

Decoteau et al.: Mulch surface color affects yield of fresh-market tomatoes. J Am Soc Hortic Sci. 114(2):216-219 doi:10.21273/JASHS.114.2.216 (1989).

Demers et al. Effects of supplemental light duration on greenhouse tomato (*Lycopersicon esculentum* Mill.) plants and fruit yields. Sci. Hortic. (Amsterdam). 74:295-306 (1998).

Dokoozlian et al. Table grape canopy management and training systems. In: Report of Research for Fresh Table Grapes. Calif. Table Grape Comm., Fresno, CA. (10 pgs) (2001).

Dokoozlian et al. Vine training and trellising systems for table grapes. In: Report of Research for Fresh Table Grapes. Calif. Table Grape Comm., Fresno, CA. (9 pgs) (1993).

Dorais. The use of supplemental lighting for vegetable crop production: Light intensity, crop response, nutrition, crop management, cultural practices. Canadian Greenhouse Conference Oct. 9, 2003 (8 pgs) (2003).

Doring et al. Spectral sensitivity of the green photoreceptor of winged pea aphids. Physiological Entomoly 36(4):392-396 (2011).

Doring et al. Visual ecology of aphids-a critical review on the role of colours in host finding. Arthropod-Plant Interactions 1:3-16 (2007).

D'Souza et al. Application of Light-Emitting Diodes in Food Production, Postharvest Preservation, and Microbiological Food Safety. Compr. Rev. Food Sci. Food Saf. 14:719-740 (2015).

Dueck et al. Efficiency of light energy used by leaves situated in different levels of a sweet pepper canopy. Acta Hortic. 711:201-205 (2006).

Dueck et al. Influence of diffuse glass on the growth and production of tomato. Acta Hort 956:75-82 (2012).

Dufault et al. Enhancing the Productivity and Fruit Quality of Forced "Sweet Charlie" Strawberries Through Manipulation of Light Quality in High Tunnels. International Journal of Fruit Science 9(2):176-184 (2009).

Dzakovich et al. Tomatoes grown with light-emitting diodes or high-pressure sodium supplemental lights have similar fruit-quality attributes. HortScience 50:1498-1502 (2015).

Feuermann et al. High-Concentration Photovoltaic Designs Based on Miniature Parabolic Dishes. Solar Energy 90(5):423-430 (2001).

Fitter et al. Root production and turnover in an upland grassland subjected to artificial soil warming respond to radiation flux and nutrients, not temperature. Oecologia 120(4):575-581 (1999).

Folta et al. Green light: A signal to slow down or stop. J. Exp. Bot. 58(12):3099-3111 (2007).

Folta et al. Light as a Growth Regulator: Controlling Plant Biology with Narrow-bandwidth Solid-state Lighting Systems. Hortscience 43:1957-1964 (2008).

(56) References Cited

OTHER PUBLICATIONS

Freeman et al.: Influence of Windbreaks and Climatic Region on Diurnal Fluctuation of Leaf Water Potential, Stomatal Conductance, and Leaf Temperature of Grapevines. Am J Enol Vitic. 33:233-236 [English Abstract Only] (1982).

Glenn et al. Particle film: a new technology for agriculture. Hortic. Rev 31:1-43 (2005).

Glenn. Particle Film Mechanisms of Action That Reduce the Effect of Environmental Stress in 'Empire' Apple. J Amer Soc Hort Sci 134(3):314-321 (2009).

Gómez et al. Comparison of intracanopy light-emitting diode towers and overhead high-pressure sodium lamps for supplemental lighting of greenhouse-grown tomatoes. Horttechnology 23:93-98 (2013).

Gómez et al. In search of an optimized supplemental lighting spectrum for greenhouse tomato production with intracanopy lighting. Acta Hortic. 1134:57-62 (2016).

Gómez et al. Supplemental lighting for greenhouse-grown tomatoes: Intracanopy LED Towers vs. overhead HPS lamps. Acta Hortic. 1037:855-862 (2014).

Gómez et al. Testing of LEDs for Supplemental Lighting of Greenhouse-grown Tomatoes for a Northern Climate. PowerPoint. Purdue University (27 pgs) (Apr. 6, 2012).

Goldberg et al. Variations in the spectral distribution of daylight at various geographical locations on the earth's surface. Sol. Energy 19:3-13 (1977).

González-Real et al. Influence of fruit sink strength on the distribution of leaf photosynthetic traits in fruit-bearing shoots of pepper plants (*Capsicum annuum* L.). Environ. Exp. Bot. 66:195-202 (2009).

Gordon et al. Solar Surgery. J. Applied Physics 93(8):4843-4851 (2003).

Grechi et al.: Effect of light and nitrogen supply on internal C:N balance and control of root-to-shoot biomass allocation in grapevine. Environmental and Experimental Botany 59(2):139-149 (2007).

Gunnlaugsson et al. Interlight and plant density in year-round production of tomato at northern latitudes. Acta Hortic. 711:71-75 (2006).

Guo et al. Effect of LED interlighting combined with overhead HPS light on fruit yield and quality of year-round sweet pepper in commercial greenhouse. Acta Hortic. 1134:71-78 (2016).

Hao et al. LED inter-lighting in year-round greenhouse mini-cucumber production. Acta Hortic. 956:335-340 (2012).

Harper et al. Heat trap: An optimized far infrared field optics system. Appl. Opt. 15:53-60 (1976).

Hasan et al. An Overview of LEDs' Effects on the Production of Bioactive Compounds and Crop Quality. Molecules 22(9):1420 (2017).

Hawley et al. Improving Cannabis Bud Quality and Yield with Subcanopy Lighting. Hort Science 53(11):1593-1599 (2018).

Healey et al. Radiation use efficiency increases when the diffuse component of incident radiation is enhanced under shade. Australian Journal of Agricultural Research 49(4):665-672 (1998).

Hemming et al. Light diffusion improves growth. Flower Tech 10(6):24-25 (2007).

Hemming et al. The Effect of Diffuse Light on Crops. Acta Hort. 801:1293-1300 (2008).

Hemming. Use of Natural and Artificial Light in Horticulture—Interaction of Plant and Technology. Acta Hort 907:25-35 (2011).

Hemming. Use of natural and artificial light in horticulture—interaction of plant and technology, in: Proceedings of the VI International Symposium on Light in Horticulture. pp. 15-19 (2011).

Hendrickson et al.: Low temperature effects on grapevine photosynthesis: The role of inorganic phosphate. Functional Plant Biology 31(8):795-801 DOI:10.1071/FP04037 (2004).

Hernández et al. Tomato seedling growth and morphological responses to supplemental LED lighting red:Blue ratios under varied daily solar light integrals. Acta Hortic. 956:187-194(2012).

Hinterberger et al. Efficient light coupler for threshold Cerenkov counters. Rev Sci Instrum 37:1094-1095 (1966a).

Hinterberger et al. Gas Cerenkov counter with optimized light-collecting efficiency. Proc Int Conf Instrum High Energy Phys. pp. 205-206 (1966b).

Horváth et al. Polarization Pattern of Freshwater Habitats Recorded by Video Polarimetry in Red, Green and Blue Spectral Ranges and Its Relevance for Water Detection by Aquatic Insects. The Journal of Experimental Biology 200:1155-1163 (1997).

Hovi et al. Interlighting improves production of year-round cucumber. Sci. Hortic. (Amsterdam). 102:283-294 (2004).

Hovi-Pekkanen et al. Increasing productivity of sweet pepper with interlighting. Acta Hortic. 711:165-170 (2006).

Jacovides et al. Global photosynthetically active radiation and its relationship with global solar radiation in the Eastern Mediterranean basin. Theor. Appl. Climatol. 74:227-233 (2003).

Johkan et al. Effect of green light wavelength and intensity on photomorphogenesis and photosynthesis in Lactuca sativa. Environ. Exp. Bot. 75:128-133 (2012).

Jokinen et al. Improving sweet pepper productivity by led interlighting. Acta Hort 956:59-66 (2012).

Karpinski et al. Light perception in plant disease defense signaling. Current Opinion in Plant Biology 6:390-396 (2003).

Kasperbauer. Light and plant development. In: Plant-environment Interactions, pp. 83-123 (1994).

Kasperbauer: Strawberry yield over red versus black plastic mulch. Crop Sci 40(1):171-174 doi:10.2135/cropsci2000.401171x (2000).

Katterer et al. Fine-root dynamics, soil moisture and soil carbon content in a Eucalyptus globulus plantation under different irrigation and fertilisation regimes. Forest Ecology and Management 74(1-3):1-12 (1995).

Kim et al. Green-light supplementation for enhances lettuce growth under red- and blue-light-emitting diodes. HortScience 39:1617-1622 (2004).

Kirchner et al. Evidence for trichromacy in the green peach aphid, *Myzus persicae* (Sulz.) (Hemiptera: Aphididae). Journal of Insection Physiology 51(11):1255-1260 (2005).

Kong et al. Pearl netting affects postharvest fruit quality in 'Vergasa' sweet pepper via light environment manipulation. Scientia Hort 150:290-298 (2012).

Kong et al.: Response of photosynthetic parameters of sweet pepper leaves to light quality manipulation by photoselective shade nets. 7th International Symposium on Light in Horticultural Systems. Acta Hortic. 956:501-506 doi:10.17660/ActaHortic.2012.956.59 [English Abstract Only] (2012).

Korczynski et al. Mapping monthly distribution of daily light integrals across the contiguous United States. Horttechnology 12:12-16 (2002).

Kozai. Plant factory in Japan—Current situation and perspectives. Chronica Horticulturae 53(2):8-10 (2013).

Kriska et al. Why do red and dark-coloured cars lure aquatic insects? The attraction of water insects to car paintwork explained by reflection-polarization signals. Proc. Biol. Sci. 273(1594):1667-1671 (2006).

Landis et al. Light Emitting Diodes (LED)—Applications in Forest and Native Plant Nurseries. Forest Nursery Notes Summer 2013 (9 pgs).

Li et al. Effects of light-emitting diode supplementary lighting on the winter growth of greenhouse plants in the yangtze river delta of China. Bot. Stud. 57:2 (2016).

Li et al. Effects of supplemental light quality on growth and phytochemicals of baby leaf lettuce. Environ. Exp. Bot. 67:59-64 (2009).

Lichtenhaler et al.: Differences in pigment composition, photosynthetic rates and chlorophyll fluorescence images of sun and shade leaves of four tree species. Plant Physiol Biochem. 45(8):577-588 doi:10.1016/j.plaphy.2007.04.006 [English Abstract Only] (2007).

Lin. Plant blue-light receptors. Trends Plant Sci 5:337-342 (2000).

Lu et al. Effects of Supplemental Lighting with Light-Emitting Diodes (LEDs) on Tomato Yield and Quality of Single-Truss Tomato Plants Grown at High Planting Density. Environ. Control Biol. 50:63-74 (2012).

Marcelis et al. Flower and fruit abortion in sweet pepper in relation to source and sink strength. J. Exp. Bot. 55:2261-2268 (2004).

(56) References Cited

OTHER PUBLICATIONS

Martinez-Luscher et al.: Partial Solar Radiation Exclusion with Color Shade Nets Reduces the Degradation of Organic Acids and Flavonoids of Grape Berry (*Vitis vinifera* L.) J Agric Food Chem. 65(49):10693-10702 doi:10.1021/acs.jafc.7b04163 (2017).

Massa et al. Plant productivity in response to LED lighting. HortScience 43:1951-1956 (2008).

Mathejczyk et al. Sensing Polarized Light in Insects. Oxford Research Encyclopeida of Neuroscience (34 pgs) (2017).

Mellor et al. Spectral efficiency of the glasshouse whitefly *Trialeurodes vaporariorum* and *Encarsia formosa* its hymenopteran parasitoid. Entomol Exp Appl 83:11-20 (1997).

Mercado et al. Impact of changes in diffuse radiation on the global land carbon sink. Nature 458:1014-1017 (2009).

Mitchell. Academic Research Perspective of LEDs for the Horticulture Industry. HortScience 50:1293-1296 (2015).

Mitchell et al. Chapter 1: Light-Emitting Diodes in Horticulture. Hortic. Rev. (Am. Soc. Hortic. Sci). 43:1-88 (2015).

Mohr. Coaction between pigment systems. In: Photomorphogenesis in Plants, pp. 353-373 (1994).

Morrow. Led lighting in horticulture. HortScience 43:1947-1950 (2008).

Mortensen et al. Effects of selective screening of the daylight spectrum, and of twilight on plant growth in greenhouses. Acta Hort. 305:103-108 (1992).

Muneer et al. Influence of green, red and blue light emitting diodes on multiprotein complex proteins and photosynthetic activity under different light intensities in lettuce leaves (*Lactuca sativa* L.). Int. J. Mol. Sci. 15:4657-4670 (2014).

Nelson et al. Economic analysis of greenhouse lighting: Light emitting diodes vs. high intensity discharge fixtures. PLoS One 9(6):e99010 (2014).

Nissim-Levi et al. Light-scattering shade net increases branching and flowering in ornamental pot plants. J Hort Sci Biotech 83:9-14 (2008).

Olle et al. The effects of light-emitting diode lighting on greenhouse plant growth and quality. Agric. Food Sci. 22:223-234 (2013).

Opti-Harvest Inc., website: URL: https://opti-harvest.com/ [retrieved online Oct. 4, 2022].

Oren-Shamir et al. Coloured shade nets can improve the yield and quality of green decorative branches of Pittosporum variegatum. J Hort Sci Biotech 76:353-361 (2001).

Ouzounis et al. Spectral effects of artificial light on plant physiology and secondary metabolism. Hortscience 50:1128-1135 (2015).

Ovadia et al.: Coloured shade-nets influence stem length, time to flower, flower No. and inflorescence diameter in four ornamental cut-flower crops. J Hort Sci Biotech. 84(2):161-166 84(2):161-166 (2009).

PCT/US2014/072837 International Preliminary Report on Patentability dated Apr. 26, 2016.

PCT/US2014/072837 International Search Report and Written Opinion dated Apr. 20, 2015.

PCT/US2018/065343 International Search Report and Written Opinion dated Mar. 5, 2019.

PCT/US2019/057727 International Search Report and Written Opinion dated Jan. 16, 2020.

PCT/US2020/044046 International Search Report and Written Opinion dated Dec. 22, 2020.

PCT/US2021/028322 International Search Report and Written Opinion dated Sep. 9, 2021.

Peacock et al. Canopy management and trellising systems for Thompson Seedless table grapes. In: Report of Research for Fresh Table Grapes. Calif. Table Grape Comm., Fresno, CA. (4 pgs) (1996).

Peacock et al. Research Sheds Light on Bud Fruitfulness and Berry Set. In: UCCE Tulare County Grape Notes, vol. 2, Issue 2, W.L. Peacock, Ed. Tulare, CA. (2005).

Peacock et al. Response of Flame Seedless table grapes to leaf removal at various stages of fruit development. In: Proc. Table Grape Seminar, N.C. Dokoozlian, Ed. UC Coop. Ext., UC Kearney Research and Extension Center, Parlier, CA. (1994).

Peacock et al. Training-trellis systems and canopy management of table grapes in California. International Symposium on Table Grape Production. JoAnne M. Rantz, Ed. Am. Soc. Enol. Vitic. pp 191-194. (1994).

Peacock. Vine Physiology and Table Grape Production. In: Proceedings San Joaquin Valley Table Grape Seminar. Calif. Table Grape Comm., Fresno, CA. (7 pgs) (2006).

Pepin et al. Beneficial effects of using a 3-D Led interlighting system for organic greenhouse tomato grown in Canada under low natural light conditions, in: Acta Horticulturae. International Society for Horticultural Science (ISHS), Leuven, Belgium, pp. 239-246 (2014).

Ploke. Axially Symmetrical Light Guide Arrangement. German Patent Application #1472267 [English Abstract] (1969).

Ploke. Lichtfuhrungseinrichtungen mit starker Konzentrationswirkung [English Trans. Light guide means with a strong concentration effect]Optik 25:31-43 (1967) (English Abstract).

Poorter et al.: The role of biomass allocation in the growth response of plants to different levels of light, CO2, nutrients and water: A quantitative review. Functional Plant Biology 27(6):1-15 DOI:10.1071/PP99173_CO (2000).

Poorter: Light-dependent changes in biomass allocation and their importance for growth of rain forest tree species. Functional Ecology 15(1):113-123 (2001).

Pregitzer et al. Responses of tree fine roots to temperature. New Phytologist, 147(1):105-115 (2000).

Rabe. Citrus tree spacing and tree shape: Concept, effect on early production profile and fruit quality aspects—An overview. Int. Soc. Citriculture 1:297-301 (2004).

Rabl et al. Ideal concentrators for finite sources and restricted exit angles. Appl. Opt. 15:2880-2883 (1976).

Rajapakse et al. Chapter 12: Light quality manipulation by horticulture industry. In: Light and Plant Development, pp. 290-312 (2007).

Rajapakse et al. Influence of spectral filters on growth and postharvest quality of potted miniature roses. Scientia Hort 56:245-255 (1994).

Rajapakse et al. Plant height control by photoselective filters: current status and future prospects. Hortechnology 9:618-624 (1999).

Rajapakse et al. Spectral filters and growing season influence growth and carbohydrate status of Chrysanthemum. J Amer Soc Hort Sci 120:78-83 (1995).

Runkle et al. Specific functions of red, far-red, and blue light in flowering and stem extension of long-day plants. J Am Soc Hortic Sci 126:275-282 (2001).

Samuoliene et al. LED lighting and seasonality effects antioxidant properties of baby leaf lettuce. Food Chem. 134:1494-1499 (2012).

Senthilkumar et al. Design and Development of a Three Dimensional Compound Parabolic Concentrator and Study of Optical and Thermal Performance. Intl J Energy Sci 2(2):64-68 (2012).

Shahak et al. ColorNets: A new approach for light manipulation in fruit trees. Acta Hort. 636:609-616 (2004).

Shahak et al. ColorNets: crop protection and light-quality manipulation in one technology. Acta Hort. 659(1):143-151 (2004).

Shahak et al. Improving solar energy utilization, productivity and fruit quality in orchards and vineyards by photoselective netting. Acta Hort. 772:65-72 (2008).

Shahak et al. The wonders of yellow netting. Acta Hortic. 1134:327-334 (2016).

Shahak. Photoselective netting: an overview of the concept, R&D and practical implementation in agriculture. Acta Hort 1015:155-162 (2014).

Shahak. Photoselective netting for improved performance of horticultural crops. A review of ornamental and vegetable studies carried in Israel. Acta Hort 770:161-168 (2008).

Shashar et al. Migrating locusts can detect polarized reflections to avoid flying over the sea. Biology Letters 1:472-475 (2015).

Shifriss et al. Variation in flower abscission of peppers under stress shading conditions. Euphytica 78:133-136 (1994).

Sinclair et al. Variation in Crop Radiation-Use Efficiency with Increased Diffuse Radiation. Crop Sci. 32:1281-1284 (1992).

(56)          References Cited

OTHER PUBLICATIONS

Singh et al. LEDs for energy efficient greenhouse lighting. Renew. Sustain. Energy Rev. 49:139-147 (2015).

Smith et al. Don't ignore the green light: exploring diverse roles in plant processes. J. Exp. Bot. 68:2099-2110 (2017).

Snowden et al. Sensitivity of seven diverse species to blue and green light: Interactions with photon flux. PLoS One 11:1-32 (2016).

Song et al. Polychromatic Supplemental Lighting from underneath Canopy is More Effective to Enhance Tomato Plant Development by Improving Leaf Photosynthesis and Stomatal Regulation. Front. Plant Sci. 7:1832 (2016).

Spalding et al. Illuminating topics in plant photobiology. Plant Cell Environ 28:39-53 (2005).

Straw et al. Influence of Sticky Trap Color and Height Above Ground on Capture of Alate Elatobium abietinum (Hemiptera: Aphididae) in Sitka Spruce Plantations. Environmental Entomology 40(1):120-125 (2011).

Tatineni et al. Effectiveness of plant growth regulators under photoselective greenhouse covers. J Amer Soc Hort Sci 125:673-778 (2000).

Tewolde et al. Nighttime Supplemental LED Inter-lighting Improves Growth and Yield of Single-Truss Tomatoes by Enhancing Photosynthesis in Both Winter and Summer. Front. Plant Sci. 7:448 (2016).

The Secret Gift of Polarized Vision. Insect P-Ray Vision. The Secret in the Eye. Available at https://www.polarization.com/eyes/eyes.html (Downloaded Sep. 30, 2019) (6 pgs).

Thimijan et al. Photometric, radiometric, and quantum light units of measure: a review of procedures for interconversion. HortScience 18:818-822 (1983).

Thomas. Specific effects of blue light on plant growth and development. (Literature review). In: Plants and the daylight spectrum, pp. 443-459 (1981).

Thompson et al. Patterns of gas exchange, photosynthate allocation, and root growth during a root growth capacity test. Canadian Journal of Forest Research 22(2):248-254 (1992).

Tierney et al. Environmental control of fine root dynamics in a northern hardwood forest. Global Change Biology 9(5):670-679 (2003).

Trouwborst et al. The responses of light interception, photosynthesis and fruit yield of cucumber to LED-lighting within the canopy. Physiol. Plant. 138:289-300 (2010).

Turner et al. Dry Matter Assimilation and Partitioning in Pepper Cultivars Differing in Susceptibility to Stress-induced Bud and Flower Abscission. Ann. Bot. 73(6):617-622 (1994).

U.S. Appl. No. 16/526,790 Final Office Action dated Jun. 13, 2022.

U.S. Appl. No. 16/526,790 Non-Final Office Action dated Dec. 10, 2021.

U.S. Appl. No. 17/152,972 Non-Final Office Action dated Oct. 6, 2022.

U.S. Appl. No. 15/109,218 Office Action dated Mar. 27, 2018.

U.S. Appl. No. 16/116,435 Office Action dated Feb. 18, 2020.

U.S. Appl. No. 16/116,435 Office Action dated Jul. 22, 2020.

U.S. Appl. No. 16/116,435 Office Action dated Jun. 19, 2019.

U.S. Appl. No. 16/526,790 Office Action dated Dec. 22, 2020.

U.S. Appl. No. 16/526,790 Office Action dated Jun. 16, 2021.

Vaishampayan et al. Spectral Specific Responses In the Visual Behavior of the Greenhouse Whitefly, Trialeurodes vaporariorum (Homoptera: Aleyrodidae). Entomologia Experimentalis et Applicata 18(3):344-356 (1975).

Vaishampayan et al. Visual And Olfactory Responses in Orientation to Plants by the Greenhouse Whitefly, Trialeurodes vaporariorum (Homoptera: Aleyrodidae). Entomologia Experimentalis et Applicata 18(4):412-422 (1975).

Van Haeringen. The development of solid spectral filters for the regulation of plant growth. Photochem. Photobiol. 67:407-413 (1998).

Vernon et al. Spectral Responsiveness of Frankliniella occidentalis (Thysanoptera: Thripidae) Determined by Trap Catches in Greenhouses. Environmental Entomology 19(5):1229-1241 (1990).

Wang et al.: Contributions of green light to plant growth and development. Am J Bot. 100(1):70-78 doi:10.3732/ajb.1200354 (2013).

Warrington et al. The influence of blue- and red-biased light spectra on the growth and development of plants. Agric. Meteorol. 16: 247-262 (1976).

Wehner. Polarized-light navigation by insects. Scientific American 23(1):106-115 (1976).

Williamson. Cone channel condenser optics. J Opt Soc Am 42:712-715 (1952).

Winston et al. Principles of cylindrical concentrators for solar energy. Sol. Energy 17:255-258 (1975).

Winston. Light collection within the framework of geometrical optics. J. Opt. Soc. Am. 60:245-247 (1970).

Winston. Principles of solar concentrators of a novel design. Sol. Energy 16:89-95 (1974).

Witte. Cone channel optics. Infrared Phys. 5:179-185 (1965).

Wubs et al. Abortion of reproductive organs in sweet pepper ( Capsicum annuum L.): a review. J. Hortic. Sci. Biotechnol. 84:467-475 (2009).

Yaku et al. Thrips see red—flower colour and the host relationships of a polyphagous anthophilic thrips. Ecological Entomology 32(5):527-535 (2007).

Zhou et al. Effects of photoselective netting on root growth and development of young grafted orange trees under semi-arid climate. Scientia Horticulturae 238:272-280 (2018).

Zhu et al. From lab to field, new approaches to phenotyping root system architecture. Current Opinion in Plant Biology 14:(3):310-317 (2011).

European Search Report issued in European Application No. 21793388.6, mailed on Dec. 22, 2023, 9 pages.

* cited by examiner

Machine Vision (1301)
Optical (1302)
Ambient Light (1303)

Position (1304)
Presence (1305)
Proximity (1306)

Motion (1307)
Velocity (1308)
Displacement (1309)

Temperature (1310)

Humidity (1311)
Moisture (1312)

Acoustic (1313)
Sound (1314)
Vibration (1315)

Chemical (1316)
Gas (1317)

Flow (1318)

Force (1319)
Load (1320)
Torque (1321)
Strain (1322)
Pressure (1323)

Leak (1324)
Level (1325)

Electric (1326)
Magnetic (1327)

Acceleration (1328)
Tilt (1329)

AGRICULTURAL DATA INTEGRATION AND ANALYSIS PLATFORM

CROSS-REFERENCE

This application is a continuation of International Application No. PCT/US2021/028322, filed Apr. 21, 2021, which claims the benefit of U.S. Provisional Application No. 63/014,072, filed Apr. 22, 2020 and U.S. Provisional Application No. 63/016,816, filed Apr. 28, 2020, each of which are hereby incorporated by reference in their entirety herein for all purposes.

BACKGROUND

As communication and data storage techniques have improved, sensor data has become more and more available towards optimizing agricultural yields.

SUMMARY

A method of cultivating a crop, the method comprising: deploying a plurality of sensors to measure a current cultivar condition of the crop; receiving a historical cultivar regimen associated with a historical crop yield; applying an algorithm to determine a cultivar regimen recommendation based on the current cultivar condition, the current cultivar regimen, and the historical cultivar regimen; and altering a cultivar condition of the crop by performing the cultivar regimen recommendation.

In some embodiments, the plurality of sensors comprises at least about 25 sensors. In some embodiments, the current cultivar condition, the historical cultivar condition, or both comprises a wind speed, a wind direction, a gust speed, a gust direction, a rainfall quantity, a soil moisture, a light measurement, a humidity, a crop dimension, a soil pH, a gamma-ray measurement, a picture, an audio track, a video, aerial imagery, satellite imagery, a chemical composition, an atmospheric pressure, an $O_2$ quantity, a $N_2$ quantity, a $CO_2$ quantity, a sporadic light measurement, a fruit growth measurement, a reflectance, an infrared measurement, a mid-infrared measurement, near-infrared measurement, a fruit density, a GPS position, a temperature, or any combination thereof. In some embodiments, at least one of the plurality of the sensors comprises at least one of a wind gauge, a rain gauge, a soil moisture gauge, a light gauge, a humidity gauge, a stem water potential dendrometer, a dendrometer, a GPS sensor, a pH meter, a gamma-ray sensor, a camera, a microphone, a video camera, a hyperspectral camera, a chemical sensor, an aerial camera, a satellite imaging device, an atmospheric pressure sensor, an $O_2$ sensor, a $N_2$ sensor, a $CO_2$ sensor, a sporadic light sensor, a fruit growth sensor, a reflectance sensor, an infrared sensor, an irrigation sensor, a mid-infrared sensor, near-infrared sensor, a fruit density sensor, or a thermometer. In some embodiments, at least one of the plurality of the sensors is an internet of things sensor. In some embodiments, at least one of the plurality of the sensors is coupled to the crop, a soil surrounding the crop, a remotely operated vehicle (ROV), an aerial drone, a balloon, or any combination thereof. In some embodiments, the method further comprises displaying the cultivar condition on a dashboard. In some embodiments, emitting an alarm if the current cultivar conditions is outside a predetermined range. In some embodiments, the current cultivar condition is received in real-time or near real-time. In some embodiments, the current cultivar condition is received periodically. In some embodiments, the period is at most about 1 minute, 5 minutes, 10 minutes, 15 minutes, 30 minutes, 1 hour, 2 hours, 6 hours, 12 hours, 1 day, 2 days, 3 days, or 1 week. In some embodiments, the current cultivar condition, the historical cultivar condition, or both comprises a condition of a single plant. In some embodiments, the current cultivar condition, the historical cultivar condition, or both comprises a condition of a single plant and a GPS location of the single plant. In some embodiments, the GPS location has a resolution of about 0.15 meters to about 5 meters. In some embodiments, the current cultivar condition, the historical cultivar condition, or both comprises a condition of a plurality of plants. In some embodiments, the current cultivar condition, the historical cultivar condition, or both comprises a condition of a field of plants. In some embodiments, the cultivar regimen recommendation, the historical cultivar regimen, or both comprises a fertilizer quantity adjustment, a fertilizer type adjustment, a pruning quantity adjustment, a pruning location adjustment, a pesticide quantity adjustment, a pesticide type adjustment, a planting date adjustment, a harvesting date adjustment, an irrigation quantity adjustment, an irrigation time of day adjustment, an irrigation schedule adjustment, a crop type adjustment, or any combination thereof. In some embodiments, the cultivar regimen recommendation comprises a reflection adjustment recommendation comprising a modification of a reflective property of a reflective surface configured to reflect light to a plant. In some embodiments, the reflective property comprises at least one of a light direction, a light wavelength range, a light intensity, or a light concentration. In some embodiments, the light comprises at least one of a modifiable light, sunlight, UV light, IR light, an electric light, or an LED light. In some embodiments, the cultivar regimen recommendation, the historical cultivar regimen, or both comprises an adjustment of the cultivar of a single plant. In some embodiments, the cultivar regimen recommendation, the historical cultivar regimen, or both comprises an adjustment of the cultivar of a plurality of plants. In some embodiments, the cultivar regimen recommendation, the historical cultivar regimen, or both comprises an adjustment of the cultivar of a field of plants. In some embodiments, the verified crop yield, the historical crop yield, or both comprises a crop yield quantity, a crop yield quality, or both. In some embodiments, the crop yield quality comprises a growth speed, a plant size, a leaf diameter, a plant height, a plant mass, a leaf color, a leaf shape, a plant stem water potential, a plant color, a plant shape, a plant condition, a fruit size, a fruit color, a fruit ripeness, a fruit acidity, a fruit antioxidant content, a fruit sugar content, a fruit density, a GPS position, a foliage density, a stem elongation rate, a reflectance spectra, a fruit density, a GPS position, an acid content, a dry matter content, a root growth rate, a root biomass, a root water content, a root depth, a root volume, a root size, a root density, a foliage reflectance spectra, a normalized difference vegetation index, an interior fruit temperature, an exterior fruit temperature, a red reflectance, an infrared reflectance, mid-infrared reflectance, a near-infrared reflectance, or any combination thereof. In some embodiments, the crop yield quality comprises a fruit yield. In some embodiments, the method further comprises calculating an amount of $CO_2$ sequestration based on one or both of the verified crop yield and the plurality of cultivar conditions. In some embodiments, the method further comprises providing the calculated amount of $CO_2$ sequestration to the first machine learning algorithm to adjust the cultivar regimen recommendation to optimize an amount of $CO_2$ sequestration. In some embodiments, the calculated amount of $CO_2$ is based on 1) cultivar conditions such as sensor data and/or 2) verified crop yield such as plant size, a leaf diameter, a plant height, a plant mass, a leaf shape, a plant shape, a plant condition, a fruit size, a fruit ripeness, a fruit density, a foliage density, a stem elongation rate, a reflectance spectra, a fruit density, a dry matter content, a root growth rate, a root biomass, a root water content, a root depth, a root volume, a root size, a root density, a foliage reflectance spectra, a normalized difference vegetation index, or a combination thereof.

Another aspect provided herein is a computer-implemented method of determining a cultivar regimen recommendation for a crop, the method comprising: receiving a plurality of current cultivar conditions; applying a first machine learning algorithm to at least a portion of the current cultivar conditions to determine the cultivar regimen recommendation; receiving a verified crop yield after the cultivar regimen recommendation has been performed on the crop; feeding back the verified crop yield to improve the first machine learning algorithm's calculation over time; and transmitting the cultivar regimen recommendation.

In some embodiments, the first machine learning algorithm is trained by: collecting from a database a plurality of historical growing conditions, wherein each historical growing condition comprises a historical cultivar condition and a historical cultivar regimen, and wherein the historical growing condition is associated with a historical crop yield; creating a first training set comprising: a first plurality the collected historical growing conditions wherein each historical growing condition is associated with the historical crop yield; and a second plurality the collected historical growing conditions wherein each historical growing condition is disassociated from the historical crop yield; training the first machine learning algorithm in a first stage using the first training set to determine a predicted crop yield; creating a second training set for a second stage of training comprising the first training set and one or more of the second plurality of the collected historical growing conditions wherein a difference between the determined crop yield and the predicted crop yield is greater than a set amount; and training the first machine learning algorithm in a second stage using the second training set. In some embodiments, the first machine learning algorithm is trained by: creating an initial cultivar model by assigning a probability weight to each of two or more predictor variables, the two or more predictor variable comprising: a historical cultivar condition; and a historical cultivar regimen; using the initial cultivar model to determine a predicted historical crop yield; receiving a historical crop yield; and adjusting the probability weights based on the verified historical crop yield and the predicted historical crop yield. In some embodiments, the first machine learning algorithm comprises a neural network. In some embodiments, the method further comprises receiving a plurality of historical cultivar regimens, wherein each historical cultivar regimen comprises a plurality of historical regimen categories, wherein each historical regimen category comprises a plurality of cultivar instructions, and wherein each cultivar instruction is associated with a crop and a historical categorical crop yield; applying a second machine learning algorithm to each cultivar instruction in one historical regimen category to determine an agricultural relationship between one or more of the cultivar instructions, the crop, and the associated historical categorical crop yield; receiving a verified categorical crop yield after the cultivar instructions have been performed on the crop; and appending the verified categorical crop yield to the historical categorical crop yield and appending the associated cultivar instructions to the historical regimen category to improve the second machine learning algorithm's calculation over time; wherein the second machine learning algorithm determines the cultivar regimen recommendation based on the agricultural relationship. In some embodiments, the second machine learning algorithm comprises a neural network. In some embodiments, the second machine learning algorithm is trained by: creating an initial categorical model by assigning a probability weight to each of the plurality of cultivar instructions; using the initial categorical model to determine a predicted categorical crop yield; receiving a verified categorical crop yield; and adjusting the probability weights based on the verified categorical crop yield and the predicted categorical crop yield. In some embodiments, the current cultivar condition, the historical cultivar condition, or both comprises a wind speed, a wind direction, a gust speed, a gust direction, a rainfall quantity, a soil moisture, a light measurement, a humidity, a crop dimension, a soil pH, a gamma-ray measurement, a picture, an audio track, a video, aerial imagery, satellite imagery, a chemical composition, an atmospheric pressure, an $O_2$ quantity, a $N_2$ quantity, a $CO_2$ quantity, a sporadic light measurement, a fruit growth measurement, a reflectance, an infrared measurement, a mid-infrared measurement, near-infrared measurement, a fruit density, a GPS position, a temperature, or any combination thereof. In some embodiments, the current cultivar condition is received from a sensor, a weather information service, or both. In some embodiments, the sensor comprises at least one of a wind gauge, a rain gauge, a soil moisture gauge, a light gauge, a humidity gauge, a stem water potential dendrometer, a dendrometer, a GPS sensor, a pH meter, a gamma-ray sensor, a camera, a microphone, a video camera, a hyperspectral camera, an aerial camera, a satellite imaging device, a chemical sensor, an atmospheric pressure sensor, an $O_2$ sensor, a $N_2$ sensor, a $CO_2$ sensor, a sporadic light sensor, a fruit growth sensor, a reflectance sensor, an infrared sensor, an irrigation sensor, a mid-infrared sensor, near-infrared sensor, a fruit density sensor, or a thermometer. In some embodiments, the sensor is an internet of things sensor. In some embodiments, the sensor is coupled to the crop, a soil surrounding the crop, a remotely operated vehicle (ROV), an aerial drone, a balloon, or any combination thereof. In some embodiments, the method further comprises displaying the cultivar condition on a dashboard In some embodiments, the method further comprises emitting an alarm if one or more of the plurality of current cultivar conditions is outside a predetermined range. In some embodiments, the current cultivar condition is received from a remote monitoring source. In some embodiments, the remote monitoring source is a weather monitoring source, and wherein the current cultivar condition is a temperature, a humidity, a wind speed, a wind direction, a rain quantity, a snow quantity, a hail quantity, or any combination thereof. In some embodiments, the current cultivar condition is received in real-time or near real-time. In some embodiments, the current cultivar condition is received periodically. In some embodiments, the period is about 1 minute, 5 minutes, 10 minutes, 15 minutes, 30 minutes, 1 hour, 2 hours, 6 hours, 12 hours, 1 day, 2 days, 3 days, or 1 week, including increments therein. In some embodiments, the period is at least about 1 minute, 5 minutes, 10 minutes, 15 minutes, 30 minutes, 1 hour, 2 hours, 6 hours, 12 hours, 1 day, 2 days, 3 days, or 1 week, including increments therein. In some embodiments, the period is at most about 1 minute, 5 minutes, 10 minutes, 15 minutes, 30 minutes, 1 hour, 2 hours, 6 hours, 12, hours, 1 day, 2 days, 3 days, or 1 week, including increments therein.

In some embodiments, the current cultivar condition, the historical cultivar condition, or both comprises a condition of a single plant. In some embodiments, the current cultivar condition, the historical cultivar condition, or both comprises a condition of a single plant and a GPS location of the single plant. In some embodiments, the GPS location has a resolution of about 0.15 meters to about 5 meters. In some embodiments, the current cultivar condition, the historical cultivar condition, or both comprises a condition of a plurality of plants. In some embodiments, the current cultivar condition, the historical cultivar condition, or both comprises a condition of a field of plants. In some embodiments, the cultivar regimen recommendation, the historical cultivar regimen, or both comprises a fertilizer quantity adjustment, a fertilizer type adjustment, a pruning quantity adjustment, a pruning location adjustment, a pesticide quantity adjustment, a pesticide type adjustment, a planting date adjustment, a harvesting date adjustment, an irrigation quantity adjustment, an irrigation time of day adjustment, an irrigation schedule adjustment, a crop type adjustment, or any combination thereof. In some embodiments, the cultivar regimen recommendation comprises a reflection adjustment recommendation comprising a modification of a reflective property of a reflective surface configured to reflect light to a plant. In some embodiments, the reflective property comprises at least one of a light direction, a light wavelength range, a light intensity, or a light concentration. In some embodiments, the light comprises at least one of a modifiable light, sunlight, UV light, IR light, an electric light, or an LED light. In some embodiments, the cultivar regimen recommendation, the historical cultivar regimen, or both comprises an adjustment of the cultivar of a single plant. In some embodiments, the cultivar regimen recommendation, the historical cultivar regimen, or both comprises an adjustment of the cultivar of a plurality of plants. In some embodiments, the cultivar regimen recommendation, the historical cultivar regimen, or both comprises an adjustment of the cultivar of a field of plants. In some embodiments, the verified crop yield, the historical crop yield, or both comprises a crop yield quantity, a crop yield quality, or both. In some embodiments, the crop yield quality comprises a growth speed, a plant size, a leaf diameter, a plant height, a plant mass, a leaf color, a leaf shape, a plant stem water potential, a plant color, a plant shape, a plant condition, a fruit size, a fruit color, a fruit ripeness, a fruit acidity, a fruit antioxidant content, a fruit sugar content, a fruit density, a GPS position, a foliage density, a stem elongation rate, a reflectance spectra, a fruit density, a GPS position, an acid content, a dry matter content, a root growth rate, a root biomass, a root water content, a root depth, a root volume, a root size, a root density, a foliage reflectance spectra, a normalized difference vegetation index, an interior fruit temperature, an exterior fruit temperature, a red reflectance, an infrared reflectance, mid-infrared reflectance, a near-infrared reflectance, or any combination thereof. In some embodiments, the crop yield quality comprises a fruit yield. In some embodiments, transmitting the cultivar regimen recommendation comprises transmitting the cultivar regimen recommendation to a user via a graphical user interface (GUI). In some embodiments, the method further comprises calculating an amount of $CO_2$ sequestration based on one or both of the verified crop yield and the plurality of cultivar conditions. In some embodiments, the method further comprises providing the calculated amount of $CO_2$ sequestration to the first machine learning algorithm to adjust the cultivar regimen recommendation to optimize an amount of $CO_2$ sequestration. In some embodiments, the calculated amount of $CO_2$ is based on 1) cultivar conditions such as sensor data and/or 2) verified crop yield such as plant size, a leaf diameter, a plant height, a plant mass, a leaf shape, a plant shape, a plant condition, a fruit size, a fruit ripeness, a fruit density, a foliage density, a stem elongation rate, a reflectance spectra, a fruit density, a dry matter content, a root growth rate, a root biomass, a root water content, a root depth, a root volume, a root size, a root density, a foliage reflectance spectra, a normalized difference vegetation index, or a combination thereof.

Another aspect provided herein is a computer-implemented system comprising: a digital processing device comprising: at least one processor, an operating system configured to perform executable instructions, a memory, and a computer program including instructions executable by the digital processing device to create an application to determine a cultivar regimen recommendation for a crop, the application configured to perform at least the following: receiving a plurality current cultivar conditions; applying a first machine learning algorithm to at least a portion of the current cultivar conditions to determine the cultivar regimen recommendation; receiving a verified crop yield after the cultivar regimen recommendation has been performed on the crop; feeding back the verified crop yield to improve the first machine learning algorithm's calculation over time; and transmitting the cultivar regimen recommendation.

In some embodiments, the first machine learning algorithm is trained by: collecting from a database a plurality of historical growing conditions, wherein each historical growing condition comprises a historical cultivar condition and a historical cultivar regimen, and wherein the historical growing condition is associated with a historical crop yield; creating a first training set comprising: a first plurality the collected historical growing conditions wherein each historical growing condition is associated with the historical crop yield; and a second plurality the collected historical growing conditions wherein each historical growing condition is disassociated from the historical crop yield; training the first machine learning algorithm in a first stage using the first training set to determine a predicted crop yield; creating a second training set for a second stage of training comprising the first training set and one or more of the second plurality of the collected historical growing conditions wherein a difference between the determined crop yield and the predicted crop yield is greater than a set amount; and training the first machine learning algorithm in a second stage using the second training set. In some embodiments, the first machine learning algorithm is trained by: a first training module creating an initial cultivar model by assigning a probability weight to each of two or more predictor variables, the two or more predictor variable comprising: a historical cultivar condition; and a historical cultivar regimen; a second training module using the initial cultivar model to determine a predicted historical crop yield; a third training module receiving a historical crop yield; and a fourth training module adjusting the probability weights based on the verified historical crop yield and the predicted historical crop yield. In some embodiments, the first machine learning algorithm comprises a neural network. In some embodiments, the application is further configured to perform: receiving a plurality of historical cultivar regimens, wherein each historical cultivar regimen comprises a plurality of historical regimen categories, wherein each historical regimen category comprises a plurality of cultivar instructions, and wherein each cultivar instruction is associated with a crop and a historical categorical crop yield; applying a second machine learning algorithm to each cultivar instruction in one historical regimen category to determine an agricultural relationship between one or more of the cultivar instructions, the crop, and the associated historical categorical crop yield; receiving a verified categorical crop yield after the cultivar instructions have been performed on the crop; and appending the verified categorical crop yield to the historical categorical crop yield and appending the associated cultivar instructions to the historical regimen category to improve the second machine learning algorithm's calculation over time; wherein the second machine learning algorithm determines the cultivar regimen recommendation based on the agricultural relationship. In some embodiments, the second machine learning algorithm comprises a neural network. In some embodiments, the second machine learning algorithm is trained by: creating an initial categorical model by assigning a probability weight to each of the plurality of cultivar instructions; using the initial categorical model to determine a predicted categorical crop yield; receiving a verified categorical crop yield; and adjusting the probability weights based on the verified categorical crop yield and the predicted categorical crop yield. In some embodiments, the current cultivar condition, the historical cultivar condition, or both comprises a wind speed, a wind direction, a gust speed, a gust direction, a rainfall quantity, a soil moisture, a light measurement, a humidity, a crop dimension, a soil pH, a gamma-ray measurement, a picture, an audio track, a video, aerial imagery, satellite imagery, a chemical composition, an atmospheric pressure, an O2 quantity, a N2 quantity, a CO2 quantity, a sporadic light measurement, a fruit growth measurement, a reflectance, an infrared measurement, a mid-infrared measurement, near-infrared measurement, a fruit density, a GPS position, a temperature, or any combination thereof. In some embodiments, the current cultivar condition is received from a sensor, a weather information service, or both. In some embodiments, the sensor comprises at least one of a wind gauge, a rain gauge, a soil moisture gauge, a light gauge, a humidity gauge, a stem water potential dendrometer, a dendrometer, a GPS sensor, a pH meter, a gamma-ray sensor, a camera, a microphone, a video camera, a hyperspectral camera, an aerial camera, a satellite imaging device, a chemical sensor, an atmospheric pressure sensor, an O2 sensor, a N2 sensor, a CO2 sensor, a sporadic light sensor, a fruit growth sensor, a reflectance sensor, an infrared sensor, an irrigation sensor, a mid-infrared sensor, near-infrared sensor, a fruit density sensor, or a thermometer. In some embodiments, the sensor is an internet of things sensor. In some embodiments, the sensor is coupled to the crop, a soil surrounding the crop, a remote operated vehicle (ROV), an aerial drone, a balloon, or any combination thereof. In some embodiments, the application is further configured to output the cultivar condition for display on a dashboard, data analysis, or both. In some embodiments, the application is further configured to emit an alarm if one or more of the plurality of current cultivar conditions is outside a predetermined range. In some embodiments, the current cultivar condition is received from a remote monitoring source. In some embodiments, the remote monitoring source is a weather monitoring source, and wherein the current cultivar condition is a temperature, a humidity, a wind speed, a wind direction, a rain quantity, a snow quantity, a hail quantity, or any combination thereof. In some embodiments, the current cultivar condition is received in real-time or near real-time. In some embodiments, the current cultivar condition is received periodically. In some embodiments, the period is about 1 minute, 5 minutes, 10 minutes, 15 minutes, 30 minutes, 1 hour, 2 hours, 6 hours, 12 hours, 1 day, 2 days, 3 days, or 1 week, including increments therein. In some embodiments, the period is at least about 1 minute, 5 minutes, 10 minutes, 15 minutes, 30 minutes, 1 hour, 2 hours, 6 hours, 12 hours, 1 day, 2 days, 3 days, or 1 week, including increments therein. In some embodiments, the period is at most about 1 minute, 5 minutes, 10 minutes, 15 minutes, 30 minutes, 1 hour, 2 hours, 6 hours, 12, hours, 1 day, 2 days, 3 days, or 1 week, including increments therein. In some embodiments, the current cultivar condition, the historical cultivar condition, or both comprises a condition of a single plant. In some embodiments, the current cultivar condition, the historical cultivar condition, or both comprises a condition of a single plant and a GPS location of the single plant. In some embodiments, the GPS location has a resolution of about 0.15 meters to about 5 meters. In some embodiments, the current cultivar condition, the historical cultivar condition, or both comprises a condition of a plurality of plants. In some embodiments, the current cultivar condition, the historical cultivar condition, or both comprises a condition of a field of plants. In some embodiments, the cultivar regimen recommendation, the historical cultivar regimen, or both comprises a fertilizer quantity adjustment, a fertilizer type adjustment, a pruning quantity adjustment, a pruning location adjustment, a pesticide quantity adjustment, a pesticide type adjustment, a planting date adjustment, a harvesting date adjustment, an irrigation quantity adjustment, an irrigation time of day adjustment, an irrigation schedule adjustment, a crop type adjustment, or any combination thereof. In some embodiments, the cultivar regimen recommendation comprises a reflection adjustment recommendation comprising a modification of a reflective property of a reflective surface configured to reflect light to a plant. In some embodiments, the reflective property comprises at least one of a light direction, a light wavelength range, a light intensity, or a light concentration. In some embodiments, the light comprises at least one of a modifiable light, sunlight, UV light, IR light, an electric light, or an LED light. In some embodiments, the cultivar regimen recommendation, the historical cultivar regimen, or both comprises an adjustment of the cultivar of a single plant. In some embodiments, the cultivar regimen recommendation, the historical cultivar regimen, or both comprises an adjustment of the cultivar of a plurality of plants. In some embodiments, the cultivar regimen recommendation, the historical cultivar regimen, or both comprises an adjustment of the cultivar of a field of plants. In some embodiments, the verified crop yield, the historical crop yield, or both comprises a crop yield quantity, a crop yield quality, or any combination thereof. In some embodiments, the crop yield quality comprises a growth speed, a plant size, a leaf diameter, a plant height, a plant mass, a leaf color, a leaf shape, a plant stem water potential, a plant color, a plant shape, a plant condition, a fruit size, a fruit color, a fruit ripeness, a fruit acidity, a fruit antioxidant content, a fruit sugar content, a fruit density, a GPS position, a foliage density, a stem elongation rate, a reflectance spectra, a fruit density, a GPS position, an acid content, a dry matter content, a root growth rate, a root biomass, a root water content, a root depth, a root volume, a root size, a root density, a foliage reflectance spectra, a normalized difference vegetation index, an interior fruit temperature, an exterior fruit temperature, a red reflectance, an infrared reflectance, mid-infrared reflectance, a near-infrared reflectance, a fruit yield, or any combination thereof. In some embodiments, transmitting the cultivar regimen recommendation comprises transmitting the cultivar regimen recommendation to a user via a graphical user interface (GUI). In some embodiments, the system is further configured to calculate an amount of CO2 sequestration based on one or both of the verified crop yield and the plurality of cultivar conditions. In some embodiments, the system is further configured to provide the calculated amount of CO2 sequestration to the first machine learning algorithm to adjust the cultivar regimen recommendation to optimize an amount of CO2 sequestration. In some embodiments, the calculated amount of CO2 is based on 1) cultivar conditions such as sensor data and/or 2) verified crop yield such as plant size, a leaf diameter, a plant height, a plant mass, a leaf shape, a plant shape, a plant condition, a fruit size, a fruit ripeness, a fruit density, a foliage density, a stem elongation rate, a reflectance spectra, a fruit density, a dry matter content, a root growth rate, a root biomass, a root water content, a root depth, a root volume, a root size, a root density, a foliage reflectance spectra, a normalized difference vegetation index, or a combination thereof.

Another aspect provided herein is a non-transitory computer-readable storage media encoded with a computer program including instructions executable by a processor to create an application to determine a cultivar regimen recommendation for a crop, the application configured to perform at least the following: receiving a plurality current cultivar conditions; applying a first machine learning algorithm to at least a portion of the current cultivar conditions to determine the cultivar regimen recommendation; receiving a verified crop yield after the cultivar regimen recommendation has been performed on the crop; feeding back the verified crop yield to improve the first machine learning algorithm's calculation over time; and transmitting the cultivar regimen recommendation.

In some embodiments, the first machine learning algorithm is trained by: collecting from a database a plurality of historical growing conditions, wherein each historical growing condition comprises a historical cultivar condition and a historical cultivar regimen, and wherein the historical growing condition is associated with a historical crop yield; creating a first training set comprising: a first plurality the collected historical growing conditions wherein each historical growing condition is associated with the historical crop yield; and a second plurality the collected historical growing conditions wherein each historical growing condition is disassociated from the historical crop yield; training the first machine learning algorithm in a first stage using the first training set to determine a predicted crop yield; creating a second training set for a second stage of training comprising the first training set and one or more of the second plurality of the collected historical growing conditions wherein a difference between the determined crop yield and the predicted crop yield is greater than a set amount; and training the first machine learning algorithm in a second stage using the second training set. In some embodiments, the first machine learning algorithm is trained by: a first training module creating an initial cultivar model by assigning a probability weight to each of two or more predictor variables, the two or more predictor variable comprising: a historical cultivar condition; and a historical cultivar regimen; a second training module using the initial cultivar model to determine a predicted historical crop yield; a third training module receiving a historical crop yield; and a fourth training module adjusting the probability weights based on the verified historical crop yield and the predicted historical crop yield. In some embodiments, the first machine learning algorithm comprises a neural network. In some embodiments, the application is further configured to perform: receiving a plurality of historical cultivar regimens, wherein each historical cultivar regimen comprises a plurality of historical regimen categories, wherein each historical regimen category comprises a plurality of cultivar instructions, and wherein each cultivar instruction is associated with a crop and a historical categorical crop yield; applying a second machine learning algorithm to each cultivar instruction in one historical regimen category to determine an agricultural relationship between one or more of the cultivar instructions, the crop, and the associated historical categorical crop yield; receiving a verified categorical crop yield after the cultivar instructions have been performed on the crop; and appending the verified categorical crop yield to the historical categorical crop yield and appending the associated cultivar instructions to the historical regimen category to improve the second machine learning algorithm's calculation over time; wherein the second machine learning algorithm determines the cultivar regimen recommendation based on the agricultural relationship. In some embodiments, the second machine learning algorithm comprises a neural network. In some embodiments, the second machine learning algorithm is trained by: creating an initial categorical model by assigning a probability weight to each of the plurality of cultivar instructions; using the initial categorical model to determine a predicted categorical crop yield; receiving a verified categorical crop yield; and adjusting the probability weights based on the verified categorical crop yield and the predicted categorical crop yield. In some embodiments, the current cultivar condition, the historical cultivar condition, or both comprises a wind speed, a wind direction, a gust speed, a gust direction, a rainfall quantity, a soil moisture, a light measurement, a humidity, a crop dimension, a soil pH, a gamma-ray measurement, a picture, an audio track, a video, aerial imagery, satellite imagery, a chemical composition, an atmospheric pressure, an O2 quantity, a N2 quantity, a CO2 quantity, a sporadic light measurement, a fruit growth measurement, a reflectance, an infrared measurement, a mid-infrared measurement, near-infrared measurement, a fruit density, a GPS position, a temperature, or any combination thereof. In some embodiments, the current cultivar condition, the historical cultivar condition, or both comprises a wind speed, a wind direction, a gust speed, a gust direction, a rainfall quantity, a soil moisture, a light measurement, a humidity, a crop dimension, a soil pH, a gamma-ray measurement, a picture, an audio track, a video, aerial imagery, satellite imagery, a chemical composition, an atmospheric pressure, an O2 quantity, a N2 quantity, a CO2 quantity, a sporadic light measurement, a fruit growth measurement, a reflectance, an infrared measurement, a mid-infrared measurement, near-infrared measurement, a fruit density, a GPS position, a temperature, or any combination thereof. In some embodiments, the current cultivar condition is received from a sensor, a weather information service, or both. In some embodiments, the sensor comprises at least one of a wind gauge, a rain gauge, a soil moisture gauge, a light gauge, a humidity gauge, a stem water potential dendrometer, a dendrometer, a GPS sensor, a pH meter, a gamma-ray sensor, a camera, a microphone, a video camera, a hyperspectral camera, an aerial camera, a satellite imaging device, a chemical sensor, an atmospheric pressure sensor, an O2 sensor, a N2 sensor, a CO2 sensor, a sporadic light sensor, a fruit growth sensor, a reflectance sensor, an infrared sensor, an irrigation sensor, a mid-infrared sensor, near-infrared sensor, a fruit density sensor, or a thermometer. In some embodiments, the sensor is an internet of things sensor. In some embodiments, the sensor is coupled to the crop, a soil surrounding the crop, a remote operated vehicle (ROV), an aerial drone, a balloon, or any combination thereof. In some embodiments, the application is further configured to output the cultivar condition for display on a dashboard, data analysis, or both. In some embodiments, the application is further configured to emit an alarm if one or more of the plurality of current cultivar conditions is outside a predetermined range. In some embodiments, the current cultivar condition is received from a remote monitoring source. In some embodiments, the remote monitoring source is a weather monitoring source, and wherein the current cultivar condition is a temperature, a humidity, a wind speed, a wind direction, a rain quantity, a snow quantity, a hail quantity, or any combination thereof. In some embodiments, the current cultivar condition is received in real-time or near real-time. In some embodiments, the current cultivar condition is received periodically. In some embodiments, the period is about 1 minute, 5 minutes, 10 minutes, 15 minutes, 30 minutes, 1 hour, 2 hours, 6 hours, 12 hours, 1 day, 2 days, 3 days, or 1 week, including increments therein. In some embodiments, the period is at least about 1 minute, 5 minutes, 10 minutes, 15 minutes, 30 minutes, 1 hour, 2 hours, 6 hours, 12 hours, 1 day, 2 days, 3 days, or 1 week, including increments therein. In some embodiments, the period is at most about 1 minute, 5 minutes, 10 minutes, 15 minutes, 30 minutes, 1 hour, 2 hours, 6 hours, 12, hours, 1 day, 2 days, 3 days, or 1 week, including increments therein. In some embodiments, the current cultivar condition, the historical cultivar condition, or both comprises a condition of a single plant. In some embodiments, the current cultivar condition, the historical cultivar condition, or both comprises a condition of a single plant and a GPS location of the single plant. In some embodiments, the GPS location has a resolution of about 0.15 meters to about 5 meters. In some embodiments, the current cultivar condition, the historical cultivar condition, or both comprises a condition of a plurality of plants. In some embodiments, the current cultivar condition, the historical cultivar condition, or both comprises a condition of a field of plants. In some embodiments, the cultivar regimen recommendation, the historical cultivar regimen, or both comprises a fertilizer quantity adjustment, a fertilizer type adjustment, a pruning quantity adjustment, a pruning location adjustment, a pesticide quantity adjustment, a pesticide type adjustment, a planting date adjustment, a harvesting date adjustment, an irrigation quantity adjustment, an irrigation time of day adjustment, an irrigation schedule adjustment, a crop type adjustment, or any combination thereof. In some embodiments, the cultivar regimen recommendation comprises a reflection adjustment recommendation comprising a modification of a reflective property of a reflective surface configured to reflect light to a plant. In some embodiments, the reflective property comprises at least one of a light direction, a light wavelength range, a light intensity, or a light concentration. In some embodiments, the light comprises at least one of a modifiable light, sunlight, UV light, IR light, an electric light, or an LED light. In some embodiments, the cultivar regimen recommendation, the historical cultivar regimen, or both comprises an adjustment of the cultivar of a single plant. In some embodiments, the cultivar regimen recommendation, the historical cultivar regimen, or both comprises an adjustment of the cultivar of a plurality of plants. In some embodiments, the cultivar regimen recommendation, the historical cultivar regimen, or both comprises an adjustment of the cultivar of a field of plants. In some embodiments, the verified crop yield, the historical crop yield, or both comprises a crop yield quantity, a crop yield quality, or any combination thereof. In some embodiments, the crop yield quality comprises a growth speed, a plant size, a leaf diameter, a plant height, a plant mass, a leaf color, a leaf shape, a plant stem water potential, a plant color, a plant shape, a plant condition, a fruit size, a fruit color, a fruit ripeness, a fruit acidity, a fruit antioxidant content, a fruit sugar content, a fruit density, a GPS position, a foliage density, a stem elongation rate, a reflectance spectra, a fruit density, a GPS position, an acid content, a dry matter content, a root growth rate, a root biomass, a root water content, a root depth, a root volume, a root size, a root density, a foliage reflectance spectra, a normalized difference vegetation index, an interior fruit temperature, an exterior fruit temperature, a red reflectance, an infrared reflectance, mid-infrared reflectance, a near-infrared reflectance, a fruit yield, or any combination thereof. In some embodiments, transmitting the cultivar regimen recommendation comprises transmitting the cultivar regimen recommendation to a user via a graphical user interface (GUI). In some embodiments, the application is further configured to calculate an amount of CO2 sequestration based on one or both of the verified crop yield and the plurality of cultivar conditions. In some embodiments, the application is further configured to provide the calculated amount of CO2 sequestration to the first machine learning algorithm to adjust the cultivar regimen recommendation to optimize an amount of CO2 sequestration. In some embodiments, the calculated amount of CO2 is based on 1) cultivar conditions such as sensor data and/or 2) verified crop yield such as plant size, a leaf diameter, a plant height, a plant mass, a leaf shape, a plant shape, a plant condition, a fruit size, a fruit ripeness, a fruit density, a foliage density, a stem elongation rate, a reflectance spectra, a fruit density, a dry matter content, a root growth rate, a root biomass, a root water content, a root depth, a root volume, a root size, a root density, a foliage reflectance spectra, a normalized difference vegetation index, or a combination thereof.

Another aspect provided herein is a computer-implemented method of training a neural network for determining a cultivar regimen recommendation comprising: collecting from a database a plurality of historical growing conditions, wherein each historical growing condition comprises a historical cultivar condition and a historical cultivar regimen, and wherein the historical growing condition is associated with a historical crop yield; creating a first training set comprising: a first plurality the collected historical growing conditions wherein each historical growing condition is associated with the historical crop yield; and a second plurality the collected historical growing conditions wherein each historical growing condition is disassociated from the historical crop yield; training the neural network in a first stage using the first training set to determine a predicted crop yield; creating a second training set for a second stage of training comprising the first training set and one or more of the second plurality of the collected historical growing conditions wherein a difference between the determined crop yield and the predicted crop yield is greater than a set amount; and training the neural network in a second stage using the second training set; wherein the cultivar regimen recommendation, the historical cultivar regimen, or both comprise a fertilizer quantity adjustment, a fertilizer type adjustment, a pruning quantity adjustment, a pruning location adjustment, a pesticide quantity adjustment, a pesticide type adjustment, a planting date adjustment, a harvesting date adjustment, an irrigation quantity adjustment, an irrigation time of day adjustment, an irrigation schedule adjustment, a crop type adjustment, or any combination thereof and wherein the historical growing condition comprises a wind speed, a wind direction, a gust speed, a gust direction, a rainfall quantity, a soil moisture, a light measurement, a humidity, a crop dimension, a soil pH, subsurface plant and/or tree root growth and propagation, above surface plant and/or tree growth and propagation (for e.g., plant stem, tree trunk), soil textural properties (e.g., lithology of soil), soil temperature, soil ion concentration, soil pore fluid composition, a gamma-ray measurement, a picture, an audio track, a video, aerial imagery, satellite imagery, a chemical composition, an atmospheric pressure, an O2 quantity, a N2 quantity, a CO2 quantity, a sporadic light measurement, a fruit growth measurement, a reflectance, an infrared measurement, a mid-infrared measurement, near-infrared measurement, a fruit density, a GPS position, a temperature, or any combination thereof.

Another aspect provided herein is a computer-implemented system comprising: a digital processing device comprising: at least one processor, an operating system configured to perform executable instructions, a memory, and a computer program including instructions executable by the digital processing device to create an application to determine a cultivar regimen recommendation for a crop, the application configured to perform at least the following: collecting from a database a plurality of historical growing conditions, wherein each historical growing condition comprises a historical cultivar condition and a historical cultivar regimen, and wherein the historical growing condition is associated with a historical crop yield; creating a first training set comprising: a first plurality the collected historical growing conditions wherein each historical growing condition is associated with the historical crop yield; and a second plurality the collected historical growing conditions wherein each historical growing condition is disassociated from the historical crop yield; training the neural network in a first stage using the first training set to determine a predicted crop yield; creating a second training set for a second stage of training comprising the first training set and one or more of the second plurality of the collected historical growing conditions wherein a difference between the determined crop yield and the predicted crop yield is greater than a set amount; and training the neural network in a second stage using the second training set; wherein the cultivar regimen recommendation, the historical cultivar regimen, or both comprise a fertilizer quantity adjustment, a fertilizer type adjustment, a pruning quantity adjustment, a pruning location adjustment, a pesticide type adjustment, a planting date adjustment, a harvesting date adjustment, an irrigation quantity adjustment, an irrigation time of day adjustment, an irrigation schedule adjustment, a crop type adjustment, or any combination thereof and wherein the historical growing condition comprises a wind speed, a wind direction, a gust speed, a gust direction, a rainfall quantity, a soil moisture, a light measurement, a humidity, a crop dimension, a soil pH, subsurface plant and/or tree root growth and propagation, above surface plant and/or tree growth and propagation (for e.g., plant stem, tree trunk), soil textural properties (e.g., lithology of soil), soil temperature, soil ion concentration, soil pore fluid composition, a gamma-ray measurement, a picture, an audio track, a video, aerial imagery, satellite imagery, a chemical composition, an atmospheric pressure, an O2 quantity, a N2 quantity, a CO2 quantity, a sporadic light measurement, a fruit growth measurement, a reflectance, an infrared measurement, a mid-infrared measurement, near-infrared measurement, a fruit density, a GPS position, a temperature, or any combination thereof.

Another aspect provided herein is a non-transitory computer-readable storage media encoded with a computer program including instructions executable by a processor to create an application to determine a cultivar regimen recommendation for a crop, the application configured to perform at least the following: collecting from a database a plurality of historical growing conditions, wherein each historical growing condition comprises a historical cultivar condition and a historical cultivar regimen, and wherein the historical growing condition is associated with a historical crop yield; creating a first training set comprising: a first plurality the collected historical growing conditions wherein each historical growing condition is associated with the historical crop yield; and a second plurality the collected historical growing conditions wherein each historical growing condition is disassociated from the historical crop yield; training the neural network in a first stage using the first training set to determine a predicted crop yield; creating a second training set for a second stage of training comprising the first training set and one or more of the second plurality of the collected historical growing conditions wherein a difference between the determined crop yield and the predicted crop yield is greater than a set amount; and training the neural network in a second stage using the second training set; wherein the cultivar regimen recommendation, the historical cultivar regimen, or both comprise a fertilizer quantity adjustment, a fertilizer type adjustment, a pruning quantity adjustment, a pruning location adjustment, a pesticide quantity adjustment, a pesticide type adjustment, a planting date adjustment, a harvesting date adjustment, an irrigation quantity adjustment, an irrigation time of day adjustment, an irrigation schedule adjustment, a crop type adjustment, or any combination thereof; and wherein the historical growing condition comprises a wind speed, a wind direction, a gust speed, a gust direction, a rainfall quantity, a soil moisture, a light measurement, a humidity, a crop dimension, a soil pH, subsurface plant and/or tree root growth and propagation, above surface plant and/or tree growth and propagation (for e.g., plant stem, tree trunk), soil textural properties (e.g., lithology of soil), soil temperature, soil ion concentration, soil pore fluid composition, a gamma-ray measurement, a picture, an audio track, a video, aerial imagery, satellite imagery, a chemical composition, an atmospheric pressure, an O2 quantity, a N2 quantity, a CO2 quantity, a sporadic light measurement, a fruit growth measurement, a reflectance, an infrared measurement, a mid-infrared measurement, near-infrared measurement, a fruit density, a GPS position, a temperature, or any combination thereof.

Another aspect provided herein is a computer-implemented system comprising: a digital processing device comprising: at least one processor, an operating system configured to perform executable instructions, a memory, and a computer program including instructions executable by the digital processing device to create an application for cultivating a crop, the application configured to perform at least the following: deploying a plurality of sensors to measure a current cultivar condition of the crop; receiving a historical cultivar regimen associated with a historical crop yield; applying an algorithm to determine a cultivar regimen recommendation based on the current cultivar condition, the current cultivar regimen, and the historical cultivar regimen; and altering a cultivar condition of the crop by performing the cultivar regimen recommendation.

In some embodiments, the plurality of sensors comprises at least about 25 sensors. In some embodiments, the current cultivar condition, the historical cultivar condition, or both comprises a wind speed, a wind direction, a gust speed, a gust direction, a rainfall quantity, a soil moisture, a light measurement, a humidity, a crop dimension, a soil pH, a gamma-ray measurement, a picture, an audio track, a video, aerial imagery, satellite imagery, a chemical composition, an atmospheric pressure, an $O_2$ quantity, a $N_2$ quantity, a $CO_2$ quantity, a sporadic light measurement, a fruit growth measurement, a reflectance, an infrared measurement, a mid-infrared measurement, near-infrared measurement, a fruit density, a GPS position, a temperature, or any combination thereof. In some embodiments, at least one of the plurality of the sensors comprises at least one of a wind gauge, a rain gauge, a soil moisture gauge, a light gauge, a humidity gauge, a stem water potential dendrometer, a dendrometer, a GPS sensor, a pH meter, a gamma-ray sensor, a camera, a microphone, a video camera, a hyperspectral camera, an aerial camera, a satellite imaging device, a chemical sensor, an atmospheric pressure sensor, an $O_2$ sensor, a $N_2$ sensor, a $CO_2$ sensor, a sporadic light sensor, a fruit growth sensor, a reflectance sensor, an infrared sensor, an irrigation sensor, a mid-infrared sensor, near-infrared sensor, a fruit density sensor, or a thermometer. In some embodiments, at least one of the plurality of the sensors is an internet of things sensor. In some embodiments, at least one of the plurality of the sensors is coupled to the crop, a soil surrounding the crop, a remotely operated vehicle (ROV), an aerial drone, a balloon, or any combination thereof. In some embodiments, the application is further configured to perform displaying the cultivar condition on a dashboard. In some embodiments, the application is further configured to perform emitting an alarm if the current cultivar conditions is outside a predetermined range. In some embodiments, the current cultivar condition is received in real-time or near real-time. In some embodiments, the current cultivar condition is received periodically. In some embodiments, the period is at most about 1 minute, 5 minutes, 10 minutes, 15 minutes, 30 minutes, 1 hour, 2 hours, 6 hours, 12 hours, 1 day, 2 days, 3 days, or 1 week. In some embodiments, the current cultivar condition, the historical cultivar condition, or both comprises a condition of a single plant. In some embodiments, the current cultivar condition, the historical cultivar condition, or both comprises a condition of a single plant and a GPS location of the single plant. In some embodiments, the GPS location has a resolution of about 0.15 meters to about 5 meters. In some embodiments, the current cultivar condition, the historical cultivar condition, or both comprises a condition of a plurality of plants. In some embodiments, the current cultivar condition, the historical cultivar condition, or both comprises a condition of a field of plants. In some embodiments, the cultivar regimen recommendation, the historical cultivar regimen, or both comprises a fertilizer quantity adjustment, a fertilizer type adjustment, a pruning quantity adjustment, a pruning location adjustment, a pesticide quantity adjustment, a pesticide type adjustment, a planting date adjustment, a harvesting date adjustment, an irrigation quantity adjustment, an irrigation time of day adjustment, an irrigation schedule adjustment, a crop type adjustment, or any combination thereof. In some embodiments, the cultivar regimen recommendation comprises a reflection adjustment recommendation comprising a modification of a reflective property of a reflective surface configured to reflect light to a plant. In some embodiments, the reflective property comprises at least one of a light direction, a light wavelength range, a light intensity, or a light concentration. In some embodiments, the light comprises at least one of a modifiable light, sunlight, UV light, IR light, an electric light, or an LED light. In some embodiments, the cultivar regimen recommendation, the historical cultivar regimen, or both comprises an adjustment of the cultivar of a single plant. In some embodiments, the cultivar regimen recommendation, the historical cultivar regimen, or both comprises an adjustment of the cultivar of a plurality of plants. In some embodiments, the cultivar regimen recommendation, the historical cultivar regimen, or both comprises an adjustment of the cultivar of a field of plants. In some embodiments, the verified crop yield, the historical crop yield, or both comprises a crop yield quantity, a crop yield quality, or both. In some embodiments, the crop yield quality comprises a growth speed, a plant size, a leaf diameter, a plant height, a plant mass, a leaf color, a leaf shape, a plant stem water potential, a plant color, a plant shape, a plant condition, a fruit size, a fruit color, a fruit ripeness, a fruit acidity, a fruit antioxidant content, a fruit sugar content, a fruit density, a GPS position, a foliage density, a stem elongation rate, a reflectance spectra, a fruit density, a GPS position, an acid content, a dry matter content, a root growth rate, a root biomass, a root water content, a root depth, a root volume, a root size, a root density, a foliage reflectance spectra, a normalized difference vegetation index, an interior fruit temperature, an exterior fruit temperature, a red reflectance, an infrared reflectance, mid-infrared reflectance, a near-infrared reflectance, or any combination thereof. In some embodiments, the crop yield quality comprises a fruit yield. In some embodiments, the application is further configured to perform calculating an amount of $CO_2$ sequestration based on one or both of the verified crop yield and the plurality of cultivar conditions. In some embodiments, the application is further configured to perform providing the calculated amount of $CO_2$ sequestration to the first machine learning algorithm to adjust the cultivar regimen recommendation to optimize an amount of $CO_2$ sequestration. In some embodiments, the calculated amount of $CO_2$ is based on 1) cultivar conditions such as sensor data and/or 2) verified crop yield such as plant size, a leaf diameter, a plant height, a plant mass, a leaf shape, a plant shape, a plant condition, a fruit size, a fruit ripeness, a fruit density, a foliage density, a stem elongation rate, a reflectance spectra, a fruit density, a dry matter content, a root growth rate, a root biomass, a root water content, a root depth, a root volume, a root size, a root density, a foliage reflectance spectra, a normalized difference vegetation index, or a combination thereof.

BRIEF DESCRIPTION OF THE DRAWINGS

The novel features of the subject matter disclosed herein are set forth with particularity in the appended claims. A better understanding of the features and advantages of the present subject matter will be obtained by reference to the following detailed description that sets forth illustrative embodiments, in which the principles of the present subject matter are utilized, and the accompanying drawings of which:

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Provided herein are computer-implemented methods, systems, and non-transitory media for the determination of a cultivar regimen recommendation for a crop. In some embodiments, the methods, systems, and media herein employ artificial intelligence to integrate data across numerous sensors and/or vendors. whereas increased sensed data is more difficult to concatenate, but enables improved prediction algorithms. Positional data associated with one or more sensors enables highly accurate location information to synchronize the data at the individual tree or vine level. In some embodiments, the cultivar regimen recommendation is displayed as a dashboard that allows a grower to consider multiple variables for the planting and harvesting of each crop.

In some embodiments, the methods herein collect and analyze a diverse array of data to better record and analyze both short-term and long-term cultivar conditions and crop quantity/quality. While environmental and cultivar conditions change minute-by minute, are harvested only several times a year. Further while measurement of some data sources can be performed autonomously and/or continuously, other qualitative or quantitative measurement means require manned resources. As many farmers plant large quantities of each crop, the difference between an optimal cultivar regimen and a non-optimal cultivar regimen can equate to a large difference in the yield and income for a harvesting season. As such, the algorithms, methods, and platforms herein enable capture of cultivar conditions and determination of cultivar recommendations on various time and data size scales.

Platforms for Cultivar Growing Environments

Figure 1:
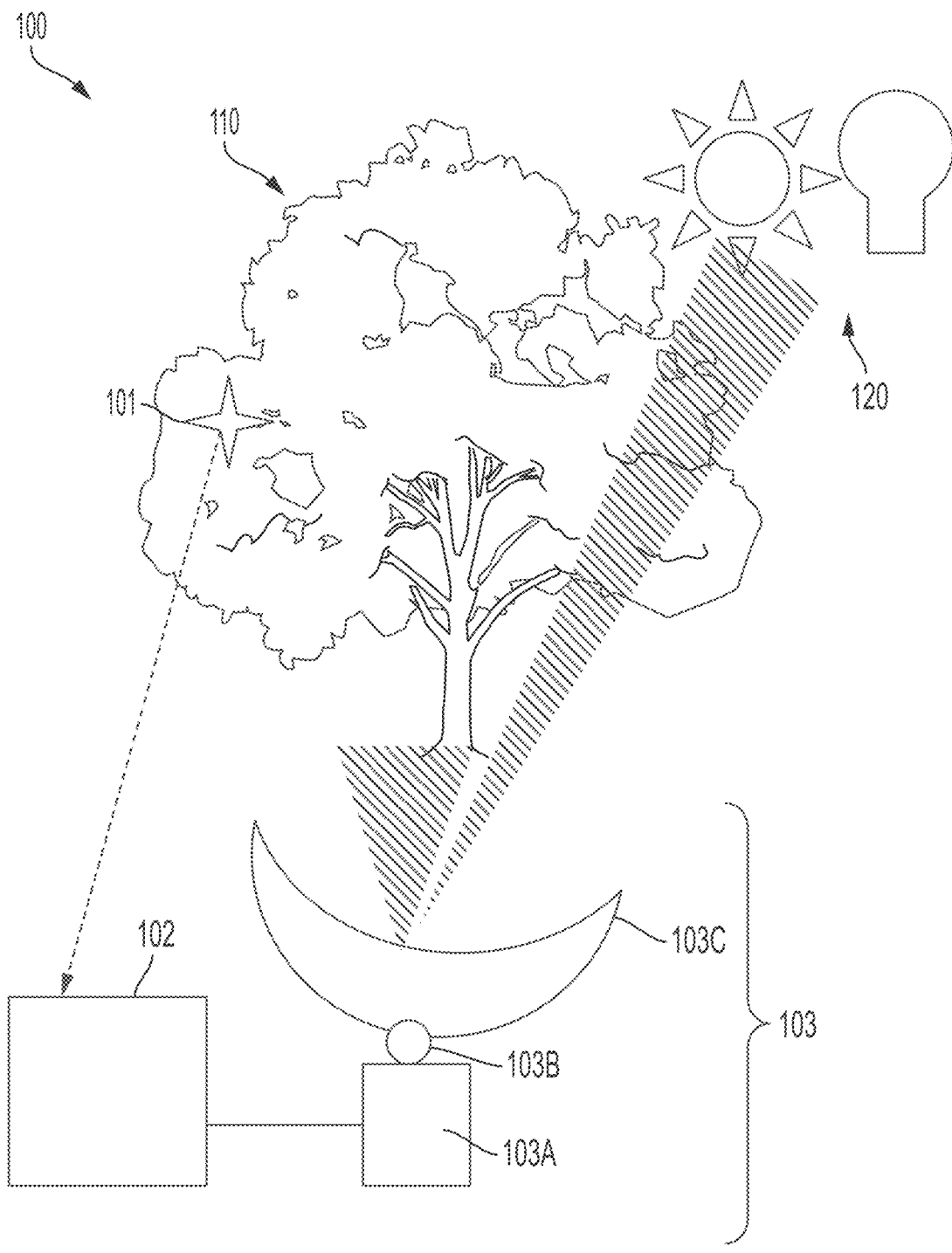
FIG. 1 is a first illustration of an exemplary light directing platform for a cultivar growing environment, per some embodiments herein.
Figure 2:
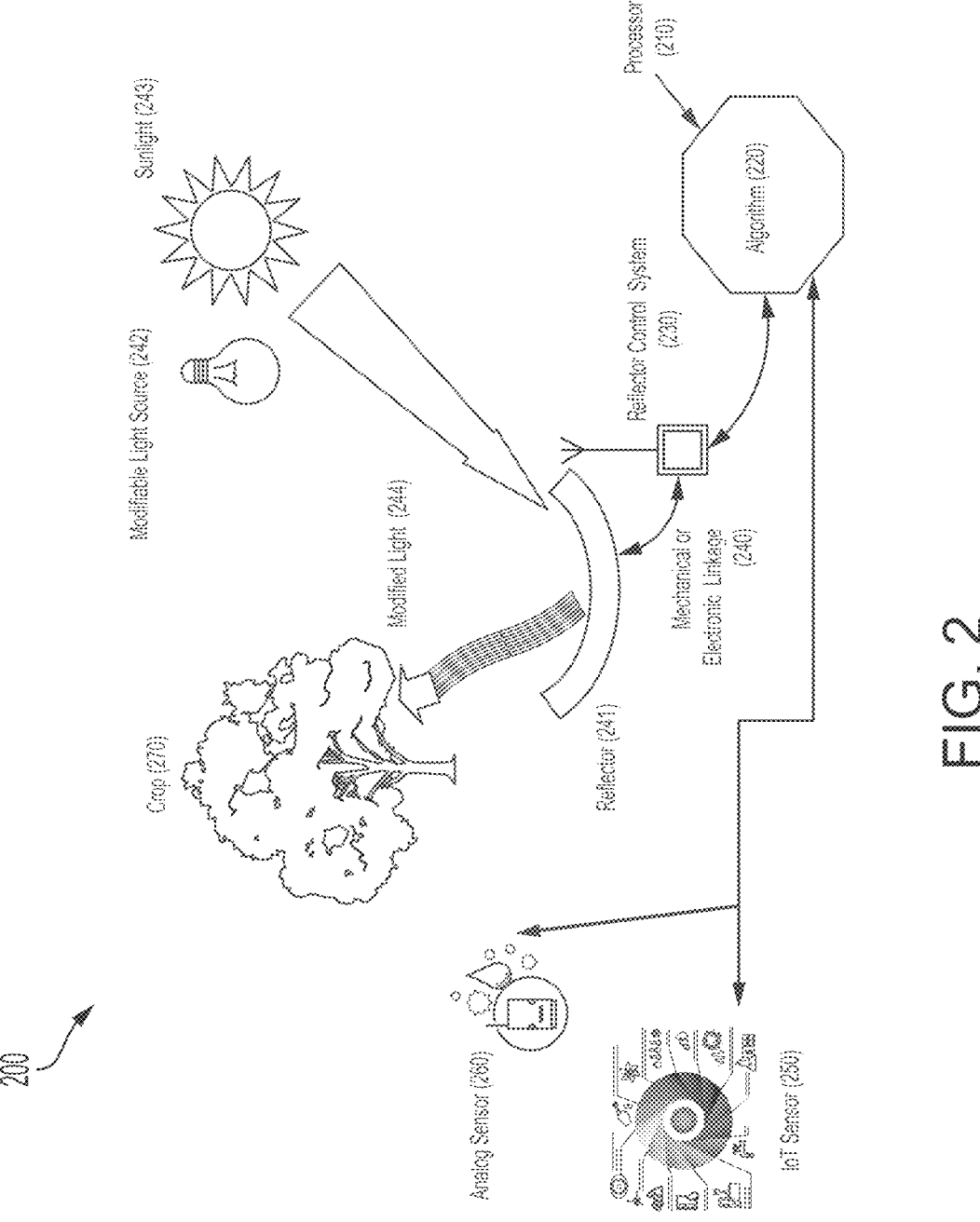
FIG. 2 is a second illustration of an exemplary light directing platform for a cultivar growing environment, per some embodiments herein.

Provided herein, per FIGS. 1 and 2, is a light directing platform 100 for a cultivar growing environment 110. As shown, the platform 100 comprises at least one IoT sensor 101, a processor 102, and a reflector system 103.

In some embodiments, the IoT sensor 101 is configured to sense and/or measure sensed data. In some embodiments, the at least one sensor comprises a plurality of sensors for positioning about the cultivar growing environment 110. In some embodiments, the at least one sensor 101 comprises a plurality of sensors 101 that collectively comprise an internet of things in communication with one another. In some embodiments, the sensor(s) is/are configured to be Internet of Things (IoT) compatible. In some embodiments, the at least one sensor 101 comprises at least one of a wind gauge, a rain gauge, a water consumption flowmeter, a moisture gauge, a stem water potential dendrometer, a dendrometer, a Ground Penetrating Radar (GPR), a GPS sensor, a light gauge, a humidity gauge, a camera, a microphone, a video camera, a hyperspectral camera, an aerial camera, a satellite imaging device, a chemical sensor, a pH meter, a gamma-ray sensor, an atmospheric pressure sensor, a sporadic light sensor, a reflectance sensor, an infrared sensor, an irrigation sensor, a near-infrared sensor, a fruit density sensor, or a thermometer. In some embodiments, the dendrometer is an automated meter connected to a data logger. In some embodiments, the dendrometer is a band dendrometer or a point dendrometer. In some embodiments, the dendrometer is a trunk dendrometer or a stem dendrometer. In some embodiments, the dendrometer comprises a stem water potential dendrometer, a fruit growth sensor, or both. In some embodiments, the chemical sensor comprises an $O_2$ sensor, an $N_2$ sensor, a $CO_2$ sensor, or any combination thereof. In some embodiments, the sensor is a non-destructive sensor. In some embodiments, the GPR sensor comprises a transmitter for emitting electromagnetic energy and a receiver for receiving an echo of the emitted electromagnetic energy. In some embodiments, the GPR sensor further comprises a conductivity sensor. In some embodiments, the light directing platform 100 for a cultivar growing environment 110 further comprises a fiducial marker that is visible to the GPR sensor. In some embodiments, the fiducial marker is buried at a set depth below the ground to enable calibration and/or testing. In some embodiments, the fiducial has a demarcation visible to the GPR sensor as a reference of scale. In some embodiments, the aerial camera and/or satellite imaging device are configured to obtain aerial images and/or satellite images of a given crop area. In some embodiments, the aerial and/or satellite images comprise a digital ortho image of a given crop area. In some embodiments, the aerial camera is located on an aerial drone, an airplane, and/or other object located at an elevation to obtain such an aerial image. In some embodiments, the satellite imaging device comprise a camera or the like located on a satellite elevated so as to be configured to obtain an a satellite image.

In some embodiments, the at least one sensor 101 comprises an optical-only sensor node. In some embodiments, a sensor module includes at least two optical sensors (IR/Visible Light and Spectral Density). Additionally, the sensor module is configurable to sense and/or measure other environmental values such as temperature and/or humidity and/or water levels. The sensor module is connected to a common control unit to sense and/or measure similar variables at slightly different locations at the same time. The optical sensors are optionally configurable to be connected via fiber optic cable to extend the range and/or be directly positionable at the desired location and angle. Further, temperature readings are configurable to be taken at a distance using existing IR/Laser imaging techniques.

In some embodiments, the platform 100 comprises a first sensor 101 configured to sense and/or measure first sensed data corresponding to a cultivar parameter and/or a growth condition and a second sensor 101 configured to sense and/or measure second sensed data corresponding to a growth condition. In some embodiments, the sensed data corresponds to at least one of a cultivar parameter and a growth condition. In some embodiments, the growth condition comprises at least one of a wind speed, a wind direction, a rainfall quantity, a stem water potential, a light quantity, a light quality, a light intensity, a light angle, a soil moisture level, a soil condition or chemical makeup, a soil color, a pest condition, a relative humidity level, an image, a sound, a video, an atmospheric pressure, an $O_2$ level, an $N_2$ level, a $CO_2$ level, or a chemical level and a temperature. In some embodiments, the cultivar parameter comprises at least one of a growth speed, a plant size, a plant color, a plant shape, a plant condition, a plant height, a plant mass, a leaf diameter, a leaf color, a leaf shape, a plant stem water potential, a fruit size, a fruit color, a fruit ripeness, a fruit acidity, a fruit sugar content, a fruit antioxidant content, a fruit density, a GPS position, a foliage density, a stem elongation rate, a reflectance spectra, a fruit density, a GPS position, an acid content, a dry matter content, a root growth rate, a root biomass, a root water content, a root depth, a root volume, a root size, a root density, root defect, a foliage reflectance spectra, a normalized difference vegetation index (NDVI), an interior fruit temperature, an exterior fruit temperature, a visible light reflectance, a red reflectance (rRed), an infrared reflectance, a mid-infrared reflectance, a near-infrared reflectance (rNIR), or a fruit yield. In some embodiments, the NDVI is calculated as (rNIR–rRed)/(rNIR+rRed). In some embodiments, the NDVI is a graphical indicator for remote sensing analysis of vegetation based on the frequencies of light absorbed by the plant. In some embodiments, the reflectance is measured during illumination of the foliage or fruit with visible light. In some embodiments, the rRed is measured during red illumination of the foliage or fruit. In some embodiments, the infrared reflectance is measured during infrared illumination of the foliage or fruit. In some embodiments, the NDVI is a graphical indicator for remote sensing analysis of vegetation. In some embodiments, the rNIR is measured during near infrared illumination of the foliage or fruit. In some embodiments, root mapping via a GPR corresponds to a root growth rate, a root biomass, a root water content, a root depth, a root volume, a root size, a root density, root defect, or any combination thereof. In some embodiments, root mapping is performed using a GPR. In some embodiments, root mapping via GPR is determined by associating a GPS location with a plurality of GPR measurements. In some embodiments, a root map, a root growth rate, a root biomass, a root water content, a root depth, a root volume, a root size, a root density, root defect, or any combination thereof are determined or detected based on the GPR measurements and a soil type. In some embodiments, a GPR is calibrated or tested by performing a GPR test while a metallic element is inserted into the soil at a known depth. In some embodiments, the soil type is determined by performing a GPR test while a metallic element is inserted into the soil at a known depth.

In some embodiments, rebooting the sensors 101 due to system failures requires battery removal from each of the plurality of sensors 101. As the sensors 101 are often remotely located within the cultivar growing environment 110, such battery removal is time intensive. As such, in some embodiments, each sensor 101 is programmed with a reboot procedure based on a communication lapse or failure. In one example, the reboot procedure comprises restarting each sensor 101 after a communication lapse of two hours. In some embodiments, the reboot procedure comprises restarting each sensor 101 every 15 minutes after a communication lapse of two hours. In some embodiments, the reboot procedure comprises restarting each sensor 101 every hour after a communication lapse of four hours. In some embodiments, the reboot procedure comprises restarting each sensor 101 every two hours after a communication lapse of eight hours. In some embodiments, the reboot procedure comprises restarting each sensor 101 every day after a communication lapse of 24 hours.

In some embodiments, the processor 102 is configured to provide an application comprising: an optimization module and a modification module. In some embodiments, the optimization module determines a reflection modification command. In some embodiments, the optimization module determines a reflection modification command based at least on the sensed data. In some embodiments, the modification module transmits the reflection modification command to a communication device 103A. In some embodiments, the processor 102 is positioned in a remote location from that of the light directing platform 100. In some embodiments, processing is performed locally. In some embodiments, the processor 102 is configured to communicate and transmit the reflection modification command via radio signal or via wired network. In some embodiments, the optimization module determines the reflection modification command based at least on the first sensed data and the second sensed data. In some embodiments, the application is further configured for receiving historical data related to the cultivar growing environment 110 from an administrator, and wherein the optimization module further determines the reflective property of the reflective surface 103C based on the historical data. In some embodiments, the application further comprises a statistical module for receiving the historical data.

In some embodiments, the reflector system 103 comprises the communication device 103A, a reflective surface 103C, and a reflection modification device 103B. In some embodiments, the communication device 103A is configured to receive the reflection modification command. In some embodiments, the reflective surface 103C is configured to reflect light 120 to the cultivar growing environment 110. In some embodiments, the light 120 is emitted by the sun. In some embodiments, the light 120 is emitted by a light bulb, a light tube, or any other electric or chemical light source. In some embodiments, the light comprises at least one of a modifiable light, sunlight, UV light, Infrared (IR) light, an electric light, or an LED light. In some embodiments, the reflection modification device 103B is configured to modify a reflective property of the reflective surface 103C. In some embodiments, the reflection modification device 103B is configured to modify a reflective property of the reflective surface 103C based at least on the reflection modification command. In some embodiments, the reflection modification device 103B adjust the one or more light 120 conditions in the cultivar growing environment 110. In some embodiments, the reflective property comprises at least one of a light direction, a light wavelength range, a light intensity, or a light concentration. In some embodiments, the reflection modification device 103B comprises at least one of a motor, a pulley, a gear, a bearing, a shaft, a liquid crystal, a memory metal, a shape-memory polymer, or an adjustable light filter. In some embodiments, the reflection modification device 103B is positioned manually.

In one embodiment, the platform 100 further comprises a common control unit strapped to a fixed location inside or outside of a growth tube, also known as a "NuPlant" tube. This control unit is fed information by (approximately four) fiber optical cables, each measuring light parameters at different heights of the tube, on the inside, as well as external conditions on the outside of the growth tube as well.

Further provided herein is a light directing platform 100 for adjusting one or more light 120 conditions in a cultivar growing environment 110, the platform 100 comprising a system comprising: at least one IoT sensor 101 configured to sense and/or measure sensed data corresponding to at least one of a cultivar parameter and a growth condition; and a processor 102 configured to provide an application comprising: an optimization module for determining a reflection modification command based at least on the sensed data; and a modification module for transmitting the reflection modification command to a communication device 103A configured to receive the reflection modification command; and a reflector system 103 comprising: the communication device 103A configured to receive the reflection modification command; a reflective surface 103C configured to reflect light 120 to the cultivar growing environment 110; and a reflection modification device 103B configured to modify a reflective property of the reflective surface 103C based at least on the reflection modification command, to adjust the one or more light 120 conditions in the cultivar growing environment 110.

In some embodiments, the processor 102 is configured to provide an application comprising: an optimization module and a modification module. In some embodiments, the optimization module determines a reflection modification command. In some embodiments, the optimization module determines a reflection modification command based at least on the sensed data. In some embodiments, the modification module transmits the reflection modification command to a communication device 103A. In some embodiments, the processor 102 is positioned in a remote location from that of the light directing platform 100. In some embodiments, processing is performed locally. In some embodiments, the processor 102 is configured to communicate and transmit the reflection modification command via radio signal or via wired network. In some embodiments, the optimization module determines the reflection modification command based at least on the first sensed data and the second sensed data. In some embodiments, the application is further configured for receiving historical data related to the cultivar growing environment 110 from an administrator, and wherein the optimization module further determines the reflective property of the reflective surface 103C based on the historical data. In some embodiments, the application further comprises a statistical module for receiving the historical data.

In some embodiments, the processor 102 is configured to provide an application for root mapping a given crop, at both an individual plant level and a crop area. In some embodiments, the root mapping is performed using one or more sensors. In some embodiments, the one or more sensors comprise Ground Penetrating Radar (GPR), infrared imaging, micro-rhizomes, or any combination thereof. In some embodiments, the infrared imaging is performed using a drone. In some embodiments, root mapping using GPR comprises.

In some embodiments, root mapping a crop provides information relating to factors relating to a crop root, such as root growth rate, a root biomass, a root water content, a root depth, a root volume, a root size, a root density, root defect, or any combination thereof. In some embodiments, the root mapping is used for measuring the evolution of crop yield growth, by correlating the root mapping data with other forms of data described herein, including growth conditions, cultivar parameters, crop yields, data such as SeeTree/hyperspectral imaging drones, Phytech dendrometers, or any combination thereof. In some embodiments, artificial intelligence and/or machine learning processes, as described herein, is used to predict root growth and propagation.

In some embodiments, the processor 102 is configured to provide an application for determining soil condition and/or properties using a Ground Penetrating Radar (GPR), infrared imaging, micro-rhizomes, or any combination thereof. In some embodiments, the infrared imaging is performed using a drone. In some embodiments, root mapping using GPR comprises.

In some embodiments, determining a soil condition and/or properties comprises measuring electrical conductivity within the soil. In some embodiments, measuring the electrical conductivity within a soil provides information relating to the heterogeneity of soil, which is reflective of soil properties such as soil texture, organic matter, moisture content, and depth of clay pan. In some embodiments, the determining the soil condition and/or properties is used for measuring the evolution of crop yield growth, by correlating the soil condition and/or properties data with other forms of data described herein, including growth conditions, cultivar parameters, crop yields, other forms of data such as SeeTree/hyperspectral imaging drones, Phytech dendrometers, or any combination thereof.

Provided herein per FIG. 2, is a light directing platform 200. In some embodiments, as shown, an algorithm 220 on a processor 210 receives an input from analog sensor 260 and/or an Internet of Things (IoT) sensor 250. Further, in some embodiments, the algorithm 220 instructs a reflector control system 230, which directs a mechanical or electrical linkage 240 to adjust an angle and/or orientation of a reflector 241. In some embodiments, the mechanical or electrical linkage 240 is a passive linkage that measures a position and/or orientation of the reflector 241 once manually adjusted. In some embodiments, a modified light 244, directed from a modifiable light source 242 and/or the sun 243, to a crop 270 is altered based on the angle and/or orientation of the reflector 241. In some embodiments, the reflector 241 adjusts a spectrum, a lux, or both of the modifiable light source 242 and/or the sun 243. Finally, in some embodiments, the analog 260 and/or the IoT 250 sensors measure a cultivar condition of the crop 270 and transmit the cultivar condition of the crop 270 to the algorithm 220 to improve its function over time.

In some embodiments, the analog 260 and/or an Internet of Things (IoT) sensors transmit the cultivar condition of the crop 270 to the algorithm 220 by a lower power Wide Area Network (WAN), a Local Area Network (LAN), a gateway, a cellular connection, a cloud-based connection, or any combination thereof. In some embodiments, the algorithm 220 instructs a reflector control system 230 by a lower power Wide Area Network (WAN), a Local Area Network (LAN), a gateway, a cellular connection, a cloud-based connection, or any combination thereof. In some embodiments, the processor 210 employs an artificial intelligence (AI) algorithm, a human-directed instruction or both.

Methods, Systems, and Media for Determining a Cultivar Regimen Recommendation

In some embodiments, the method comprises: receiving a plurality of current cultivar conditions; applying a first machine learning algorithm to at least a portion of the current cultivar conditions to determine the cultivar regimen recommendation; receiving a verified crop yield after the cultivar regimen recommendation has been performed on the crop; feeding back the verified crop yield to improve the first machine learning algorithm's calculation over time; and transmitting the cultivar regimen recommendation.

In some embodiments, the computer-implemented system comprises a digital processing device comprises at least one processor, an operating system configured to perform executable instructions, a memory, and a computer program including instructions executable by the digital processing device to create an application to determine a cultivar regimen recommendation for a crop. In some embodiments, the non-transitory computer-readable storage media is encoded with a computer program including instructions executable by a processor to create an application to determine a cultivar regimen recommendation for a crop.

In some embodiments, the application is configured to perform: receiving a plurality current cultivar conditions; applying a first machine learning algorithm to at least a portion of the current cultivar conditions to determine the cultivar regimen recommendation; receiving a verified crop yield after the cultivar regimen recommendation has been performed on the crop; feeding back the verified crop yield to improve the first machine learning algorithm's calculation over time; and transmitting the cultivar regimen recommendation.

In some embodiments, the method further comprises: receiving a plurality of historical cultivar regimens, wherein each historical cultivar regimen comprises a plurality of historical regimen categories, wherein each historical regimen category comprises a plurality of cultivar instructions, and wherein each cultivar instruction is associated with a crop and a historical categorical crop yield; and applying a second machine learning algorithm to each cultivar instruction in one historical regimen category to determine an agricultural relationship between one or more of the cultivar instructions, the crop, and the associated historical categorical crop yield; receiving a verified categorical crop yield after the cultivar instructions have been performed on the crop; and appending the verified categorical crop yield to the historical categorical crop yield and appending the associated cultivar instructions to the historical regimen category to improve the second machine learning algorithm's calculation over time.

In some embodiments, the application is further configured to perform: receiving a plurality of historical cultivar regimens, wherein each historical cultivar regimen comprises a plurality of historical regimen categories, wherein each historical regimen category comprises a plurality of cultivar instructions, and wherein each cultivar instruction is associated with a crop and a historical categorical crop yield; and applying a second machine learning algorithm to each cultivar instruction in one historical regimen category to determine an agricultural relationship between one or more of the cultivar instructions, the crop, and the associated historical categorical crop yield; receiving a verified categorical crop yield after the cultivar instructions have been performed on the crop; and appending the verified categorical crop yield to the historical categorical crop yield and appending the associated cultivar instructions to the historical regimen category to improve the second machine learning algorithm's calculation over time. In some embodiments, the first machine learning algorithm determines the cultivar regimen recommendation based on the agricultural relationship.

Figure 3:
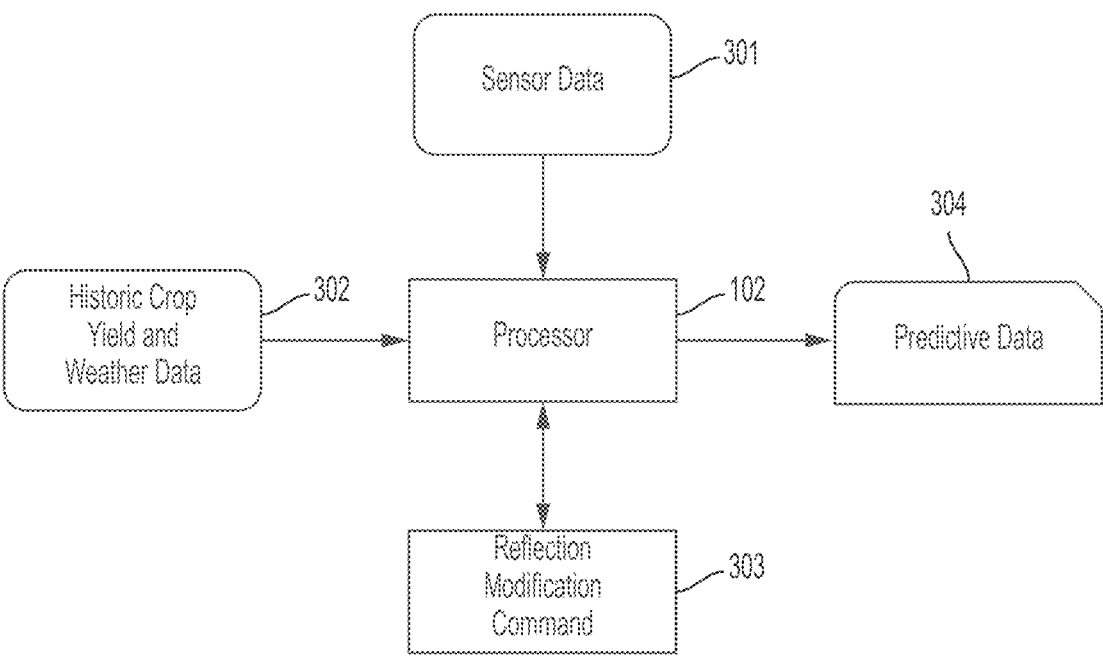
FIG. 3 is an illustration of a first exemplary method for a cultivar growing environment, per some embodiments herein.

FIG. 3 is an illustration of a first exemplary method for a cultivar growing environment. In some embodiments, per FIG. 3, the processor 102 receives a historic crop yield and weather data 302 and the sensor data 301. In some embodiments, the processor 102 then sends a reflection modification command 303 to the reflector system based on the historic crop yield and weather data 302 and the sensor data 301. In some embodiments, the processor 102 further receives a reflection modification position from the reflector system. Finally, in some embodiments, the processor 102 further transmits a predictive data 304 based on the historic crop yield and weather data 302 and the sensor data 301.

Figure 4:
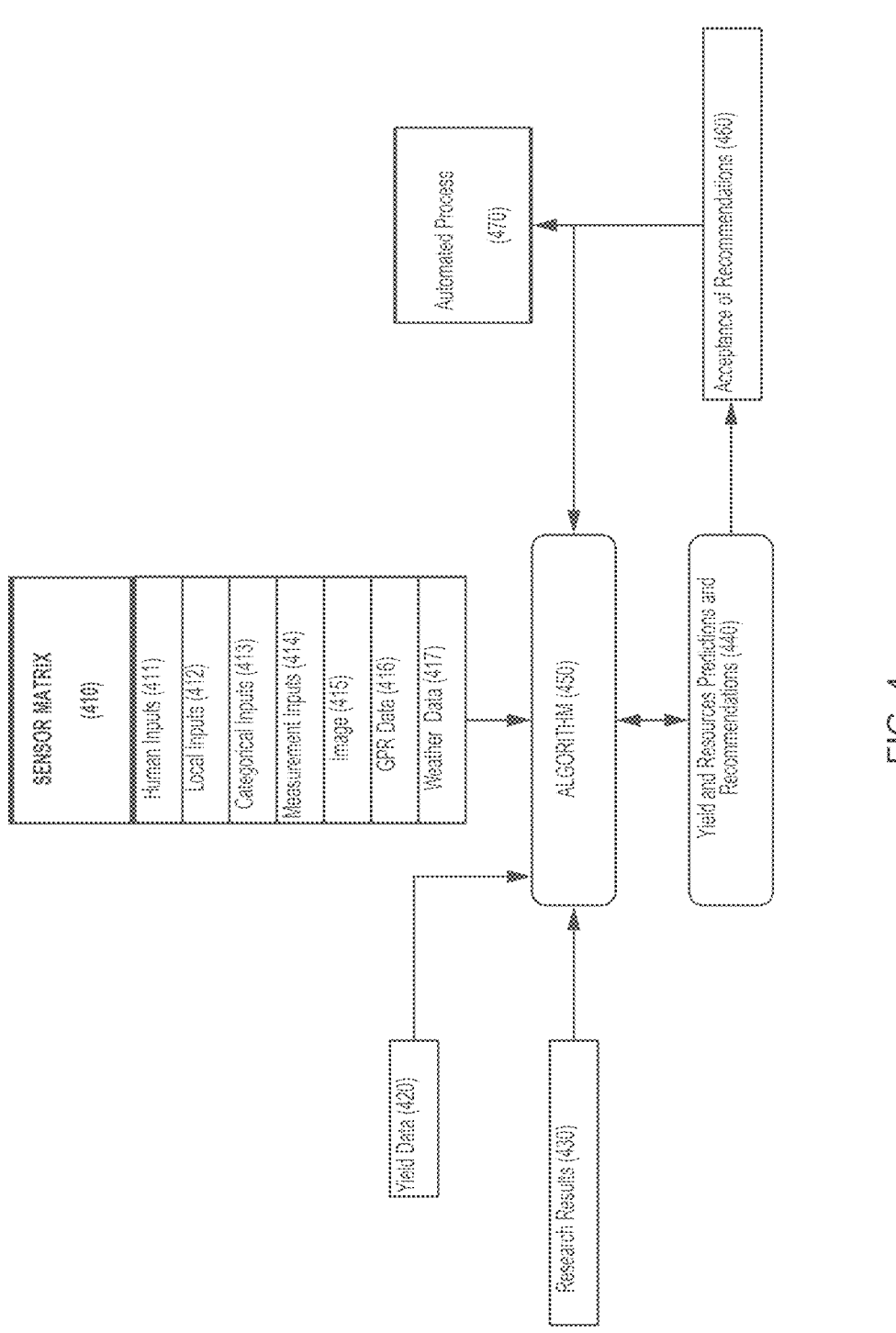
FIG. 4 is an illustration of a second exemplary method for a cultivar growing environment, per some embodiments herein.

FIG. 4 is an illustration of a second exemplary method for a cultivar growing environment. In some embodiments, per FIG. 4, the algorithm 450 receives inputs from a sensor matrix 410, yield data 420, and research and results 430. In some embodiments, the algorithm 450 determines yield and resources predictions and recommendations 440, which upon acceptance 460 are implemented by an automated process 470. In some embodiments, the automated process 470 and the yield and resources predictions and recommendations 440 are fed back into the algorithm 450 to improve future calculations. In one example, the automated process 470 comprises a drip irrigation process.

In some embodiments, as shown, the inputs of the sensor matrix comprise human inputs 411, local inputs 412, categorical inputs 413, measurement inputs 414, image inputs 415, Ground Penetrating Radar (GPR) data 416, weather data 416, or any combination thereof. In some embodiments, the human inputs 411 comprises manual notes, tree growth, crop specific information (e.g., fruit production by mass, quantity, etc, or other information), pollination, leaf growth, crop loss, phenological stages, information relating to devices used for agricultural growth (e.g., size of a light harvesting unit, size of a panel unit, size of a trellis unit, etc.), or any combination thereof. In some embodiments, a natural language processing method is used to perform text analysis on the human inputs 411. In some embodiments, a natural language processing method is used to perform text analysis on the manual notes. In some embodiments, the local input 412 comprises a visible/IR input, a temperature input, a hyperspectral input, an image input, or any combination thereof. In some embodiments, the categorical input 413 comprises an aerial image, a health index, a crop development milestone index, a disease, a tree stress, or any combination thereof. In some embodiments, the measurement input 414 comprises a trunk health, a raw parameter, a tree stress, an irrigation prediction, a growth metric, or any combination thereof. In some embodiments, the image input 415 comprises a time-lapse image, a crop-development image, a crop-growth comparison image, or any combination thereof. In some embodiments, the GPR data 416 comprises soil health, root health, a GPR image, or any combination thereof. In some embodiments, the weather data 416 is an average, minimum and/or maximum temperature, RH value, wind speed, precipitation quantity, sunrise time, sunset time, or any combination thereof. An exemplary sensor matrix is shown in Example 2.

In some embodiments, the algorithm 450 receives an input, wherein the input comprises manual notes, tree growth, crop specific information, pollination, leaf growth, crop loss, phenological stages, a visible/IR input, a temperature input, a hyperspectral input, or an image input, an aerial image, a health index, a crop development milestone index, a disease, a tree stress, a trunk health, a raw parameter, a tree stress, an irrigation prediction, a growth metric, a time-lapse image, a crop-development image, a crop-growth comparison image, a soil health, a root health, a GPR image an average, minimum and/or maximum temperature, an average, minimum and/or maximum RH value, an average, minimum and/or maximum wind speed, an average, minimum and/or maximum precipitation quantity, minimum and/or maximum water resource consumption, an average, minimum and/or maximum sunrise time, an average, minimum and/or maximum sunset time, or any combination thereof. In some embodiments, the input comprises information and/or data received from a third party source. For example, in some embodiments, the input comprises aerial imagery, satellite imagery, and/or digital ortho imagery received from a third party source. In some embodiments, the third party source comprises imagery obtained via the National Agriculture Imagery Program (NAIP). In some embodiments, raw, unprocessed manual notes are received. In some embodiments, raw, unprocessed manual notes are scanned with neuro-linguistic programming. In some embodiments, increasing the number and variety of inputs improves the ability to predict yield and optimal growing conditions.

Figure 5:
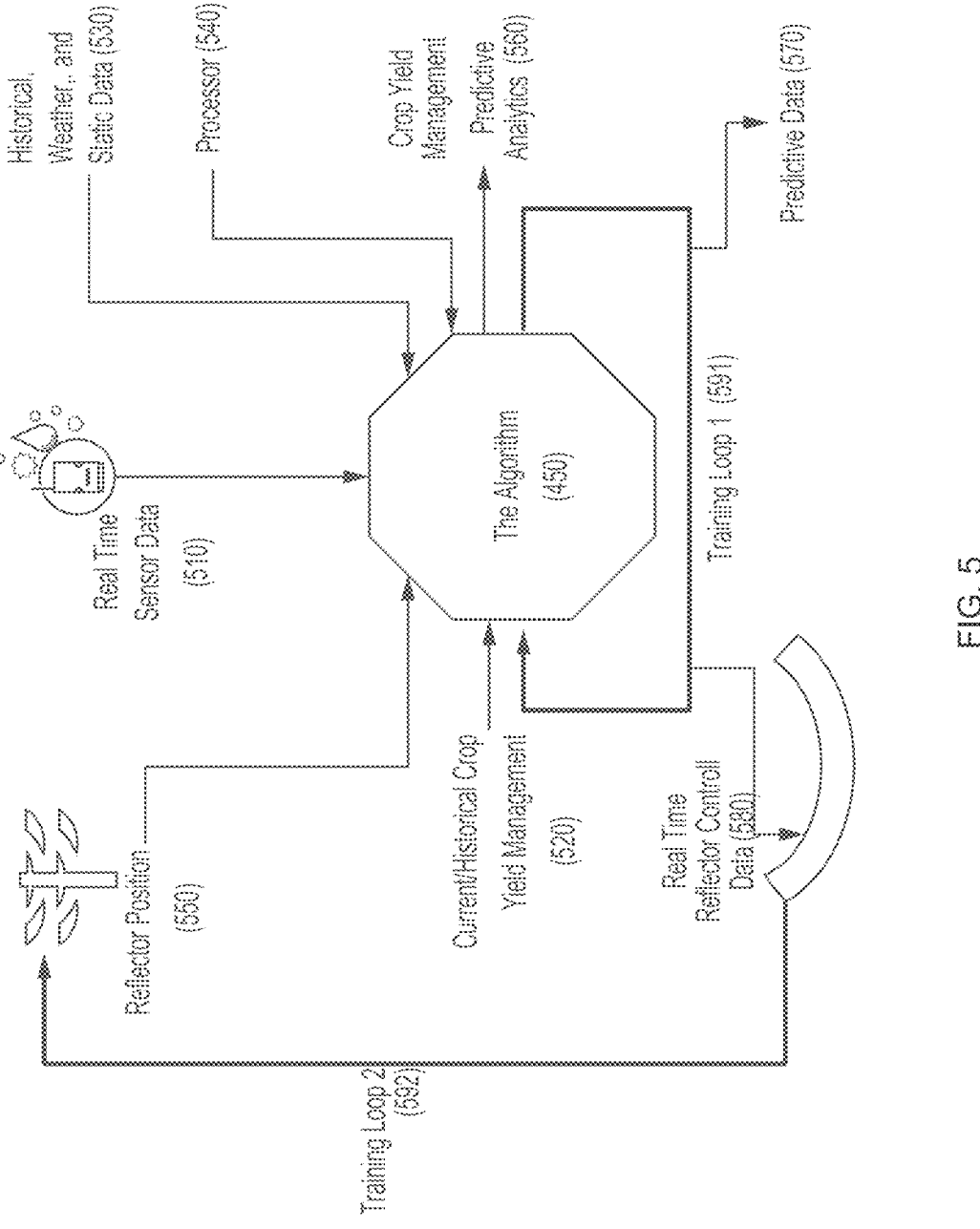
FIG. 5 is an illustration of a third exemplary method for a cultivar growing environment, per some embodiments herein.

In some embodiments, per FIG. 5, the algorithm 450 receives real time sensor data 510, current/historical crop yield management 520 historical, weather, and static data 530, data from a processor 540, and a reflector position 550. Further, in some embodiments, the algorithm 450 outputs crop yield management predictive analytics 560, predictive data 570, and real-time reflector control data 580. In some embodiments, the algorithm 450 outputs the predictive data 570 in a first training loop 591 to train the algorithm 450 in long-term crop yield optimization by harvest. In some embodiments, the algorithm 450 outputs the real-time reflector control data 580 and receives the reflector position 550 in a second training loop 592 to train the algorithm 450. In some embodiments, the predictive data 570 comprises irrigation data, crop spacing data, harvest time data, carbon sequestration data, or any combination thereof. In some embodiments, the algorithm 450 outputs the real-time reflector control data 580 and receives the reflector position 550 without the second training loop 592. In some embodiments, the algorithm 450 additionally or alternatively outputs an irrigation instruction to an irrigation system that controls the dispensing of water to one or more crops.

In some embodiments, the algorithm 450 analyses the inputs to predict the optimal optical characteristics of the reflector. In response to short and long term changes, the algorithm instructs the reflector to change its optical characteristics for the learnable goal of increasing cultivar yield.

In some embodiments, the algorithm comprises a Crop Yield Training Loop 1 591 and a Reflector Training Loop 2 592. In some embodiments, the algorithm does not comprise the Reflector Training Loop 2 592.

In some embodiments, the algorithm 450 analyses the inputs to calculate a metric relating to a crop yield. As described herein, in some embodiments the metric comprises water consumption, carbon sequestration (e.g., calculated amount of carbon dioxide ($CO_2$) captured), etc.

Determining a Cultivar Regimen Recommendation Using a Machine Learning Algorithm Commercial AI algorithmic techniques leverage computer vision and deep-learning algorithms to process data captured by drones and/or software-based technology. Additionally, academics are racing to develop predictive machine learning models leveraging computer vision and deep-learning algorithms to process data captured by drones, smartphone cameras and/or software-based technologies.

In some embodiments, as harvest times are infrequent (i.e., from about 0.5 to 4 times per year) relative to fast moving environmental data such as temperature or cloud cover, determining relevant training sets for the neural networks herein presents a challenge. In some embodiments, the methods and algorithms herein enable the delivery of accurate cultivar regimen recommendation with a periodicity that is vastly greater than, or vastly less than a periodicity of the sensor measurement and/or the crop cycle. In some embodiments, the cultivar regimen recommendation is provided every 1, 2, 3, 4, 5, 6, 7, 8, 9, 10, or more days. In some embodiments, the cultivar regimen recommendation is provided every 1, 2, 3, 4, 5, 6, 7, 8, 9, 10, or more weeks. In some embodiments, the cultivar regimen recommendation is provided every 1, 2, 3, 4, 5, 6, 7, 8, 9, 10, or more months.

In some embodiments, the methods herein collect a wide range of short and long-term data to enable the analysis of various variables that contribute to cultivar growth. In some embodiments, historical, live and predicted input data is collected from the IoT subsystem, the reflector subsystem, the non-IoT static and dynamic sources, as well as the crop yield management subsystem. In some embodiments, the methods herein analyze the above inputs to then predict the optimal optical characteristics of the reflector. In some embodiments, in response to short and long term changes, the methods herein instruct the reflector to change its optical characteristics for the learnable goal of increasing cultivar yield. In some embodiments, the methods herein output other recommendations to the grower such as schedule changes in harvest time, pruning, irrigation, and long-term changes. In some embodiments, the methods herein monitors, controls, and optimizes light characteristics of a reflector to increase and optimize yield of specific cultivars. In some embodiments, the methods herein monitors, optimizes, and controls irrigation, fertilizer, pesticides to increase and optimize yield of specific cultivars while reducing cost and/or environmental impact. In some embodiments, the methods herein employ the collection of a wide range of short and long-term data in order to learn and understand which variables contribute most to cultivar growth. In some embodiments, historical, live and predicted input data is collected from the IoT subsystem, the reflector subsystem, the non-IoT static and dynamic sources, as well as a crop yield management subsystem.

Figure 7:
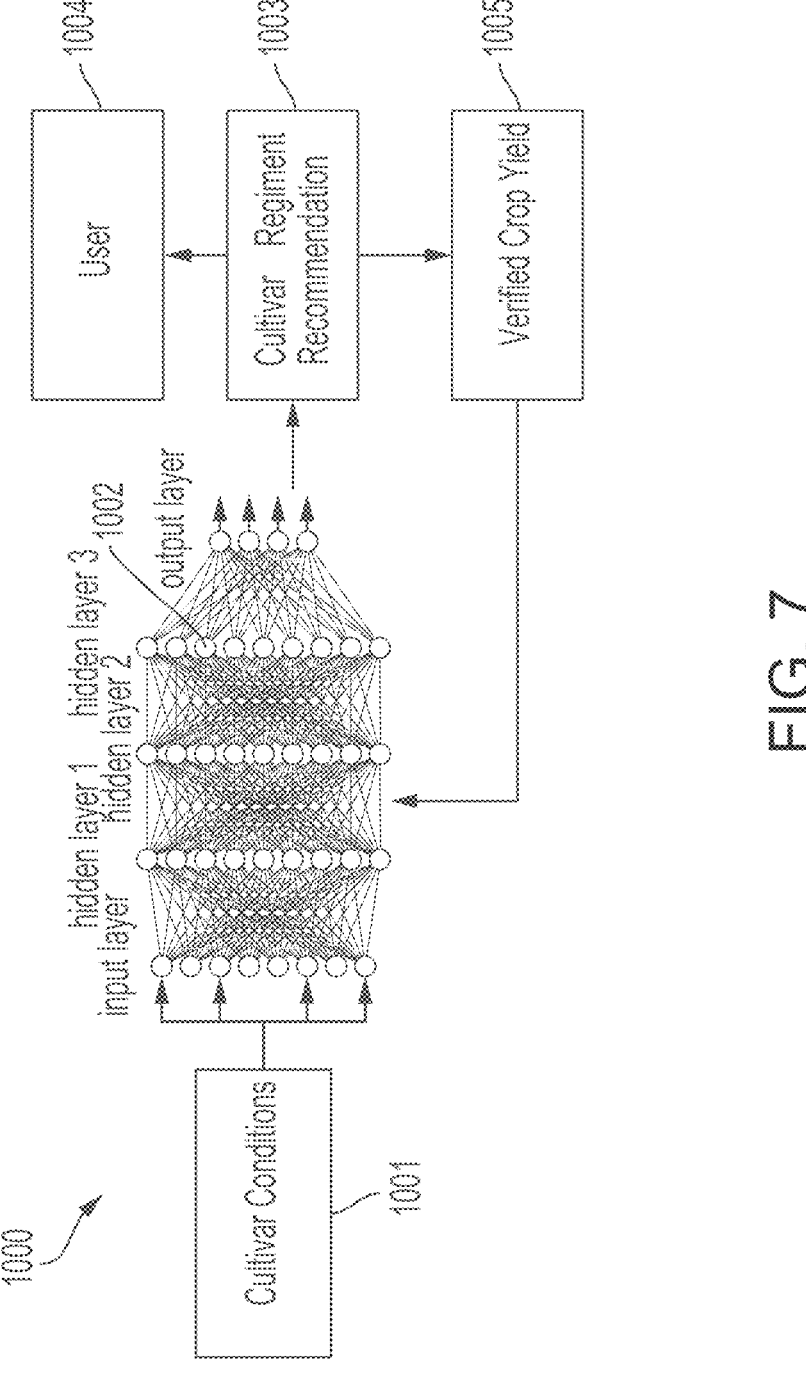
FIG. 7 is an illustration of an exemplary first method for determining a cultivar regimen recommendation using a machine learning algorithm, per some embodiments herein.

FIGS. 7-11 show illustrations of a method for determining a cultivar regimen recommendation using a machine learning algorithm. FIG. 7 is an illustration of a first method 1000 for determining a cultivar regimen recommendation using a neural network. As shown, a first neural network 1002 receives one or more cultivar conditions 1001 to determine a cultivar regimen recommendation, wherein the cultivar regimen recommendation 1003 is transmitted to a user 1004. As shown, a verified crop yield 1005 based on the cultivar regimen recommendation 1003 is fed back into the first neural network 1002 to improve its calculation over time.

Figure 8:
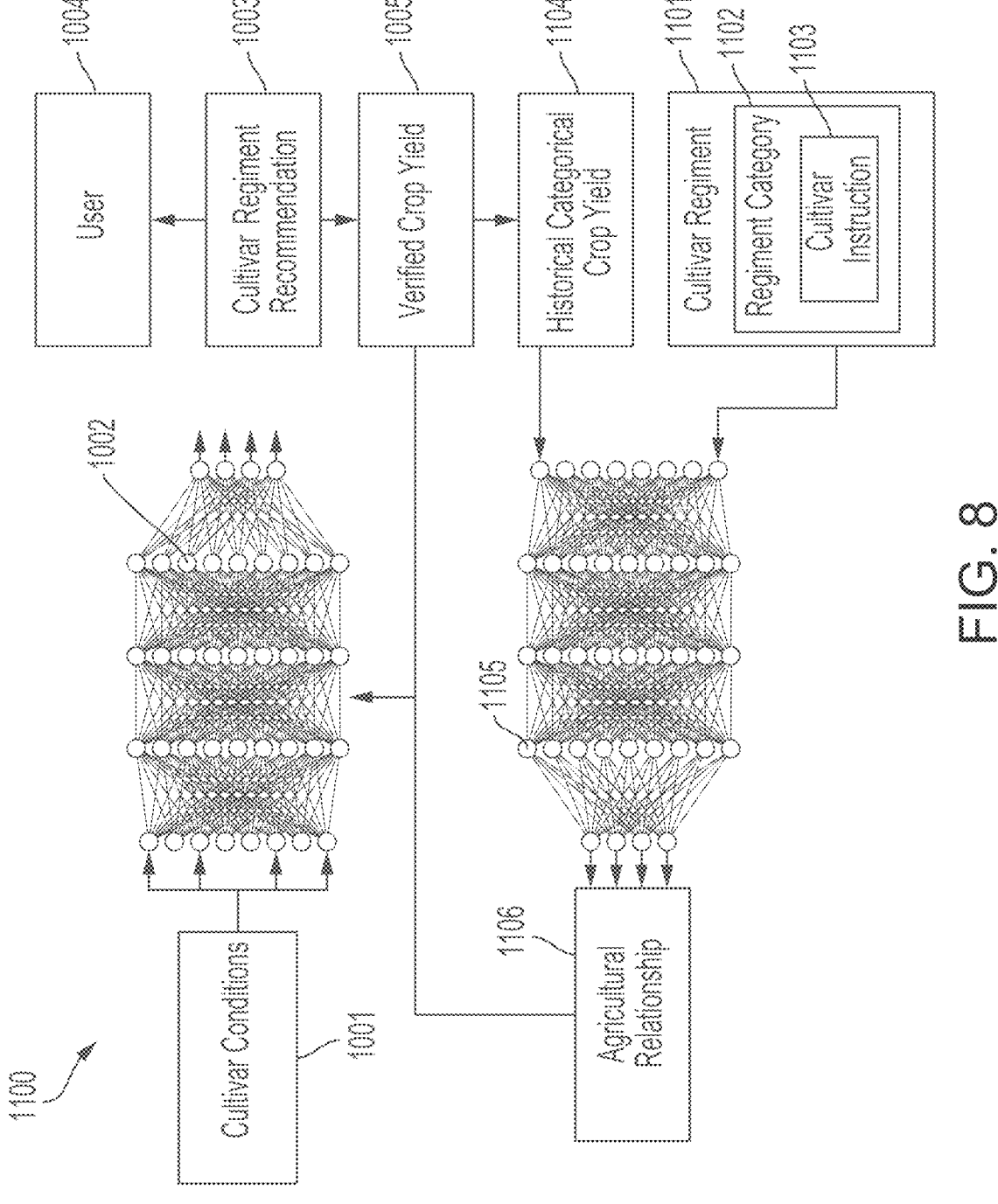
FIG. 8 is an illustration of an exemplary second method for determining a cultivar regimen recommendation using a machine learning algorithm, per some embodiments herein.

FIG. 8 is an illustration of a second method for determining a cultivar regimen recommendation using a neural network 1100. In some embodiments, as shown, the verified crop yield 1004 is stored as a historical categorical crop yield 1104, wherein the historical categorical crop yield 1104 and a cultivar instruction 1103 are provided to a second neural network 1105. In some embodiments, the second neural network 1105 determine an agricultural relationship 1106 between one or more of the cultivar instructions, the crop, the associated historical categorical crop yield. In some embodiments, the agricultural relationship 1106 is received by the first neural network 1102, the verified crop yield 1005, or both. Further as shown, in some embodiments, each cultivar instruction 1103 is associated with a historical regimen category 1102, and each historical regimen category 1102 is associated with a cultivar regimen 1101. Finally, as shown, the agricultural relationship 1106 is provided to the first neural network 1002 to improve its calculations over time.

In some embodiments, the first and/or second methods for determining a cultivar regimen recommendation using a machine learning algorithm 1000 1100 additionally provide sensor layout and positioning recommendations for future cultivar condition sensing. In some embodiments, the first and/or second methods for determining a cultivar regimen recommendation using a machine learning algorithm 1000 1100 further provide updated sensor layouts and positioning recommendations as new data is acquired. Further, in some embodiments, at least one of the first and/or second methods for determining a cultivar regimen recommendation using a machine learning algorithm 1000 1100 determine a carbon footprint or a carbon emission associated with the cultivation of the plant. In some embodiments, at least one of the first and/or second methods for determining a cultivar regimen recommendation using a machine learning algorithm 1000 1100 determine a carbon sequestration amount associated with the cultivation of the plant. In some embodiments, the first and/or second methods for determining a cultivar regimen recommendation using a machine learning algorithm 1000 1100 optimize and predict harvest yields by taking in measurements of cultivar conditions that cannot be changed, such as for example, the weather, and determining a cultivar regimen recommendation as to the attributes that can be changed. In some embodiments, the first and/or second methods for determining a cultivar regimen recommendation using a machine learning algorithm 1000 1100 to optimize an irrigation quantity (water consumption) for a given crop yield, thereby enabling reduction in water usage from a resource (such as water supply, water reservoir, etc.) and to reduce labor costs, fertilizer use, pesticide use, or any combination thereof.

Figure 9:
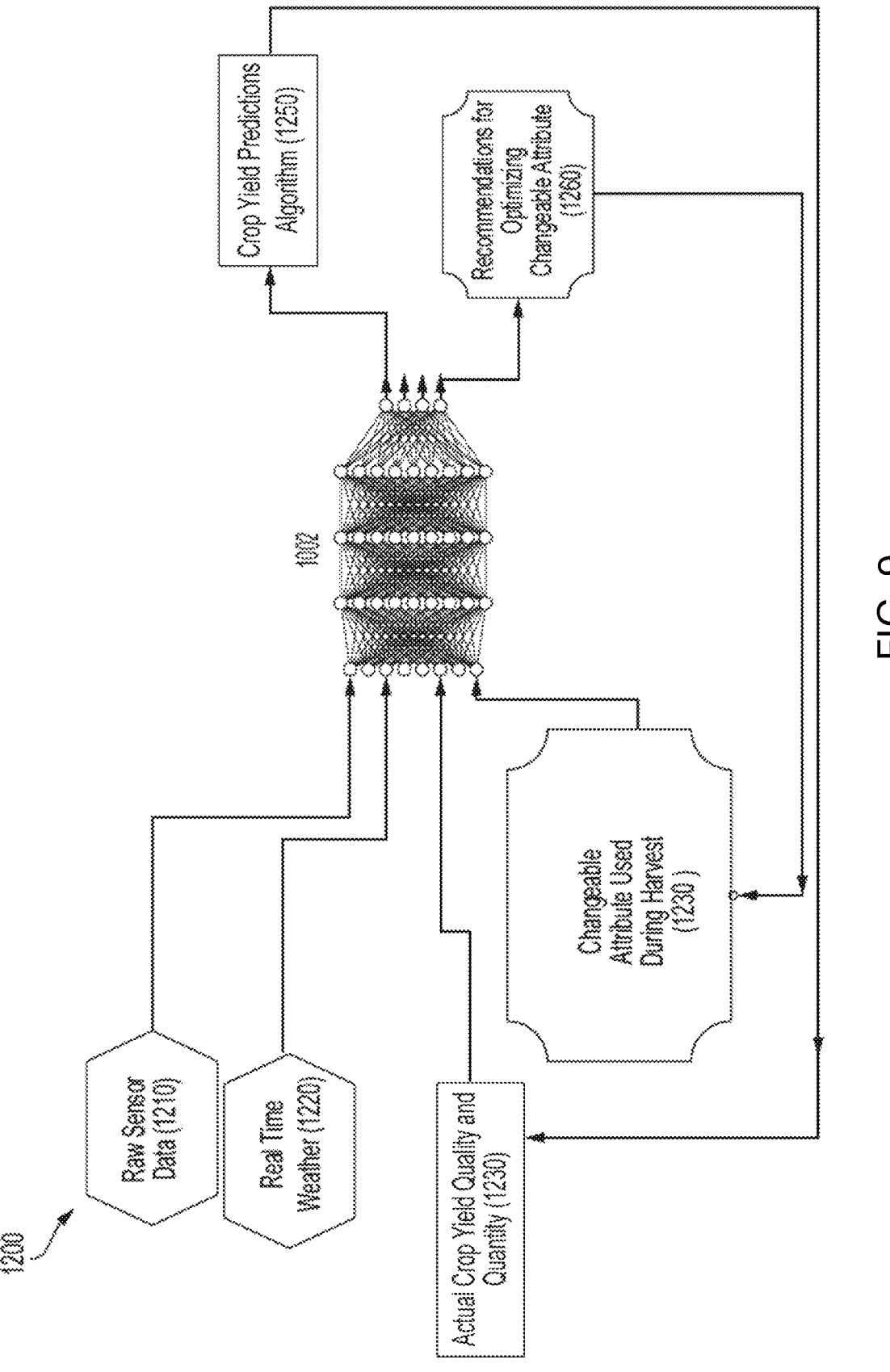
FIG. 9 is an illustration of an exemplary third method for determining a cultivar regimen recommendation using a machine learning algorithm, per some embodiments herein.

FIG. 9 is an illustration of a third method 1200 for determining a cultivar regimen recommendation using a single neural network. In some embodiments, the third method 1200 for determining a cultivar regimen recommendation using a machine learning algorithm employs a single neural network 1002 per cultivar attribute. In some embodiments, as shown, the first neural network 1002 receives raw sensor data 1210, real-time weather data 1220, an actual crop yield quality and quantity 1230, and an implemented changeable attribute used during harvest 1240. In some embodiments, as shown, the first neural network 1002 outputs a crop yield prediction algorithm 1250 and a recommendation for optimizing the changeable attribute 1260. In some embodiments, the recommendation for optimizing the changeable attribute 1260 is implemented as the changeable attribute used during harvest (1240), wherein the attributes are improved and updated as often as possible. In some embodiments, supervised learning is performed to retrain the first neural network 1002. In some embodiments, supervised learning is performed to retrain the first neural network 1002 once per harvest. In some embodiments, as shown, the crop yield prediction algorithm 1250 is compared against the actual yield quality and quantity 1230 to improve crop yield prediction. In some embodiments, more data received by the actual yield quality and quantity 1230 improves the crop yield prediction 1250.

Figure 10:
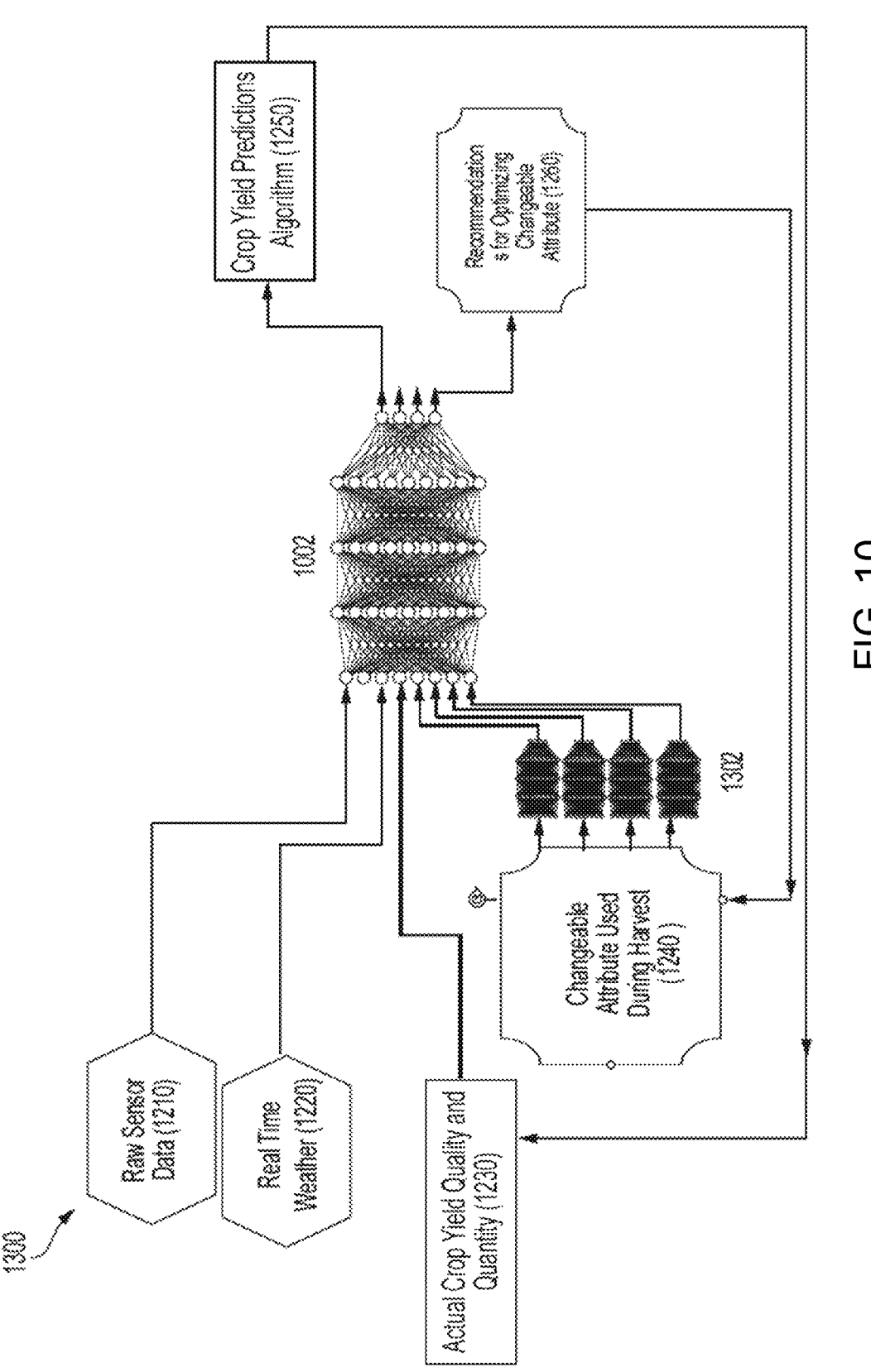
FIG. 10 is an illustration of an exemplary fourth method for determining a cultivar regimen recommendation using a machine learning algorithm, per some embodiments herein.

FIG. 10 is an illustration of a fourth method 1300 for determining a cultivar regimen recommendation using multiple neural networks. In some embodiments, per FIG. 10, each changeable attribute 1240 serves as an input for an attribute dedicated neural network 1300, wherein the output of each dedicated neural network 1300 serves as an input to the first neural network 1002.

Figure 11:
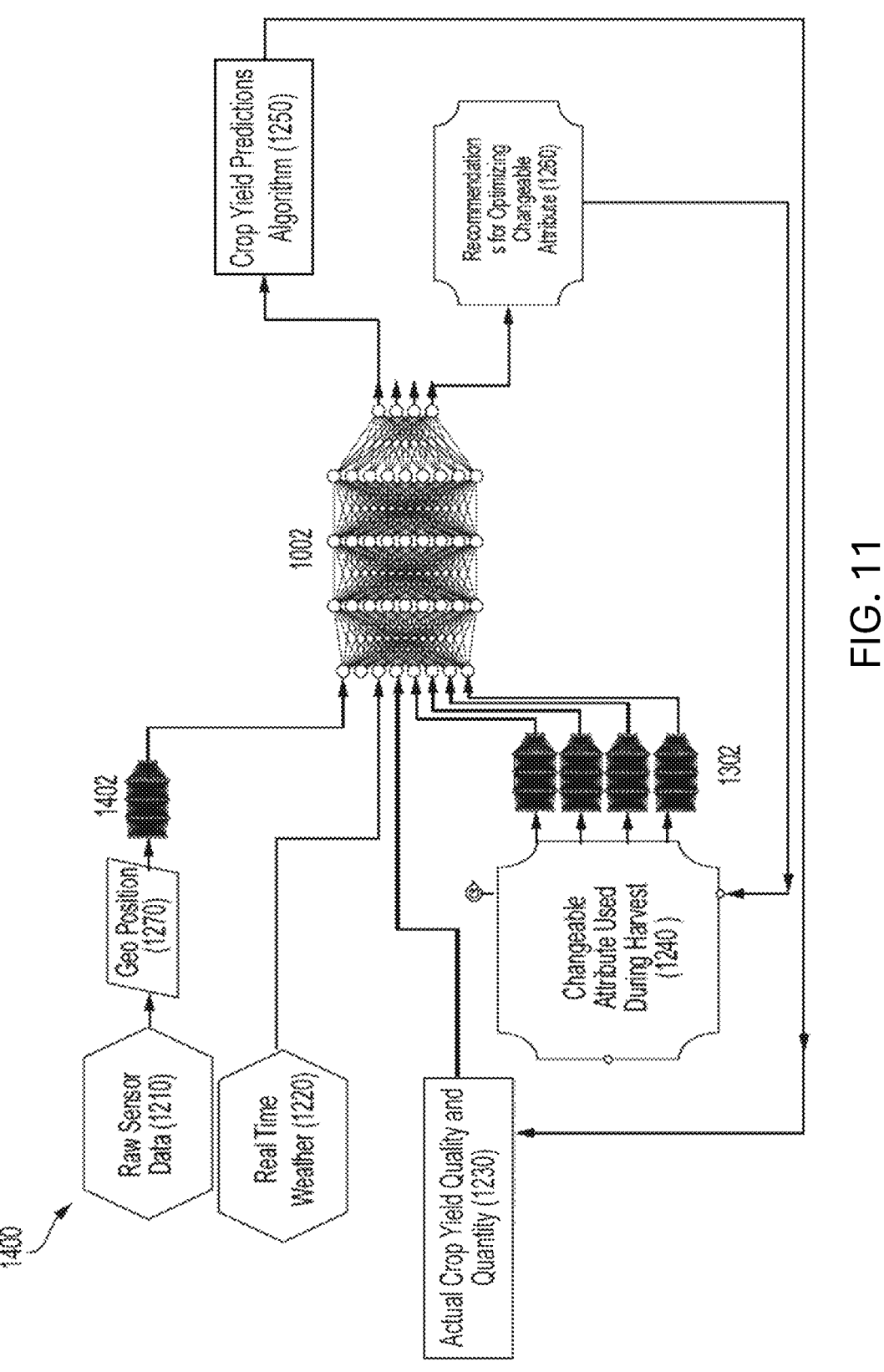
FIG. 11 is an illustration of an exemplary fifth method for determining a cultivar regimen recommendation using a machine learning algorithm, per some embodiments herein.

FIG. 11 is an illustration of a fifth method 1400 for determining a cultivar regimen recommendation using multiple neural networks and one or more dedicated neural networks 1402. In some embodiments, per FIG. 11, the raw sensor data 1210 is appended with a geo-position 1270, which serves as the input for a dedicated neural network 1402, and wherein the output of the sensor data dedicated neural networks 1402 serves as an input to the first neural network 1002. In some embodiments, the fourth method 1400 employs two or more raw sensor data inputs 1210, wherein each raw sensor data inputs 1210 is appended with its associated geo-position 1270, and input into a dedicated neural network 1402 dedicated to analyzing one data input 1210. In some embodiments, each dedicated neural network 1402 is dedicated to analyzing one data input 1210. In some embodiments, each dedicated neural network 1402 is dedicated to analyzing two or more data inputs 1210.

In one example, the raw sensor data 1210 comprises a light quantity, a light quality, and a temperature. In one example, the implemented changeable attribute used during harvest 1230 comprises a fertilization type, a fertilization quantity, a fertilization type, an irrigation quantity, an irrigation type, a resource allocation, a pesticide type, a pesticide quantity, a global position data, a pruning type, a pruning quantity, a harvest date, a harvest quantity, or any combination thereof. In some embodiments, the first neural network comprises one input node for each implemented changeable attribute used during harvest 1230.

Machine Learning

In some embodiments, machine learning algorithms are utilized to aid determining a cultivar regimen recommendation for a crop. In some embodiments, the first machine learning algorithm is used to determine an agricultural relationship between one or more of the cultivar instructions, a crop, and an associated historical categorical crop yield.

Figure 6:
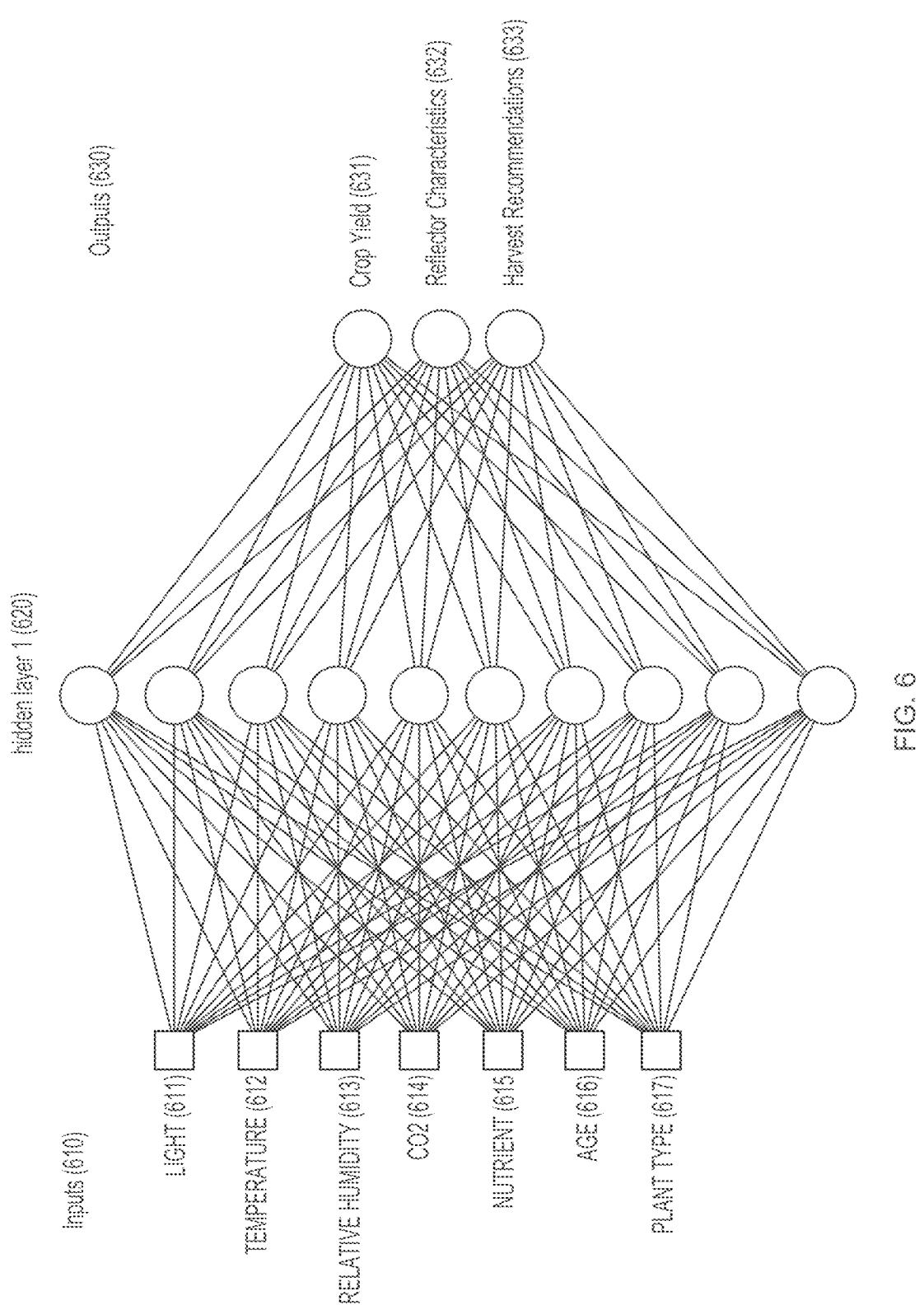
FIG. 6 is an illustration of an exemplary machine learning algorithm, per some embodiments herein.

In some embodiments, per FIG. 6, the machine learning algorithm employs a neural network comprising inputs 610, a hidden layer 620, and outputs 630. In some embodiments, the exemplary inputs 610 shown therein comprise a light quantity 611, temperature 612, relative humidity 613, irrigation quantity (e.g., water consumption from a resource), a $CO_2$ level 614, a nutrient measurement 615, a plant age 616, a plant type 617, or any combination thereof. In some embodiments, the outputs 630 comprise a crop yield 631, a reflector characteristic 632, a harvest recommendation 633, or any combination thereof. In some embodiments, as shown, the neural network employs 10 hidden nodes. Alternatively, in some embodiments, the neural network employs 3, 4, 5, 6, 7, 8, 9, 11, 12, 13, 14, or 15 hidden nodes. In some embodiments, the neural network employs at least 3, 4, 5, 6, 7, 8, 9, 10, 11, 12, 13, 14, or 15 hidden nodes. In some embodiments, the neural network employs at most 3, 4, 5, 6, 7, 8, 9, 10, 11, 12, 13, 14, or 15 hidden nodes. In some embodiments, as shown, the neural network employs 1 hidden layer 620. Alternatively, in some embodiments, the neural network employs 2, 3, 4, 5, 6, or more hidden layers 620. In some embodiments, the inputs 610 comprise 3, 4, 5, 6, 7, 8, 9, 10, 12, 14, 16, 18, 20, or more inputs, including increments therein.

In some embodiments, the first machine learning algorithm, the second machine learning algorithm or both employ one or more forms of labels including but not limited to human annotated labels and semi-supervised labels. The human annotated labels can be provided by a hand-crafted heuristic. For example, the hand-crafted heuristic can comprise examining differences between regimens and yields. The semi-supervised labels can be determined using a clustering technique to find properties similar to those flagged by previous human annotated labels and previous semi-supervised labels. The semi-supervised labels can employ a XGBoost, a neural network, or both.

In some embodiments, the first machine learning algorithm, the second machine learning algorithm or both employ a distant supervision method. The distant supervision method can create a large training set seeded by a small hand-annotated training set. The distant supervision method can comprise positive-unlabeled learning with the training set as the 'positive' class. The distant supervision method can employ a logistic regression model, a recurrent neural network, or both. The recurrent neural network can be advantageous for Natural Language Processing (NLP) machine learning.

Examples of machine learning algorithms can include a support vector machine (SVM), a naïve Bayes classification, a random forest, a neural network, deep learning, or other supervised learning algorithm or unsupervised learning algorithm for classification and regression. The machine learning algorithms can be trained using one or more training datasets.

In some embodiments, the machine learning algorithm utilizes regression modeling, wherein relationships between predictor variables and dependent variables are determined and weighted. In one embodiment, for example, a yield can be a dependent variable and is derived from the regimen. In another embodiment, the yield a dependent variable derived from the crop. In yet another embodiment, the regimen is a dependent variable derived from the crop.

In some embodiments, a machine learning algorithm is used to select catalogue images and recommend project scope. A non-limiting example of a multi-variate linear regression model algorithm is seen below: probability=$A0$+$A1$ $(X1)$+$A2(X2)$+$A3(X3)$+$A4(X4)$+$A5(X5)$+$A6(X6)$+$A7$ $(X7)$ . . . wherein $Ai$ ($A1, A2, A3, A4, A5, A6, A7, \ldots$) are "weights" or coefficients found during the regression modeling; and $Xi$ ($X1, X2, X3, X4, X5, X6, X7, \ldots$) are data collected from the User. Any number of $Ai$ and $Xi$ variable can be included in the model. For example, in a non-limiting example wherein there are 7 $Xi$ terms, $X1$ is the number of crops, $X2$ is the number of instructions, and $X3$ is the yield. In some embodiments, the programming language "R" is used to run the model.]

In some embodiments, training comprises multiple steps. In a first step, an initial model is constructed by assigning probability weights to predictor variables. In a second step, the initial model is used to "recommend" a regimen. In a third step, the training module accepts verified yield data feeds back the yield data. At least one of the first step, the second step, and the third step can repeat one or more times continuously or at set intervals.

Training of Machine Learning Algorithms

In some embodiments, the first machine learning algorithm is trained by: collecting from a database a plurality of historical growing conditions, wherein each historical growing condition comprises a historical cultivar condition and a historical cultivar regimen, and wherein the historical growing condition is associated with a historical crop yield; creating a first training set comprising: a first plurality the collected historical growing conditions wherein each historical growing condition is associated with the historical crop yield; and a second plurality the collected historical growing conditions wherein each historical growing condition is disassociated from the historical crop yield; training the neural network in a first stage using the first training set to determine a predicted crop yield; creating a second training set for a second stage of training comprising the first training set and one or more of the second plurality of the collected historical growing conditions wherein a difference between the determined crop yield and the predicted crop yield is greater than a set amount; and training the neural network in a second stage using the second training set.

Alternatively, in some embodiments, the first machine learning algorithm is trained by: creating an initial cultivar model by assigning a probability weight to each of two or more predictor variables, the two or more predictor variable comprising: a historical cultivar condition; and a historical cultivar regimen; using the initial cultivar model to determine a predicted historical crop yield. receiving a historical crop yield; and adjusting the probability weights based on the verified historical crop yield and the predicted historical crop yield.

In some embodiments, the second machine learning algorithm is trained by: creating an initial categorical model by assigning a probability weight to each of the plurality of cultivar instructions; using the initial categorical model to determine a predicted categorical crop yield. receiving a verified categorical crop yield; and adjusting the probability weights based on the verified categorical crop yield and the predicted categorical crop yield.

Agricultural Relationships

In some embodiments, the agricultural relationship is a correlation between one or more of the cultivar instructions, the crop, and the associated historical categorical crop yield. In some embodiments, the agricultural relationship is a correlation between one or more of the cultivar instructions in a historical regimen category. In some embodiments, the agricultural relationship is a correlation between one or more of the cultivar instructions in a historical cultivar regimen.

In some embodiments, the agricultural relationship comprises a probability weight assigned to each of the one or more of the cultivar instructions, the crop, and the associated historical categorical crop yield. In some embodiments, the agricultural relationship comprises a probability weight assigned to each of the one or more cultivar instructions in a historical regimen category. In some embodiments, the agricultural relationship comprises a probability weight assigned to each of the one or more of the cultivar instructions in a historical cultivar regimen.

In some embodiments, the agricultural relationship is determined by the second machine learning algorithm herein. In some embodiments, the agricultural relationship is provided by an expert in the crop, and expert in the cultivar instruction, or both. In some embodiments, the agricultural relationship enables improves the accuracy and precision of the first machine learning algorithm to determine the cultivar regimen recommendation. In some embodiments, the agricultural relationship enables improves the accuracy and precision of the first machine learning algorithm to determine the cultivar regimen recommendation by providing the correlation between each of the cultivar instructions in a regimen category.

Sensors

Figure 12:
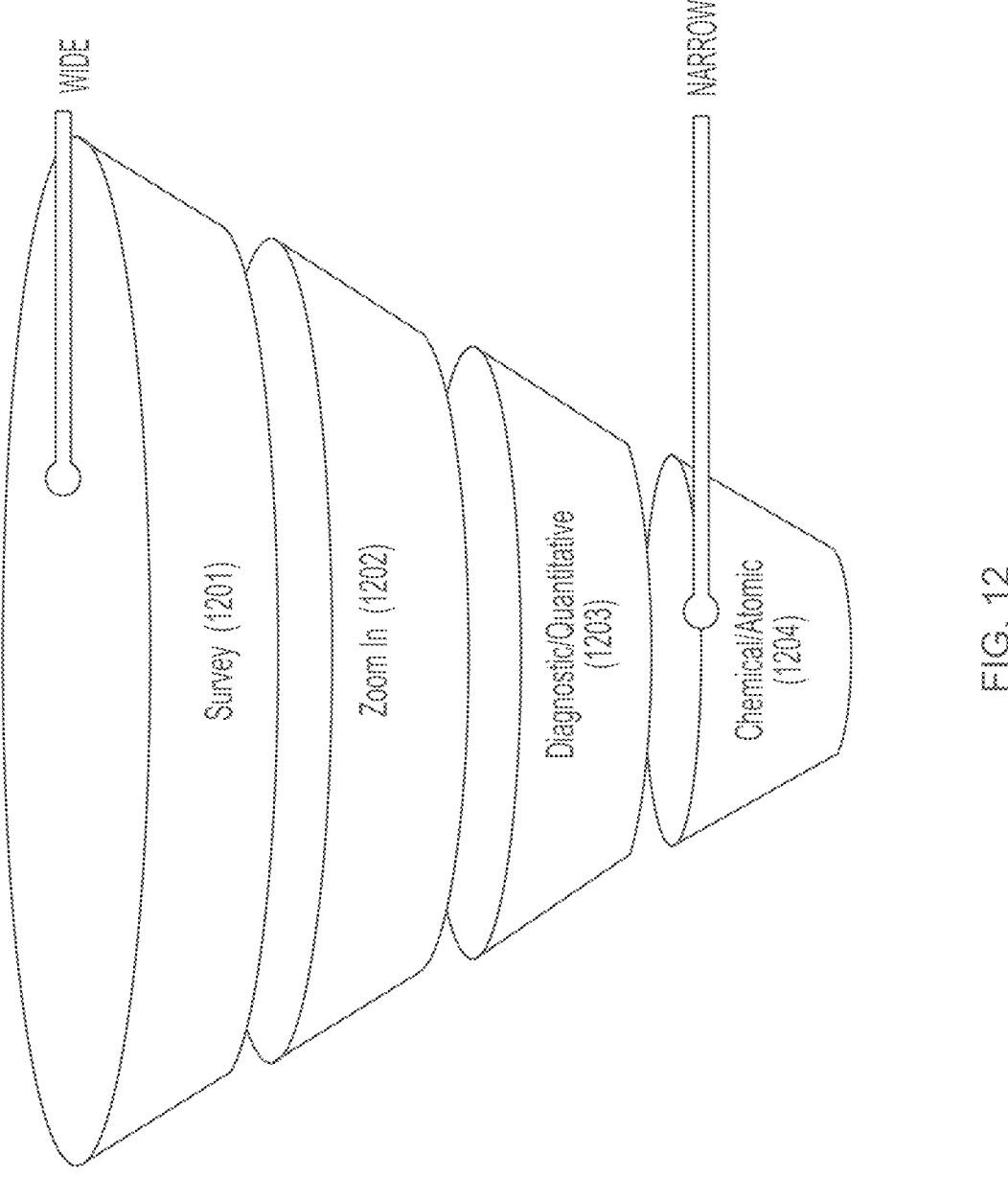
FIG. 12 is an illustration of an exemplary hierarchy of IoT sensors, per some embodiments herein.

FIG. 12 shows an exemplary hierarch of sensors. In some embodiments, the hierarchy comprises surveying 1201, zooming in 1202, diagnosing/quantifying 1203, and chemical/atomic analysis 1204 via sensors and imaging. In some embodiments, the broad surveying sensors for imaging and sensing encompasses a wide field of view, can be measured quickly, and with lower. equipment cost. In some embodiments, by comparison, the chemical/atomic sensors for imaging and sensing enable higher accuracy and specificity, but require more cost. In some embodiments, employing different combinations of broad and narrow sensor technologies enable optimized analysis of growing conditions and yields.

Figure 13:
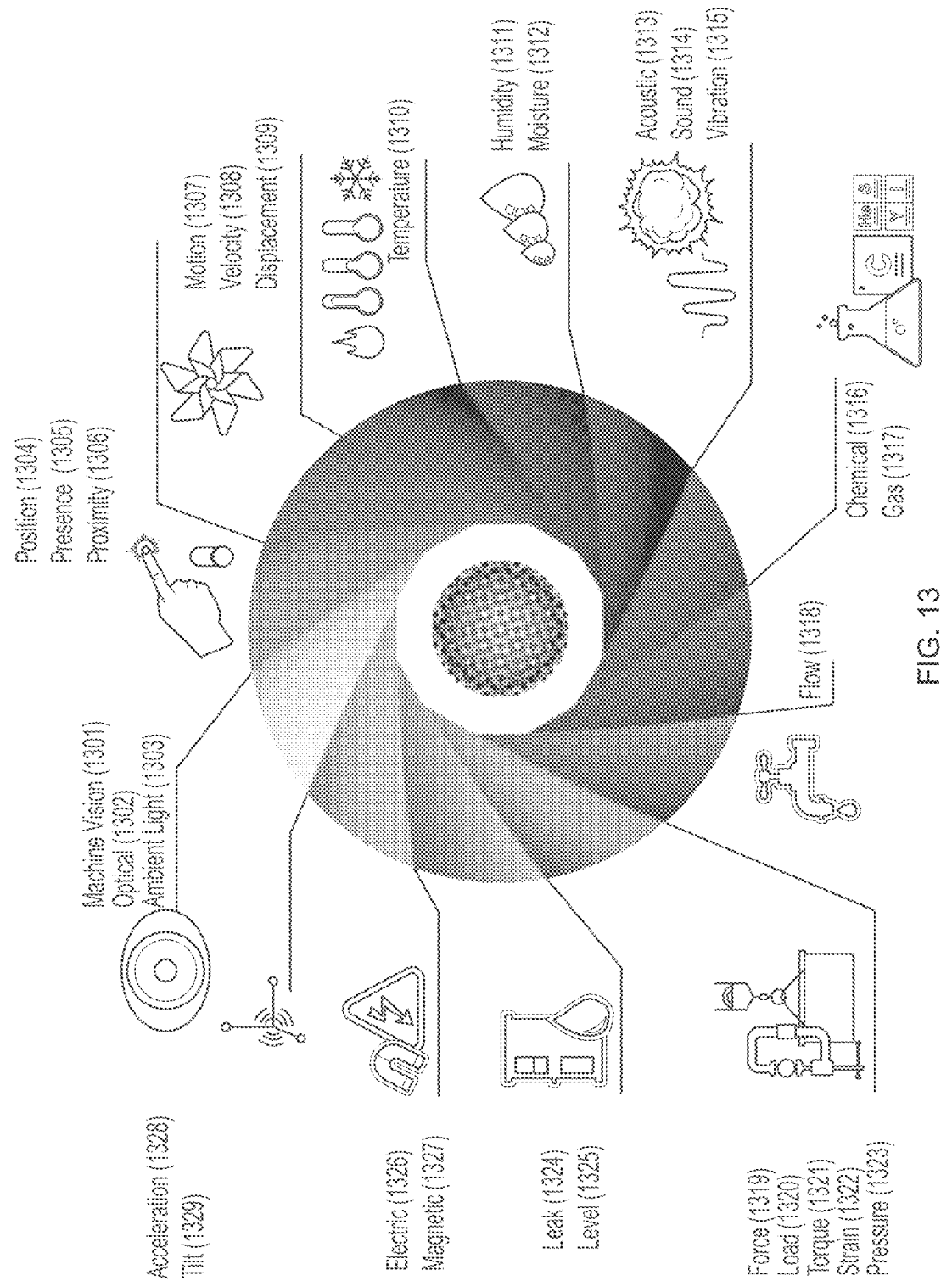
FIG. 13 is an illustration of exemplary of IoT sensors, per some embodiments herein.

FIG. 13 shows an exemplary spectrum of wide-ranging IoT sensors considered for the platform. In some embodiments, the sensors comprise a machine vision sensor 1301, an optical sensor 1302, an ambient light sensor 1303, a position sensor 1304, a presence sensor 1305, a proximity sensor 1306, a motion sensor 1307, a velocity sensor 1308, a displacement sensor 1309, a temperature sensor 1310, a humidity sensor 1311, a moisture sensor 1312, an acoustic sensor 1313, a sound sensor 1314, a vibration sensor 1315, a chemical sensor 1316, a gas sensor 1317, a flow sensor 1318, a force sensor 1319, a load sensor 1320, a torque sensor 1321, a strain sensor 1322, a pressure sensor 1323, a leak sensor 1324, a level sensor 1325, an electric sensor 1326, a magnetic sensor 1327, an acceleration sensor 1328, a tilt sensor 1329, or any combination thereof. As noted previously, the sensors can be applied for measuring both cultivar parameters and growth conditions; wherein the cultivar parameters can include, by way of non-limiting examples, a growth speed, a plant size, a leaf diameter, a plant height, a plant mass, a leaf color, a leaf shape, a plant stem water potential, a plant color, a plant shape, a plant condition, a fruit size, a fruit color, a fruit ripeness, a fruit acidity, a fruit antioxidant content, a fruit sugar content, a fruit yield, a root growth rate, a root biomass, a root water content, a root depth, a root volume, a root size, a root density, root defect, or any combination thereof.

In some embodiments, increasing the number and variety of sensors improves the ability to predict yield and optimal growing conditions. In some embodiments, increasing the number and variety of sensors improves the ability to predict and calculate an amount of $CO_2$ sequestered via a crop yield. Further, the sensors can be applied to growth conditions which can include, by way of non-limiting examples, a wind speed, a wind direction, a rainfall quantity, a soil moisture level, a light intensity, a light angle, a light quality, a relative humidity level, an oxygen level, a carbon dioxide level, a nitrogen level, a chemical level, a soil color, a soil condition or chemical makeup, a pest condition, or a temperature.

In some embodiments, the current cultivar condition is received from a sensor, a weather information service, or both. In some embodiments, the current cultivar condition is received from one or more sensors. In some embodiments, the current cultivar condition is received by 2, 3, 4, 5, 6, 7, 8, 9, 10, 20, 30, 40, 50, 60, 70,80, 90, 100, 200, or more a sensors, including increments therein. In some embodiments, the sensor is an internet of things sensor. In some embodiments, the current cultivar condition is received via a wireless connection. In some embodiments, the wireless connection is a Wi-Fi wireless connection, a Bluetooth wireless connection, a cellular wireless connection, a satellite wireless connection, or any combination thereof. In some embodiments, the current cultivar condition is received via a wired connection.

In some embodiments, the sensor is coupled to the crop, a soil surrounding the crop, a remote operated vehicle (ROV), an aerial drone, a balloon, or any combination thereof. In some embodiments, the application is further configured to output the cultivar condition for display on a dashboard, data analysis, or both. In some embodiments, the application is further configured to emit an alarm if one or more of the plurality of current cultivar conditions is outside a predetermined range. In some embodiments, the sensor is stationary. In some embodiments, the sensor is mobile. In some embodiments, multiple sensors are attached to a single crop. In some embodiments, the sensor or sensors are attached to the canopy of the plant, a fruit of the plant, a stem of the plant, a base of the plant, a soil around the plant, the roots of the plant, or any combination thereof.

In some embodiments, one or more of the sensors records data continuously. In some embodiments, one or more of the sensors records data periodically. In some embodiments, one or more of the sensors records data with a periodicity of about 1, 2, 5, 10, 20, 30, 40, 50, 60 or more seconds, including increments therein. In some embodiments, one or more of the sensors records data with a periodicity of at least about 1, 2, 5, 10, 20, 30, 40, 50, 60 or more seconds, including increments therein. In some embodiments, one or more of the sensors records data with a periodicity of about 1, 2, 5, 10, 15, 20, 30, 40, 50, 60 or more minutes, including increments therein. In some embodiments, one or more of the sensors records data with a periodicity of at least about 1, 2, 5, 10, 15, 20, 30, 40, 50, 60 or more minutes, including increments therein. In some embodiments, one or more of the sensors records data with a periodicity of about 1, 2, 5, 10, 15, 20, 30, 40, 50, 60 or more hours, including increments therein. In some embodiments, one or more of the sensors records data with a periodicity of at least about 1, 2, 5, 10, 15, 20, 30, 40, 50, 60 or more hours, including increments therein. In some embodiments, one or more of the sensors records data with a periodicity of about 1, 2, 5, 10, 15, 20, 30, 40, 50, 60 or more days, including increments therein. In some embodiments, one or more of the sensors records data with a periodicity of at least about 1, 2, 5, 10, 15, 20, 30, 40, 50, 60 or more days, including increments therein. In some embodiments, one or more of the sensors records data with a periodicity of about 1, 2, 5, 10, 15, 20, 30, 40, 50, 60 or more weeks, including increments therein. In some embodiments, one or more of the sensors records data with a periodicity of at least about 1, 2, 5, 10, 15, 20, 30, 40, 50, 60 or more weeks, including increments therein.

In some embodiments, the current cultivar condition is received in real-time or near real-time. In some embodiments, the current cultivar condition is received periodically.

In various embodiments, the period is about 1 minute, 5 minutes, 10 minutes, 15 minutes, 30 minutes, 1 hour, 2 hours, 6 hours, 12 hours, 1 day, 2 days, 3 days, or 1 week, including increments therein. In some embodiments, the period is at least about 1 minute, 5 minutes, 10 minutes, 15 minutes, 30 minutes, 1 hour, 2 hours, 6 hours, 12 hours, 1 day, 2 days, 3 days, or 1 week, including increments therein. In some embodiments, the period is at most about 1 minute, 5 minutes, 10 minutes, 15 minutes, 30 minutes, 1 hour, 2 hours, 6 hours, 12 hours, 1 day, 2 days, 3 days, or 1 week, including increments therein. In some embodiments, the real time or periodic cultivar condition measurement ensures that the methods, systems, media, and the machine learning algorithms therein can most accurately predict crop yields and cultivar regimen recommendations.

In some embodiments, the sensor comprises any sensor configured to measure any one or more of the cultivar conditions described herein of at least a portion of one or more plants. In some embodiments, the sensor comprises any sensor configured to measure any one or more of the cultivar conditions described herein of an atmosphere surrounding at least a portion of one or more plants. In some embodiments, the sensor is configured to measure a wind speed, a wind direction, a gust speed, a gust direction, a rainfall quantity, a soil moisture, a light measurement, a humidity, a crop dimension, subsurface plant and/or tree root growth and propagation, above surface plant and/or tree growth and propagation (for e.g., plant stem, tree trunk), soil textural properties (e.g., lithology of soil), soil temperature, soil ion concentration, soil pore fluid composition, a soil pH, a gamma-ray measurement, a picture, an audio track, a video, digital ortho photography (e.g. obtained via aerial imagery or satellite imagery) a chemical composition, an atmospheric pressure, an $O_2$ quantity, a $N_2$ quantity, a $CO_2$ quantity, a sporadic light measurement, a fruit growth measurement, a reflectance, an infrared measurement, a mid-infrared measurement, near-infrared measurement, a fruit density, a GPS position, a temperature, or any combination thereof. In some embodiments, the light measurement comprises a light quality. In some embodiments, the light quality comprises a light intensity, a diurnal dynamic, a spectral quality, a diffusiveness, or any combination thereof. In some embodiments, the sensor is a Phytech sensor. In some embodiments, the sensor is a SeeTree sensor.

In some embodiments, the sensor comprises at least one of a wind gauge, a rain gauge, a soil moisture gauge, a light gauge, a humidity gauge, a stem water potential dendrometer, a dendrometer, a Ground Penetrating Radar (GPR), a GPS sensor, a pH meter, a gamma-ray sensor, a camera, a microphone, a video camera, a hyperspectral camera, an aerial camera, a satellite imaging device, a chemical sensor, an atmospheric pressure sensor, an $O_2$ sensor, a $N_2$ sensor, a $CO_2$ sensor, a sporadic light sensor, a fruit growth sensor, a reflectance sensor, an infrared sensor, an irrigation sensor, a mid-infrared sensor, near-infrared sensor, a fruit density sensor, a thermometer, or any combination thereof. In some embodiments, the light sensor measures a light quality. In some embodiments, the light quality comprises a light intensity, a diurnal dynamic, a spectral quality, a diffusiveness, or any combination thereof. In some embodiments, the GPS location has a resolution of about 0.15 meters to about 5 meters.

Cultivar Conditions

In some embodiments, the cultivar condition is a current cultivar condition associated with a present or near-present condition of at least a portion of a plant. In some embodiments, the cultivar condition is a current cultivar condition associated with a present or near-present condition of an atmosphere surrounding at least a portion of one or more plants. In some embodiments, the near-present condition is within about at most about 30 seconds, 1 minute, 2 minutes, 5 minutes, 10 minutes, 15 minutes, 30 minutes, 1 hour, 2 hours, 3 hours, 4 hours, 5, hours, 6 hours, 1 day, 2, days or more from the present time, including increments therein. In some embodiments, the near-present condition is within about at least about 30 seconds, 1 minute, 2 minutes, 5 minutes, 10 minutes, 15 minutes, 30 minutes, 1 hour, 2 hours, 3 hours, 4 hours, 5, hours, 6 hours, 1 day, 2, days or more from the present time, including increments therein. In some embodiments, the current cultivar condition is received from a remote monitoring source. In one example the remote monitoring source is a weather monitoring source, wherein the current cultivar condition is a temperature, a humidity, a wind speed, a wind direction, a rain quantity, a snow quantity, a hail quantity, or any combination thereof.

In some embodiments, the current cultivar condition, the historical cultivar condition, or both comprises a condition of a single plant. In some embodiments, the current cultivar condition, the historical cultivar condition, or both comprises a condition of a plurality of plants. In some embodiments, the current cultivar condition, the historical cultivar condition, or both comprises a condition of a field of plants. In some embodiments, the plurality of plants comprise a plant of one crop and a plant of another crop. In some embodiments, the field of plants comprises a plant of one crop and a plant of another crop. In some embodiments, a density of the placement of the sensors within the plant or field of plants ensures that the methods, systems, media, and the machine learning algorithms therein can most accurately predict crop yields and cultivar regimen recommendations.

In some embodiments, the current cultivar condition, the historical cultivar condition, or both comprises a wind speed, a wind direction, a gust speed, a gust direction, a rainfall quantity, a soil moisture, a light measurement, a humidity, a crop dimension, a soil pH, subsurface plant and/or tree root growth and propagation, above surface plant and/or tree growth and propagation (for e.g., plant stem, tree trunk), soil textural properties (e.g., lithology of soil), soil temperature, soil ion concentration, soil pore fluid composition, a gamma-ray measurement, a picture, an audio track, a video, aerial imagery, satellite imagery, a chemical composition, an atmospheric pressure, an $O_2$ quantity, a $N_2$ quantity, a $CO_2$ quantity, a sporadic light measurement, a fruit growth measurement, a reflectance, an infrared measurement, a mid-infrared measurement, near-infrared measurement, a fruit density, a quantitative amount of fruit produced, a GPS position, a temperature, or any combination thereof.

Cultivar Regimen Recommendations

In some embodiments, the cultivar regimen comprises a cultivar regimen recommendation, wherein at least a portion of the cultivar regimen recommendation has not yet been implemented on a crop. In some embodiments, the cultivar regimen comprises a cultivar regimen recommendation, wherein at least a portion of the cultivar regimen recommendation is currently being implemented on a crop. In some embodiments, the cultivar regimen comprises a historical cultivar regimen, wherein at least a portion of the historical cultivar regimen has already been implemented on a crop. In some embodiments, the historical cultivar regimen is stored in a database. In some embodiments, the historical cultivar regimen is received from the database.

In some embodiments, the methods and algorithms herein the delivery of enable accurate cultivar regimen recommendation with a periodicity that is vastly greater than, or vastly less than a periodicity of the sensor measurement and/or the crop cycle. In some embodiments, the cultivar regimen recommendation is provided every 1, 2, 3, 4, 5, 6, 7, 8, 9, 10, or more days. In some embodiments, the cultivar regimen recommendation is provided every 1, 2, 3, 4, 5, 6, 7, 8, 9, 10, or more weeks. In some embodiments, the cultivar regimen recommendation is provided every 1, 2, 3, 4, 5, 6, 7, 8, 9, 10, or more months.

In some embodiments, the cultivar regimen recommendation, the historical cultivar regimen, or both comprises an adjustment of the cultivar of a single plant. In some embodiments, the cultivar regimen recommendation, the historical cultivar regimen, or both comprises an adjustment of the cultivar of a plurality of plants. In some embodiments, the cultivar regimen recommendation, the historical cultivar regimen, or both comprises an adjustment of the cultivar of a field of plants. In some embodiments, the amount of plants associated with each cultivar regimen recommendation may be determined based on the density of sensors with respect to each plant or the field of plants. In some embodiments, a decreased amount of plants associated with each cultivar regimen recommendation enables a more customized cultivar recommendation for each plant based on their location and current condition.

In some embodiments, the historical cultivar regimen comprises one or more historical regimen categories. In some embodiments, the historical regimen category comprises a fertilization category, an irrigation category, a resource allocation category, a pesticide category, a positional data category, a pruning category, a harvest, or any combination thereof. In some embodiments, each historical cultivar instruction is associated with a crop and a historical categorical crop yield. In some embodiments, the recommended cultivar regimen comprises one or more recommended regimen categories. In some embodiments, the recommended regimen category comprises a fertilization category, an irrigation category, a resource allocation category, a pesticide category, a positional data category, a geographical location data category, a pruning category, a harvest, or any combination thereof. In some embodiments, the historical cultivar category, the recommended cultivar category, or both comprises a category related to a single crop. In some embodiments, the historical cultivar category, the recommended cultivar category, or both comprises a category related to one or more crops.

In some embodiments, each historical regimen category comprises a plurality of historical cultivar instructions. In some embodiments, each of the historical cultivar instructions in the same category are interrelated. In some embodiments, each of the historical cultivar instructions in the same category are independent. In some embodiments, the historical category instruction, the recommended cultivar instruction, or both comprises a category related to a single crop. In some embodiments, the historical category instruction, the recommended cultivar instruction, or both comprises a category related to one or more crops.

In some embodiments, the historical fertilization category comprises one or more of a historical fertilizer quantity instruction, a historical fertilizer type instruction, a historical fertilizer application time instruction, and a historical fertilizer application period instruction. In some embodiments, the historical irrigation category comprises one or more of a historical irrigation quantity instruction, a historical irrigation direction instruction, a historical irrigation time instruction, and a historical irrigation application period instruction. In some embodiments, the historical resource allocation category comprises one or more of a historical resource type instruction, a historical resource time allocation instruction, a historical resource range instruction, a historical resource fuel cost instruction, and a historical resource lifespan instruction. In some embodiments, the historical pesticide category comprises one or more of a historical pesticide quantity instruction, a historical pesticide type instruction, a historical pesticide application time instruction, and a historical pesticide application period instruction. In some embodiments, the historical positional data category comprises one or more of a historical sunshine area instruction, a historical shade area instruction, a historical wind area instruction, a historical rain area instruction, and a historical slope instruction. In some embodiments, the historical geographical location data category comprises one or more of historical soil property instruction, and a historical textural subsurface condition instruction. In some embodiments, the historical pruning category comprises one or more of a historical pruning time instruction, a historical pruning quantity instruction, a historical pruning location instruction, and a historical pruning period instruction. In some embodiments, the historical harvest category comprises one or more of a historical harvest time instruction, a historical harvest quantity instruction, a historical harvest location instruction, and a historical pruning period instruction.

In some embodiments, each recommended regimen category comprises a plurality of recommended cultivar instructions. In some embodiments, each of the recommended cultivar instructions in the same category are interrelated. In some embodiments, each of the recommended cultivar instructions in the same category are independent. In some embodiments, the recommended fertilization category comprises one or more of a recommended fertilizer quantity instruction, a recommended fertilizer type instruction, a recommended fertilizer application time instruction, and a recommended fertilizer application period instruction. In some embodiments, the recommended irrigation category comprises one or more of a recommended irrigation quantity instruction, a recommended irrigation direction instruction, a recommended irrigation time instruction, and a recommended irrigation application period instruction. In some embodiments, the recommended resource allocation category comprises one or more of a recommended resource type instruction, a recommended resource time allocation instruction, a recommended resource range instruction, a recommended resource fuel cost instruction, and a recommended resource lifespan instruction. In some embodiments, the recommended pesticide category comprises one or more of a recommended pesticide quantity instruction, a recommended pesticide type instruction, a recommended pesticide application time instruction, and a recommended pesticide application period instruction. In some embodiments, the recommended positional data category comprises one or more of a recommended sunshine area instruction, a recommended shade area instruction, a recommended wind area instruction, a recommended rain area instruction, and a recommended slope instruction. In some embodiments, the recommended geographical location data category comprises one or more of recommended soil property instructions, and a recommended textural subsurface condition instruction. In some embodiments, the recommended pruning category comprises one or more of a recommended pruning time instruction, a recommended pruning quantity instruction, a recommended pruning location instruction, and a recommended pruning period instruction. In some embodiments, the recommended harvest category comprises one or more of a recommended harvest time instruction, a recommended harvest quantity instruction, a recommended harvest location instruction, and a recommended pruning period instruction.

In some embodiments, the cultivar regimen recommendation, the historical cultivar regimen, or both, comprises a fertilizer quantity adjustment, a fertilizer type adjustment, a pruning quantity adjustment, a pruning location adjustment, a pesticide quantity adjustment, a pesticide type adjustment, a planting date adjustment, a harvesting date adjustment, an irrigation quantity adjustment, an irrigation time of day adjustment, an irrigation schedule adjustment, a crop type adjustment, a subsurface and/or above surface properties adjustment, a crop location adjustment, or any combination thereof.

In some embodiments, performing a cultivar regimen recommendation on the crop comprises a fertilizer quantity adjustment, performing a fertilizer type adjustment, performing a pruning quantity adjustment, performing a pruning location adjustment, performing a pesticide quantity adjustment, performing a pesticide type adjustment, performing a planting date adjustment, performing a harvesting date adjustment, performing an irrigation quantity adjustment, performing an irrigation time of day adjustment, performing an irrigation schedule adjustment, performing a crop type adjustment, performing a subsurface and/or above surface properties adjustment, performing a crop location adjustment, or any combination thereof.

In some embodiments, the cultivar regimen recommendation comprises a reflection adjustment recommendation comprising a modification of a reflective property of a reflective surface configured to reflect light to a plant. In some embodiments, the cultivar regimen recommendation comprises a reflection adjustment recommendation comprising a modification of a reflective property of a reflective surface of the light directing platforms described herein. In some embodiments, the reflective property comprises at least one of a light direction, a light wavelength range, a light intensity, or a light concentration. In some embodiments, the light comprises at least one of a modifiable light, sunlight, UV light, IR light, an electric light, or an LED light.

In some embodiments, the cultivar regimen recommendation comprises displaying a text or icon-based recommendation. In some embodiments, the cultivar regimen recommendation comprises an automated action performed by one or more machines. In some embodiments, the automated action comprises a fertilizer quantity adjustment, performing a fertilizer type adjustment, performing a pruning quantity adjustment, performing a pruning location adjustment, performing a pesticide quantity adjustment, performing a pesticide type adjustment, performing a planting date adjustment, performing a harvesting date adjustment, performing an irrigation quantity adjustment, performing an irrigation time of day adjustment, performing an irrigation schedule adjustment, performing a crop type adjustment, performing a subsurface and/or above surface properties adjustment, performing a crop location adjustment, a light adjustment, a plant location adjustment, or any combination thereof.

Crop Yield

In some embodiments, the verified crop yield comprises a crop yield quantity, a crop yield quality, or both. In some embodiments, the verified crop categorical yield comprises a crop yield quantity, a crop yield quality, or both. In some embodiments, the historical crop yield comprises a crop yield quantity, a crop yield quality, or both.

In some embodiments, the verified crop yield comprises a measured crop yield after the cultivar regimen recommendation has been performed on a crop. In some embodiments, the verified crop yield comprises a measured crop yield after a cultivar instruction has been performed on a plurality of crops. In some embodiments, the verified crop yield comprises a measured crop yield after a plurality of cultivar instruction in a historical regimen category has been performed on a crop. In some embodiments, the verified crop yield comprises a measured crop yield from a past harvesting cycle.

In some embodiments, the verified crop categorical yield comprises a measured crop yield after a cultivar instruction has been performed on a crop. In some embodiments, the verified crop categorical yield comprises a measured crop yield after a plurality of cultivar instruction in a historical regimen category has been performed on a crop. In some embodiments, the verified crop categorical yield comprises a measured crop yield from a past harvesting cycle.

In some embodiments, the historical crop yield comprises a measured crop yield after the cultivar regimen recommendation has been performed on a crop. In some embodiments, the historical crop yield comprises a measured crop yield after a cultivar instruction has been performed on a crop. In some embodiments, the historical crop yield comprises a measured crop yield after a plurality of cultivar instruction in a historical regimen category has been performed on a crop. In some embodiments, the historical crop yield comprises a measured crop yield from a past harvesting cycle.

In various embodiments, the crop yield quality comprises a growth speed, a plant size, a leaf diameter, a plant height, a plant mass, a leaf color, a leaf shape, a plant stem water potential, a plant color, a plant shape, a plant condition, a fruit size, a fruit color, a fruit ripeness, a fruit acidity, a fruit antioxidant content, a fruit sugar content, a fruit density, a GPS position, a foliage density, a stem elongation rate, a reflectance spectra, a fruit density, a GPS position, an acid content, a dry matter content, a root growth rate, a root biomass, a root water content, a root depth, a root volume, a root size, a root density, root defects, a foliage reflectance spectra, a normalized difference vegetation index, an interior fruit temperature, an exterior fruit temperature, a red reflectance, an infrared reflectance, mid-infrared reflectance, a near-infrared reflectance, a fruit yield, or any combination thereof.

In some embodiments, the crop yield quantity comprises a volume of the crop, a mass of the crop, a volume of the crop per acre, a mass of the crop per acre. In some embodiments, the volume of the crop is determined as a net volume of the crop, wherein the volume of byproducts, such as for example, roots, twigs, dirt, or insects, are removed. In some embodiments, the mass of the crop is determined as a net mass of the crop, wherein the mass of byproducts, such as for example, roots, twigs, dirt, or insects, are removed. In some embodiments, the volume of the crop is determined as a net volume of the crop, wherein the volume of byproducts, such as for example, roots, twigs, dirt, or insects, are not removed. In some embodiments, the mass of the crop is determined as a net mass of the crop, wherein the mass of byproducts, such as for example, roots, twigs, dirt, or insects, are not removed.

In some embodiments, detailed data on specific cultivars, for example yield, is collected for inputting into the system for training the AI algorithm. In some embodiments, yield comprises: a location and date of harvest(s); unit quantity of cultivar per physical dimension (e.g., 500' row); raw color; fruit or plant size and/or weight; fruit chemistry—(e.g., sugar, pH, acidity); and uniformity and consistency measures—(e.g., color, size).

In some embodiments, global positioning system (GPS) data is collected regarding one or more of the plants in a cultivar growing environment. In some embodiments, the GPS data enables mapping and analysis of the cultivar growing environment. In some embodiments, the GPS data is collected by a GPS device. In some embodiments, in a cultivar growing environments lacking internet service, the GPS data is collected by capturing a photo of the cultivar growing environment and uploading the photo to the internet upon arriving at a location that has internet coverage. In some embodiments, in a cultivar growing environments lacking internet service, the GPS data is collected by capturing a photo of the cultivar growing environment and uploading exchangeable image file format (EXIF) metadata in the photo upon arriving at a location that has internet coverage. In some embodiments, the GPS data is then extracted from an EXIF metadata in the photo. In some embodiments, the EXIF metadata is captured directly without capturing an image.

Crops

In some embodiments, the crop is, by way of non-limiting examples, a food crop, a feed crop, a fiber crop, an oil crop, an ornamental crop, or an industrial crop. In various embodiments, the crop comprises: acao, chilies, coffee, peanuts, rapeseeds, soybeans, sugarcane, tea, maize, corn, rice, wheat, lemons, tangerines, cotton, apples, bananas, grapes, mangos, oranges, peaches, strawberries, watermelons, mangosteens, guavas, nectarines, limes, lint, olives, palm oil, sunflower seed, beans, sweet potatoes, cassavas, potatoes, yams, almonds, chestnut, coconuts, hazelnut, walnuts, asparagus, carrots, cucumbers, lettuce, onions, sugar beets, tomatoes, turnips, chicory, peppers, or any combination thereof.

In some embodiments, the crop comprises a single strain of the crop. In other embodiments, the crop comprises multiple strains of the crop. In some embodiments, the crop comprises a single variety of the crop. In other embodiments, the crop comprises multiple varieties of the crop.

In some embodiments, the crop is a plant. In some embodiments, the plant includes, for example, a herb, a shrub, a tree, a climber, a creeper, an annual, a biennial, a perennial, a bulb, a fruit, a nut, a rice, or soybeans.

In some embodiments, the crop is a nut. In various embodiments, the nut is, for example, an acorn/oak nut, almond, brazil nut, candlenut, cashew, chestnuts, coconut, hazelnut, filbert (species of), kola nut (usually found in an extract), macadamia, peanut, pecan, pili nut, pine nut, pistachio, soynuts, walnut, black walnut, butternut, or a heartnut. in some embodiments, the crop is a seed. in some embodiments, the seed is a caraway seed, chia seed, flax seed, hemp seed, poppy seed, pumpkin seed/pepitas, sesame seed, squash seed, or a sunflower seed.

In some embodiments, the crop is a fruit. In various embodiments, the fruit is, for example, an abiu, açai, acerola, ackee, African cucumber, apple, apricot, avocado, banana, bilberry, blackberry, blackcurrant, black sapote, blueberry, boysenberry, breadfruit, buddha's hand, cactus pear, canistel, cempedak, crab apple, currant, cherry, cherimoya, chico fruit, cloudberry, coco de mer, coconut, cranberry, damson, date, pitaya, durian, egg fruit, elderberry, fig, goji berry, gooseberry, grape, raisin, grapefruit, guava, hala fruit, honeyberry, huckleberry, jabuticaba, jackfruit, jambul, Japanese plum, jostaberry, jujube, juniper berry, kaffir lime, kiwano, kiwifruit, kumquat, lemon, lime, loganberry, loquat, longan, lulo, lychee, magellan barberry, mamey apple, mamey sapote, mango, mangosteen, marionberry, melon, cantaloupe, galia melon, honeydew, mouse melon, watermelon, miracle fruit, mulberry, name, nectarine, orange, blood orange, clementine, mandarine, tangerine, papaya, passionfruit, peach, pear, persimmon, plantain, plum, pineapple, pineberry, plumcot, pomegranate, pomelo, purple mangosteen, quince, raspberry, salmonberry, rambutan, redcurrant, rose apple, salal berry, salak, satsuma, shine muscat, hawthorn berry, soursop, star apple, star fruit, strawberry, Surinam cherry, tamarillo, tamarind, tangelo, tayberry, tomato, ugli fruit, white currant, white sapote, or a yuzu.

In some embodiments, the crop is a vegetable. In various embodiments, the vegetable is, for example, an acorn squash, alfalfa sprout, anise, apple, artichoke, arugula, asparagus, aubergine, azuki beans, banana squash, basil, bean sprout, beetroot, bell pepper, bitter melon, black bean, black-eyed pea, bok choy, borlotti bean, broad bean, broccoflower, broccoli, brussels sprout, butternut squash, cabbage, caraway, carrot, cauliflower, cayenne pepper, celeriac, celery, chamomile, chard, chickpea, garbanzo, or ceci bean, chili pepper, chive, collard green, coriander, corm, courgette, cucumber, cymbopogon, daikon, delicata, diakon, eddoe, endive, fennel, fennel, fiddlehead, frisee, garlic, gem squash, ginger, green bean, green, habanero, herb, horseradish, hubbard squash, jalapeño, Jerusalem artichoke, jicama, kale, kidney bean, kohlrabi, konjac, lavender, leek, legume, lentil, lettuce, lima bean, mangel-wurzel, snap pea, marjoram, marrow, mung bean, mushroom, mustard green, navy bean, nettle, okra, onion, onion, oregano, paprika, parsley, parsnip, peanut, pea, peppers, pinto bean, potato, radicchio, radish, red cabbage, rhubarb, root vegetable, rosemary, runner bean, rutabaga, salsify, savoy cabbage, scallion, shallot, skirret, soy bean, spaghetti squash, spinach, spinach, split pea, squashes, sweet potato, sweetcorn, tabasco pepper, taro, tat soi, thyme, tomato, topinambur, tuber, turnip, wasabi, water chestnut, watercress, or yam.

Light Reflectors

The present disclosure provides a light delivery system that uses a reflective surface and/or a machine to create a moveable or static light field for increasing the efficiency of cultivar (agricultural) growth by optimizing the light conditions thereby adjusting growing conditions in the growing environment. Such light conditions include, for example, light quality (such as spectral quality), light intensity or concentration, or adjusting temperature or humidity conditions, or any combination thereof.

In some embodiments, through direct or machine operated control of the reflector, the systems provided herein monitor, control, and adjust detailed light characteristics and other variables to increase and optimize yield of specific cultivars.

In some embodiments, the light reflector subsystem are manually moved, or driven by electro-mechanical apparatus (e.g., motors, pulleys, etc.) under automated control. Optimally, in one preferred embodiment, the reflection generated by the reflector in the light reflector subsystem would be controlled by electronically changeable polymers (such as liquid crystals or shape-memory polymers), tri-layer sheets, or shape shifting designs.

In some embodiments, the reflector system is configured to receive a reflection modification command to adjust a reflective property of its reflective surface based on inputted data, which include one or more of: time of day, day of year, existing and forecasted light or temperature, Lux levels, etc. Lux can be expressed in other units of light (e.g., PPFD, micro-Einstein's) Lux can refer to a summarized value of total light (such as visible or Infra-Red light) or Lux at a specific wavelength range such as red (640-680 nm).

In some embodiments, the reflector system is configured to receive a reflection modification command to adjust its reflective property at specific times of the day for specific intervals (continuous, pulsed); (e.g., 12:00-1:00 PM, Pulse 80% on 20% off every 15 min); or to adjust reflected Lux levels (i.e., Intensity) of various bands of light to either transmit or block. As an example, in some embodiments, adjusted reflected Lux levels are: blue (430-450 nm), min desired 5,000 Lux, max desired 20,000 Lux; from 8 am to 4 pm; red (640-680 nm), min 20,000 Lux; at any time, and/or green (495-570 nm), max 1,000 Lux, at any time.

Further, in some embodiments, the reflector system is configured to receive a reflection modification command to adjust a reflective property such as: angular width and dimensions of the field of reflected light; and/or physical location of the center of the field of reflected light; (which has the additional advantage of compensating for the placement of the reflector system).

In some embodiments, based on a combination of human judgment and/or algorithm control, the light reflector system adjusts, improves or optimize light for one or more cultivar (e.g., Sumo oranges vs. wine grapes) and be able to change its optical characteristics in response to a range of conditions such as static (e.g., physical location, plant cultivar), predictable dynamic (e.g., sunrise and sunset time), uncontrollable variable dynamic (e.g., weather), controllable or changeable dynamic: (e.g., harvest time, pruning schedules, irrigation schedules, etc.), and day of the year/seasonality for a particular cultivar.

Existing static reflectors must be pointed and angled in a desired direction to ensure as much light collection as possible during the course of the day/growing season. In some embodiments, the system disclosed herein changes its position, shift its shape, or undertake some other modification of a reflective property of a reflective surface in response to input data comprising signals from an algorithm, or optionally, as manually adjusted. In some embodiments, the reflective surface comprises tri-layer sheets with a central layer (hydrogels, liquid-crystal elastomers, and even more conventional polymers are used, like polystyrene) that swells or shrink as the surrounding environment changes. Further still, in some embodiments, the reflector system disclosed herein comprises a reflector having light-induced shape-memory polymers which are configured to fold/unfold into a pre-determined temporary shape and subsequently recover an original shape at ambient temperatures by remote light activation or exposure to ultraviolet light at a different wavelength. Further still, in some embodiments, the reflector system disclosed herein comprise a reflector having an origami style parabola shape which is configured to fold/unfold into a desired shape, guided by slits patterned into the top and bottom layers. Further still, in some embodiments, the reflector system disclosed herein comprise a reflector configured to close in response to adverse conditions such as rain, flood, or excessive wind. Further still, in some embodiments, the reflector system disclosed herein comprise a reflector configured to be flat packed and 'self-assemble' on site. This configuration would provide several potential advantages, for example being amenable to 2-D printing (which is more scalable than 3-D printing), and reduced shipping cost due to denser packaging. In some embodiments, the reflector system comprise one or more 'perpetual motion' sheets that undulate sinusoidally under exposure to UV. Such sheets have been demonstrated and are useful to shake dust off the system or to help with air flow in and around growing plants or cultivars. In some embodiments, systems of the present disclosure are configured to allow for adaptive optical filtering. Such filtering provide heat reduction or spectral customization (biased towards either leaf and stem growth or fruit ripening depending on the season/life stage of the cultivar). In some embodiments, systems of the present disclosure comprise a layer of photovoltaic material for providing power to drive properties laid out above, including recharging of the battery and providing spontaneous power for systems such as the processor, the various electro-mechanical apparatus (e.g., motors, pulleys, etc.) and communication sub-system.

Carbon Sequestration

In some embodiments, systems and methods described herein are configured to calculate an amount of carbon sequestration resulting from a given crop yield. In some embodiments, carbon sequestration as calculated herein, refers to an amount of carbon dioxide absorbed/taken in by a given crop yield (e.g., associated trees, associated plants, etc.). In some embodiments, the calculated carbon sequestration amount is compared with historical values to provide a difference in carbon sequestration based on the cultivar regiment recommendations as implemented through systems described herein.

In some embodiments, calculating the carbon sequestration for a given crop yield is based on any combination of a crop yield (quantitative and/or qualitative) data, cultivar regimen, cultivar condition, and sensor, or other input, as described herein. In some embodiments, crop yield data for calculating carbon sequestration comprises data for crop yield parameters such as a plant size, a leaf diameter, a plant height, a plant mass, a leaf shape, a plant shape, a plant condition, a fruit size, a fruit density, a foliage density, a root biomass, a root depth, a root volume, a root size, a root density, normalized difference vegetation index, a fruit yield, a volume of the crop, a mass of the crop, a volume of the crop per acre, a mass of the crop per acre, or a combination thereof, as described herein. In some embodiments, cultivar regimen for calculating carbon sequestration comprises any cultivar regimen described herein that impacts a crop yield parameter as described herein. In some embodiments, a sensor for calculating carbon sequestration comprises any sensor described herein that impacts a crop yield parameter as described herein. For example, some sensors, or other inputs, comprise GPR radar, laser imaging, a hyperspectral camera, etc.

In some embodiments, calculating the carbon sequestration for a given crop yield is also based on other external devices, such as a light harvester placed with a crop, a trellis placed with a crop, a panel or other device placed with a crop. In some embodiments, data or parameters relating to such external devices are manually provided to the system for incorporation with the carbon sequestration calculation. In some embodiments, data or parameters relating to such external devices comprise size, mass, impact on a crop yield. In some embodiments, such data or parameters for external devices is used to predict an impact on crop yield. For example, historical crop yield may be used to show the impact of additional crop yield by using an external device and associated parameters, and further used to predict the impact of using said external device for another crop.

In some embodiments, the systems and methods described herein are configured to increase and/or optimize the amount of carbon sequestration. In some embodiments, the amount of carbon sequestration for a given crop yield is increased and/or optimized by adjusting cultivar regimens to increase and/or optimize crop yield.

In some embodiments, systems and methods described herein are configured to provide a carbon footprint for a farmer, consumer or other user. In some embodiments, the carbon footprint is based on gas emission (such as $CO_2$) estimated to be generated by actions related to harvesting crop, as described herein. In some embodiments, systems and methods described herein are configured to increase and/or optimize the amount of carbon sequestration so as to achieve carbon neutrality or carbon negativity, wherein the carbon dioxide produced is not greater than the carbon dioxide sequestered (e.g., absorbed by the crop yield as described herein). In some embodiments, farmers, consumers, or other users of systems and methods described herein may be entitled to benefits, such as carbon credits, by showing achieving carbon negativity, wherein the amount of carbon dioxide produced is less than the carbon dioxide sequestered. In some embodiments, systems and methods described herein calculate the carbon footprint based on factors known in the art. In some embodiments, the carbon footprint is based on energy used for harvesting crop, materials used for harvesting crop, other resources used for harvesting crop, etc.

Environmental Mitigation

In some embodiments, systems and methods described herein are configured to optimize environmental mitigation and/or resource consumption. For example, in some embodiments, irrigation quantity is optimized so as avoid excessive water consumption to generate a crop yield. In some embodiments, systems and methods described herein are configured to recommend a cultivar regimens according to sensor data, cultivar conditions (both current and historical), crop yield, and historical cultivar regimen to determine an optimal amount of resource consumption and/or a maximum amount of environmental mitigation. For example, irrigation quantity (water consumption) may be determined via a water flowmeter to harvest a given crop. In some embodiments, environmental mitigation comprises reducing 1) water usage, 2) impact to soil and surrounding geological formations, 3) carbon footprint, 4) irrigation volume, 5) labor costs, 6) fertilizer use, 7) pesticide use, or 8) any combination thereof. In some embodiments, one or more environmental mitigation methods are co-related, such as carbon sequestration and water consumption.

Internet of Things

In some embodiments, the system collects IoT and other data from the field and merges the IoT and other data with additional data such as location, and weather forecasts. Initially, in some embodiments, the system uses manual expert informed intuition to create an expert system. In the short term, this instructs (i.e., program) the reflector how to optimize spectral light levels to create optimal cultivar growth as seen by the management system.

To date, there is limited evidence of the use of satellites using machine learning algorithms to predict weather, analyze crop sustainability and evaluate farms for the presence of diseases and pests. For example, daily weather predictions are customizable based on the needs of each client and range from hyperlocal to global. Data sources include temperature, precipitation, wind speed, and solar radiation, along with comparisons to historic values. Unfortunately, once again, there do not appear to be any case studies supporting the purported benefits or success of these satellite-based machine learning algorithms.

As time progresses over several harvest cycles, and larger amounts of more reliable data becomes available, the algorithm. In some embodiments the reflector characteristics are automatically optimized without the need for human intervention.

Initially, some generalized rules, in their simplest form, will be applied to the algorithm, such as: when it is hot or very bright sunlight, the reflector lowers the overall reflective lux; when it is winter—the reflector adjusts to achieve a higher percentage of red light; or in the evening—the reflector adjusts to decrease the amount of blue light.

As used herein, the term "Internet of Things" or "IoT" refers to the network of physical devices, vehicles, appliances, and other items embedded with electronics, software, sensors, actuators, and connectivity which enables these things to connect and exchange data, creating opportunities for more direct integration of the physical world into computer-based systems, resulting in efficiency improvements, economic benefits, and reduced human exertions. IoT involves extending internet connectivity beyond standard devices, such as desktops, laptops, smartphones and tablets, to any range of traditionally "dumb" or non-internet-enabled physical devices and everyday objects. Embedded with technology, these devices can communicate and interact over the internet, and they can be remotely monitored and controlled. With regard to agriculture, and in particular cultivars, collecting data on such things as temperature, rainfall, relative humidity, wind speed, pest infestation and soil content, to name but a few, will be essential for efficient management of large commercial endeavors. This data can be used to automate farming techniques, take informed decisions to improve quality and quantity, minimize risk and waste, and reduce effort required to manage crops. For example, farmers can now detect which areas have been fertilized (or mistakenly missed), if the land is too dry and predict future yields. In another example, subsurface root growth and propagation can be predicted based on the type of crop, soil conditions, root structure, or any combination thereof. In another example, farmers can obtain identify a calculated amount of carbon sequestration through their optimized crop yield, and optionally compared with a carbon footprint to show net carbon sequestered/released. When incorporated with Artificial Intelligence (AI) or machine learning algorithms the perceived benefits are exponential.

In some embodiments, while some data elements are be manually entered, in preferred embodiments a radio-based or wired Internet of Things (IoT) collection subsystem is used to gather the needed data in real time. This is preferred when employing systems of the present disclosure under circumstances where it would be impractical to collect data by hand, for example due to: physical scope of large agricultural farm, (tens of thousands of acres); vast quantities of data, (MB or GB per day); frequency of data collection, (every 15 minutes in some cases); rate of change in conditions, (such as sudden thunderstorm); hard to collect nature of some elements, (intra-day changes in the width of a vine); remoteness of farms; (long drives to data collection points); vast expense manually collecting the data, (from thousands of points).

In some embodiments, a variety of static data and real time sensor feeds would be deployed to collect data either on demand, or a fixed schedule, such as: Lux levels at various spectral bands (Visible (R-G-B), IR, UV): at the reflector system location; at the cultivar growing environment; physical spacing data of the cultivar; cultivar and reflector physical location and compass orientation; cultivar width and stem and soil moisture levels (dendrometer based reading); actual weather: (absolute and rate of change); temperature, relative humidity, dew point, wind speed and direction, etc.; cloud cover, rainfall; exposure to water and relative humidity; heating and cooling cycles (i.e., daily temperature variations throughout the cultivar environment); changes in the chemical composition of the atmosphere; surrounding electrical fields; pollution; pests; and soil chemistry: (e.g., moisture, pH).

Non-IoT, historical, or input data can comprise: pruning schedule; irrigation schedule; harvest schedule; weather forecasts; and length of day—(e.g., sunrise and sunset times).

In some embodiments, sensors would communicate via the cloud to an AI subsystem either via; (A) direct commercial cellular services; or (B) aggregated first via existing radio technologies such as LoRaWAN, LPWAN, LPN, or Sigfox, (or similar) and then transmitted to the cloud via a smaller number of gateways, as in our present implementation; or (C) via a wired LAN.

Digital Processing Device

Figure 14:
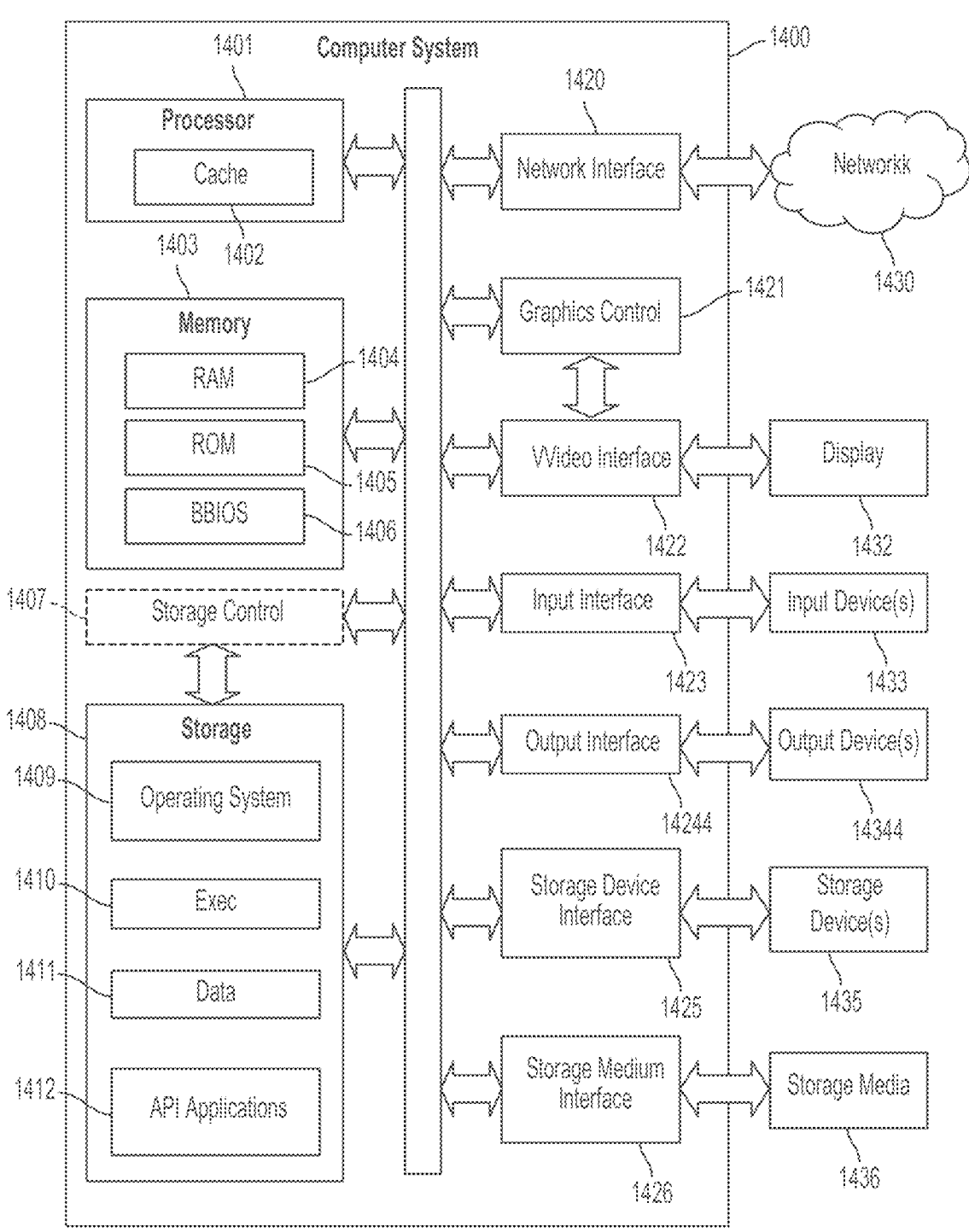
FIG. 14 shows a non-limiting example of a computing device; in this case, a device with one or more processors, memory, storage, and a network interface, per some embodiments herein.

Referring to FIG. 14, a block diagram is shown depicting an exemplary machine that includes a computer system 1400 (e.g., a processing or computing system) within which a set of instructions can execute for causing a device to perform or execute any one or more of the aspects and/or methodologies for static code scheduling of the present disclosure. The components in FIG. 14 are examples only and do not limit the scope of use or functionality of any hardware, software, embedded logic component, or a combination of two or more such components implementing particular embodiments.

Computer system 1400 may include one or more processors 1401, a memory 1403, and a storage 1408 that communicate with each other, and with other components, via a bus 1440. The bus 1440 may also link a display 1432, one or more input devices 1433 (which may, for example, include a keypad, a keyboard, a mouse, a stylus, etc.), one or more output devices 1434, one or more storage devices 1435, and various tangible storage media 1436. All of these elements may interface directly or via one or more interfaces or adaptors to the bus 1440. For instance, the various tangible storage media 1436 can interface with the bus 1440 via storage medium interface 1426. Computer system 1400 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 1400 includes one or more processor(s) 1401 (e.g., central processing units (CPUs) or general-purpose graphics processing units (GPGPUs)) that carry out functions. Processor(s) 1401 optionally contains a cache memory unit 1402 for temporary local storage of instructions, data, or computer addresses. Processor(s) 1401 are configured to assist in execution of computer readable instructions. Computer system 1400 may provide functionality for the components depicted in FIG. 14 as a result of the processor(s) 1401 executing non-transitory, processor-executable instructions embodied in one or more tangible computer-readable storage media, such as memory 1403, storage 1408, storage devices 1435, and/or storage medium 1436. The computer-readable media may store software that implements particular embodiments, and processor(s) 1401 may execute the software. Memory 1403 may read the software from one or more other computer-readable media (such as mass storage device(s) 1435, 1436) or from one or more other sources through a suitable interface, such as network interface 1420. The software may cause processor(s) 1401 to carry out one or more processes or one or more steps of one or more processes described or illustrated herein. Carrying out such processes or steps may include defining data structures stored in memory 1403 and modifying the data structures as directed by the software.

The memory 1403 may include various components (e.g., machine readable media) including, but not limited to, a random access memory component (e.g., RAM 1404) (e.g., static RAM (SRAM), dynamic RAM (DRAM), ferroelectric random access memory (FRAM), phase-change random access memory (PRAM), etc.), a read-only memory component (e.g., ROM 1405), and any combinations thereof. ROM 1405 may act to communicate data and instructions unidirectionally to processor(s) 1401, and RAM 1404 may act to communicate data and instructions bidirectionally with processor(s) 1401. ROM 1405 and RAM 1404 may include any suitable tangible computer-readable media described below. In one example, a basic input/output system 1406 (BIOS), including basic routines that help to transfer information between elements within computer system 1400, such as during start-up, may be stored in the memory 1403.

Fixed storage 1408 is connected bidirectionally to processor(s) 1401, optionally through storage control unit 1407. Fixed storage 1408 provides additional data storage capacity and may also include any suitable tangible computer-readable media described herein. Storage 1408 may be used to store operating system 1409, executable(s) 1410, data 1411, applications 1412 (application programs), and the like. Storage 1408 can also include an optical disk drive, a solid-state memory device (e.g., flash-based systems), or a combination of any of the above. Information in storage 1408 may, in appropriate cases, be incorporated as virtual memory in memory 1403.

In one example, storage device(s) 1435 may be removably interfaced with computer system 1400 (e.g., via an external port connector (not shown)) via a storage device interface 1425. Particularly, storage device(s) 1435 and an associated machine-readable medium may provide non-volatile and/or volatile storage of machine-readable instructions, data structures, program modules, and/or other data for the computer system 1400. In one example, software may reside, completely or partially, within a machine-readable medium on storage device(s) 1435. In another example, software may reside, completely or partially, within processor(s) 1401.

Bus 1440 connects a wide variety of subsystems. Herein, reference to a bus may encompass one or more digital signal lines serving a common function, where appropriate. Bus 1440 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 1400 may also include an input device 1433. In one example, a user of computer system 1400 may enter commands and/or other information into computer system 1400 via input device(s) 1433. Examples of an input device(s) 1433 include, but are not limited to, an alpha-numeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 1433 may be interfaced to bus 1440 via any of a variety of input interfaces 1423 (e.g., input interface 1423) including, but not limited to, serial, parallel, game port, USB, FIREWIRE, THUNDERBOLT, or any combination of the above.

In particular embodiments, when computer system 1400 is connected to network 1430, computer system 1400 may communicate with other devices, specifically mobile devices and enterprise systems, distributed computing systems, edge computing systems, cloud storage systems, cloud computing systems, and the like, connected to network 1430. Communications to and from computer system 1400 may be sent through network interface 1420. For example, network interface 1420 may receive incoming communications (such as requests or responses from other devices) in the form of one or more packets (such as Internet Protocol (IP) packets) from network 1430, and computer system 1400 may store the incoming communications in memory 1403 for processing. Computer system 1400 may similarly store outgoing communications (such as requests or responses to other devices) in the form of one or more packets in memory 1403 and communicated to network 1430 from network interface 1420. Processor(s) 1401 may access these communication packets stored in memory 1403 for processing.

Examples of the network interface 1420 include, but are not limited to, a network interface card, a modem, and any combination thereof. Examples of a network 1430 or network segment 1430 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 1430, may employ a wired and/or a wireless mode of communication. In general, any network topology may be used.

Information and data can be displayed through a display 1432. Examples of a display 1432 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 1432 can interface to the processor(s) 1401, memory 1403, and fixed storage 1408, as well as other devices, such as input device(s) 1433, via the bus 1440. The display 1432 is linked to the bus 1440 via a video interface 1422, and transport of data between the display 1432 and the bus 1440 can be controlled via the graphics control 1421. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 1432, computer system 1400 may include one or more other peripheral output devices 1434 including, but not limited to, an audio speaker, a printer, a storage device, and any combinations thereof. Such peripheral output devices may be connected to the bus 1440 via an output interface 1424. Examples of an output interface 1424 include, but are not limited to, a serial port, a parallel connection, a USB port, a FIREWIRE port, a THUNDERBOLT port, and any combinations thereof.

In addition or as an alternative, computer system 1400 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, cloud computing platforms, server computers and server clusters, desktop computers and computer clusters, laptop computers, notebook computers, and the like.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing.

In some embodiments, the platforms, systems, media, and methods described herein include a digital processing device, or use of the same. In further embodiments, the digital processing device includes one or more hardware central processing units (CPUs) or general-purpose graphics processing units (GPGPUs) that carry out the device's functions. In still further embodiments, the digital processing device further comprises an operating system configured to perform executable instructions. In some embodiments, the digital processing device is optionally connected to a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing-based storage. In further embodiments, the storage and/or memory device is a combination of devices such as those disclosed herein.

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

In a particular embodiment, an exemplary digital processing device is programmed or otherwise configured to collect, collate and process both historical and real-time or near real-time data. The device can regulate various aspects of the reflector system of the present disclosure, such as, for example, the, light reflective properties, including light direction, light intensity, light wavelength range and light concentration. In this embodiment, the digital processing device includes a central processing unit (CPU, also "processor" and "computer processor" herein), which can be a single core or multi core processor, or a plurality of processors for parallel processing. The digital processing device also includes memory or memory location (e.g., random-access memory, read-only memory, flash memory), electronic storage unit (e.g., hard disk), communication interface (e.g., network adapter) for communicating with one or more other systems, and peripheral devices, such as an IoT sub-system comprising a wide range of both IoT and analog sensors, including all of those mentioned previously, digital controls, radio systems, power systems cache, other memory, data storage and/or electronic display adapters. The memory, storage unit, interface and peripheral devices are in communication with the CPU through a communication bus (solid lines), such as a motherboard. The storage unit can be a data storage unit (or data repository) for storing data. The digital processing device can be operatively coupled to a computer network ("network") with the aid of the communication interface. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the device, can implement a peer-to-peer network, which can enable devices coupled to the device to behave as a client or a server.

The CPU can execute a sequence of machine-readable instructions, which can be embodied in a program or software. The program or software instructions can include algorithms and various applications stored in a memory location, such as the memory. Such algorithms and various applications can include artificial intelligence (AI) logic. The instructions can be directed to the CPU, which can subsequently program or otherwise configure the CPU to implement methods of the present disclosure. Examples of operations performed by the CPU can include fetch, decode, execute, and write back. The CPU can be part of a circuit, such as an integrated circuit. One or more other components of the device can be included in the circuit. In some cases, the circuit is an application specific integrated circuit (ASIC) or a field programmable gate array (FPGA).

In some embodiments, the storage unit stores files, such as drivers, libraries and saved programs. The storage unit can store user data, e.g., user preferences and user programs. The digital processing device in some cases can include one or more additional data storage units that are external, such as located on a remote server that is in communication through an intranet or the Internet.

In some embodiments, the digital processing device communicates with one or more remote computer systems through the network. For instance, the device can communicate with a remote computer system of a user. Examples of remote computer systems include personal computers (e.g., portable PC), slate or tablet PCs (e.g., Apple® iPad, Samsung® Galaxy Tab), telephones, Smart phones (e.g., Apple® iPhone, Android-enabled device, Blackberry®), or personal digital assistants.

Methods as described herein can be implemented by way of machine (e.g., computer processor) executable code stored on an electronic storage location of the digital processing device, such as, for example, on the memory or electronic storage unit. The machine executable or machine-readable code can be provided in the form of software. During use, the code can be executed by the processor. In some cases, the code can be retrieved from the storage unit and stored on the memory for ready access by the processor. In some situations, the electronic storage unit can be precluded, and machine-executable instructions are stored on memory.

In a particular embodiment, an application provision system comprises one or more databases accessed by a relational database management system (RDBMS). Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs (such as Java servers, .NET servers, PHP servers, and the like) and one or more web servers (such as Apache, IIS, GWS and the like). The web server(s) optionally expose one or more web services via app application programming interfaces (APIs). Via a network, such as the Internet, the system provides browser-based and/or mobile native user interfaces.

In a particular embodiment, an application provision system alternatively has a distributed, cloud-based architecture and comprises elastically load balanced, auto-scaling web server resources and application server resources as well synchronously replicated databases.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions can be implemented as program modules, such as functions, objects, Application Programming Interfaces (APIs), data structures, and the like, that perform particular tasks or implement particular abstract data types. In light of the disclosure provided herein, those of skill in the art will recognize that a computer program can be written in various versions of various languages.

The functionality of the computer readable instructions can be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft®.NET or Ruby on Rails (RoR). In some embodiments, a web application utilizes one or more database systems including, by way of non-limiting examples, relational, non-relational, object oriented, associative, and XML database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application can be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 15:
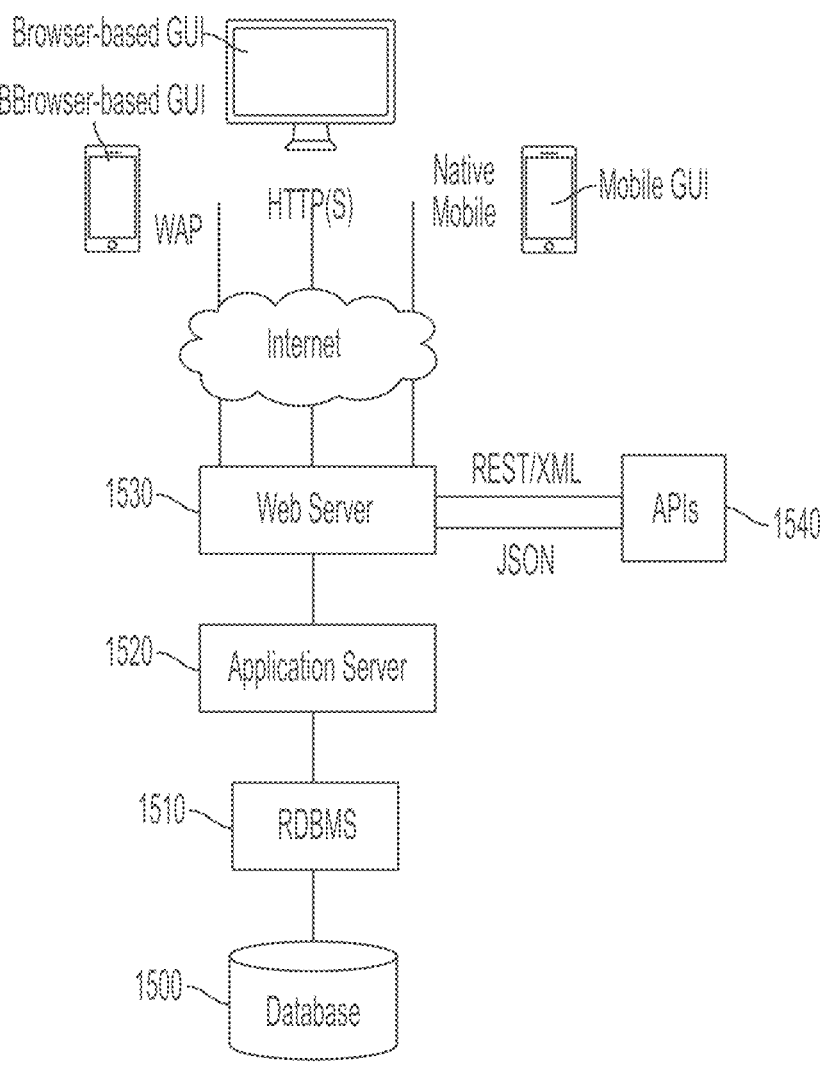
FIG. 15 shows a non-limiting example of a web/mobile application provision system; in this case, a system providing browser-based and/or native mobile user interfaces, per some embodiments herein.

Referring to FIG. 15, in a particular embodiment, an application provision system comprises one or more databases 1500 accessed by a relational database management system (RDBMS) 1510. Suitable RDBMSs include Firebird, MySQL, PostgreSQL, SQLite, Oracle Database, Microsoft SQL Server, IBM DB2, IBM Informix, SAP Sybase, SAP Sybase, Teradata, and the like. In this embodiment, the application provision system further comprises one or more application severs 1520 (such as Java servers, .NET servers, PHP servers, and the like) and one or more web servers 1530 (such as Apache, IIS, GWS and the like). The web server(s) optionally expose one or more web services via app application programming interfaces (APIs) 1540. Via a network, such as the Internet, the system provides browser-based and/or mobile native user interfaces.

Figure 16:
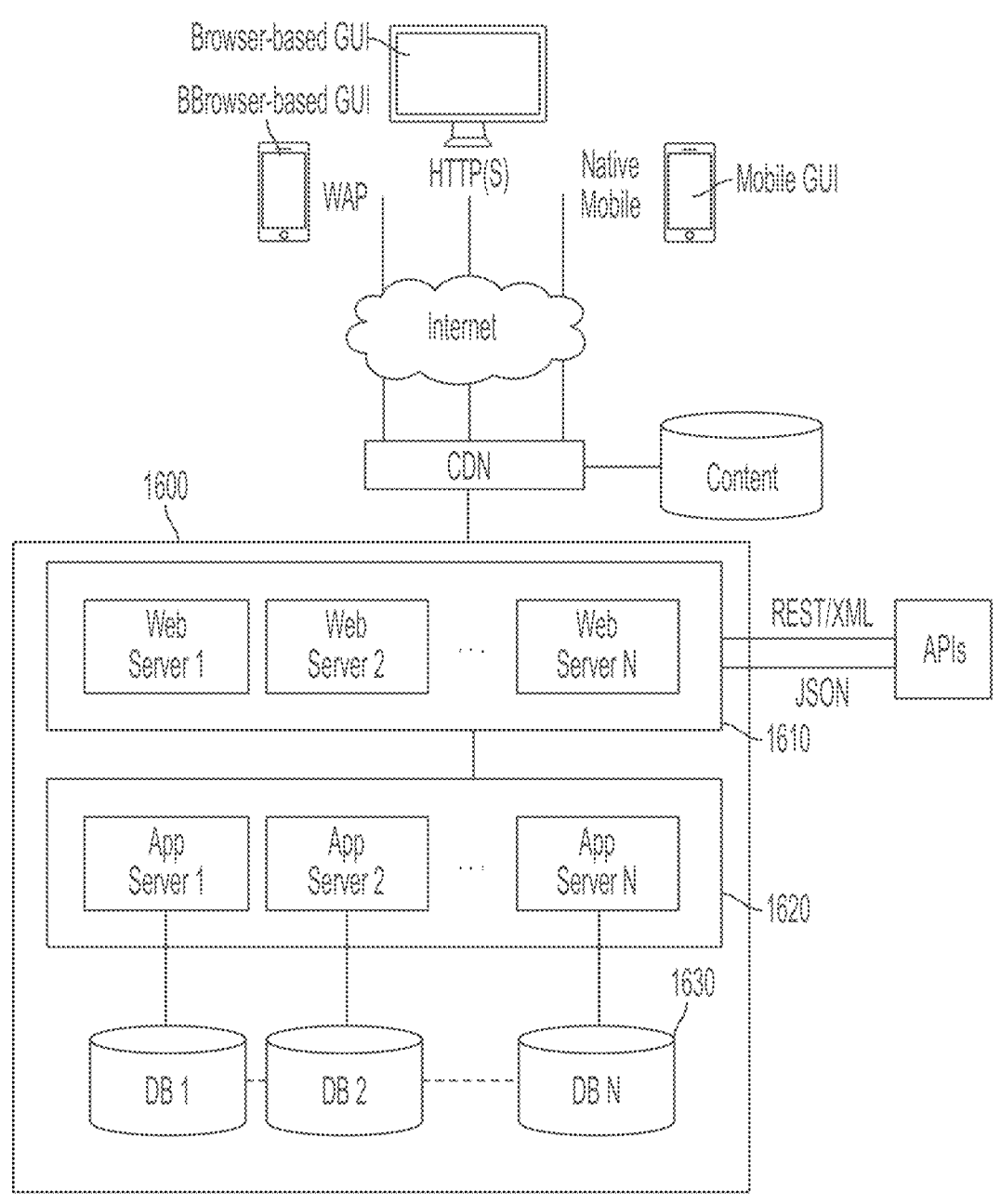
FIG. 16 shows a non-limiting example of a cloud-based web/mobile application provision system; in this case, a system comprising an elastically load balanced, auto-scaling web server and application server resources as well synchronously replicated databases, per some embodiments herein.

Referring to FIG. 16, in a particular embodiment, an application provision system alternatively has a distributed, cloud-based architecture 1600 and comprises elastically load balanced, auto-scaling web server resources 1610 and application server resources 1620 as well synchronously replicated databases 1630.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB.NET, or combinations thereof. Compilation is often performed, at least in part, to create an executable program. In some embodiments, a computer program includes one or more executable compiled applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of sensed data corresponding to at least one of a cultivar parameter and a growth condition. In various embodiments, suitable databases include, by way of non-limiting examples, relational databases, non-relational databases, object-oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Terms and Definitions

Unless otherwise defined, all technical terms used herein have the same meaning as commonly understood by one of ordinary skill in the art to which the present subject matter belongs.

As used herein, the singular forms "a," "an," and "the" include plural references unless the context clearly dictates otherwise. Any reference to "or" herein is intended to encompass "and/or" unless otherwise stated.

As used herein, the term "about" refers to an amount that is near the stated amount by about 10%, 5%, or 1%, including increments therein.

As used herein, the term "cultivar" refers to a plant variety that has been produced in cultivation by selective breeding. More generally, cultivar refers to the most basic classification category of cultivated plants in the International Code of Nomenclature for Cultivated Plants (ICNCP). Most cultivars arose in cultivation, but a few are special selections from the wild.

As used herein, the term "Lux level" or "Lux" refers to the SI derived unit (International System of Units—based on the meter, kilogram, second, ampere, kelvin, candela, and mole) of illuminance and luminous emittance, measuring luminous flux per unit area. It is equal to one lumen per square meter.

In photometry, this is used as a sense and/or measure of the intensity, as perceived by the human eye, of light that hits or passes through a surface.

As used herein, the term "light spectrum" or "spectrum" refers to the visible spectrum, the range of wavelengths of electromagnetic radiation which our eyes are sensitive to. Alternatively, it can mean a plot (or chart or graph) of the intensity of light vs its wavelength (or, sometimes, its frequency).

As used herein, the term "Artificial Intelligence", "(AI)" or "machine intelligence" refers to a branch of computer science that aims to create intelligent machines. It has become an essential part of the technology research associated with artificial intelligence is highly technical and specialized. The core problems of artificial intelligence include programming computers for certain traits such as: knowledge, reasoning, problem solving, perception, learning, planning and the ability to manipulate and move objects. Knowledge engineering is a core part of AI research. Machines can often act and react like humans only if they have abundant information relating to the world. Artificial intelligence must have access to objects, categories, properties and relations between all of them to implement knowledge engineering. Initiating common sense, reasoning and problem-solving power in machines is a difficult and tedious task. Machine learning is also a core part of AI. Learning without any kind of supervision requires an ability to identify patterns in streams of inputs, whereas learning with adequate supervision involves classification and numerical regressions. Classification determines the category an object belongs to and regression deals with obtaining a set of numerical input or output examples, thereby discovering functions enabling the generation of suitable outputs from respective inputs. Mathematical analysis of machine learning algorithms and their performance is a well-defined branch of theoretical computer science often referred to as computational learning theory. Machine perception deals with the capability to use sensory inputs to deduce the different aspects of the world, while computer vision is the power to analyze visual inputs with a few sub-problems such as facial, object and gesture recognition.

EXAMPLES

The following illustrative examples are representative of embodiments of the platforms, software applications, systems, media, and methods described herein and are not meant to be limiting in any way.

Example 1—Cultivar Regimen Recommendation Determination

In one embodiment the application herein receives a plurality of current cultivar conditions comprising a temperature in the atmosphere surrounding a row of grape plants (as measured by a thermometer), and a soil moisture content for each of the plants in the row of grape plants (as measured by a soil moisture sensor). Based on the atmosphere surrounding a row of grape plants, and the soil moisture content for each of the plants in the row of grape plants, a first machine learning algorithm determines cultivar regimen recommendation that 5 liters of water should be added to the soil of each plant every 3 hours, and that fertilizer type X should be added to each grape plant as soon as possible. Once the cultivar regimen recommendation is performed, the application receives a verified crop yield for each of the grape plants in the row of grape plants, and feeds back the verified crop yield to improve the first machine learning algorithm's calculation over time. The application then transmits the cultivar regimen recommendation to a user.

The application then receives a plurality of historical cultivar regimens, each regimen from the harvest of one year and comprising the cultivar instructions employed for each year's harvest and its historical categorical crop yield. The application then applies a second machine learning algorithm to each cultivar instruction in the historical regimen category of the cultivar instruction to determine an agricultural relationship that grape plant variety A has a higher yield when it receives more light, and that grape plant variety B has a lower yield when it receives more light based on verified categorical crop yields. The application then appends the verified categorical crop yield to the historical categorical crop yield and appends the associated cultivar instructions to the historical regimen category to improve the second machine learning algorithm's calculation over time and improve the accuracy and precision of the first machine learning algorithm determines the cultivar regimen recommendation based on the agricultural relationship.

Example 2—Time Series Sensor Data

Provided herein, per Table 1, is an example of a time-series sensor table showing sensor measurements collected at certain times or over certain periods. In the example shown below, the location comprises a specific orchard. In some embodiments, the location comprises a farm, a field, an orchard, a row, a tree, or any combination thereof. In the example shown below, a planting event occurred on Jun. 1, 2020 at 9:15, wherein a BBCH-scale is recorded as a first measurement which identifies the phenological development stage of the planting of the "Good One" seed. Further, per below, Auto Measure 1 event occurs every 15 minutes, wherein temperature, illumination (vis LUX), and humidity (rH) are measured by sensor 1 having a node ID of 324. As show, on Jun. 1, 2020 at 15:00, the temperature, illumination (vis LUX), and humidity (rH) are measured as 25.1° C., 2000, and 40%, respectively. Simultaneously, Auto Measure 2 event occurs every 4 weeks, wherein a health score and a volume are measured by sensor 2 associated with Tree ID L49ZDMy. As show, on Jun. 28, 2020 at 16:00, the health score and volume measured as 3 and 12.8, respectively. Finally, as shown, a capture yield data event, recorded as event number 47178, was performed on Apr. 2, 2021 at 19:00, wherein 818 boxes of size 3 and 120 boxes of size 4 were produced and run through sort machine 7, and wherein the yield product had a pH of 3.7 and a Brix measurement, quantifying an amount of dissolved solids and/or sugar content, was 18.

TABLE 1

| Event | 1 |
| --- | --- |
| Date | Jun. 1, 2020 09:15 |
| Location | Orchard 3 |
| Event Name | Planting |
| Name of Seed | Good One |
| BBCH scale | 0 Dormant |
| Data Source | Manual |
| Continuous | Every 15 min |
| Date | Jun. 1, 2020 15:00 |
| Location | Orchard 3 |
| Event Name | Auto Measure 1 |
| Temp ° C. | 25.1 |
| Vis LUX | 2000 |
| RH | 40% |

TABLE 1-continued

| Event | 1 |
|---|---|
| Node ID | 324 |
| Data Source | Sensor 1 |
| Continuous | Every 4 weeks |
| Date | Jun. 28, 2020 16:00 |
| Location | Orchard 3 |
| Event Name | Auto Measure 2 |
| Tree ID | L49ZDMy |
| Health Score | 3 |
| Volume | 12.8 |
| Tree ID | L49ZDMy |
| Data Source | Sensor 2 |
| Event | 47178 |
| Date | Apr. 2, 2021 19:00 |
| Location | Orchard 3 |
| Event Name | Capture Yield Data |
| Boxes Size 3 | 818 |
| Boxes Size 4 | 120 |
| Ph | 3.7 |
| Brix | 18 |
| Sort Machine | 7 |

Example 3—Sensor Matrix

Provided per Table 2 herein is an exemplary sensor matrix, wherein each sensed data is recorded over one or more periods. In one example, the major event input comprises a phenological event, a weather event, an irrigation event, a pruning event, a planting event, a pest control event, or any combination thereof. In various embodiments, the phenological event comprises a stage number/description, a wine variety, a citrus variety, or any combination thereof. In some embodiments, the weather event comprises a temperature, a humidity, a precipitation, or any combination thereof. In a particular embodiment, the pruning event comprises pruning manpower. In various embodiments, the planting event comprises a seed type, a seed quantity, a seeding man-hours, or any combination thereof. In various embodiments, the pest control comprises a pesticide type, a pesticide quantity, an infestation type, or any combination thereof.

In some embodiments, the minor event input comprises a direct labor event, a harvest effort event, a crop loss event, a fertilization event, a soil event, a nutrition event, or any combination thereof. In some embodiments, the direct labor event comprises a number of hours, a number of workers, a job description, an hourly wave, a management expenditure, a supervision expenditure, or any combination thereof. In some embodiments, the harvest effort event comprises a man-power, a number of days worked, or both. In some embodiments, the crop loss event comprises an amount of loss, a reason for loss, or both. In some embodiments, the fertilization event comprises a type of fertilizer, a quantity of fertilizer, or both. In some embodiments, the soil data event comprises a chemistry (e.g., pH, nitrogen content), a moisture level, a nutrient, or any combination thereof. In some embodiments, the nutrition event comprises a micro/macro nutrition, a growth stimulant, or both.

TABLE 2

| | | | Period | | | | | |
|---|---|---|---|---|---|---|---|---|
| | | | 1 | 2 | 3 | 4 | 5 | 6 |
| Input Events | | | | | | | | |
| Labor Consumed | Ongoing | Minor | x | | x | | x | |
| Fertilizing | Once | Minor | x | | | | | |
| Planting | Once | Minor | | x | | | | |
| Pesticides | Ongoing | Major | x | x | x | x | x | x |
| Irrigation | Ongoing | Major | x | x | x | x | x | x |
| Crop Loss Data | Ongoing | Minor | x | | x | | x | |
| Pruning Effort | Ongoing | Major | x | x | x | x | x | x |
| Harvest Effort | Once | Minor | | | | | x | |
| Yield Data | Once | Major | | | | | | x |
| Yield Predictions | | | | | | | | |
| Yield Metrics | Ongoing | | x | | x | | x | |
| Value Per Acre | Once | | | | | | | x |
| Desired Size/Futures | Once | | | | | | | x |

While certain embodiments of the present subject matter have been shown and described herein, it will be obvious to those skilled in the art that such embodiments are provided by way of example only. Numerous variations, changes, and substitutions will now occur to those skilled in the art without departing from the subject matter disclosed herein. It should be understood that various alternatives to the embodiments of the subject matter described herein can be employed.

What is claimed is:

1. A computer-implemented method of training a neural network for determining a cultivar regimen recommendation, the method comprising:

a) collecting from a database a plurality of historical growing conditions, wherein each historical growing condition comprises a historical cultivar condition and a historical cultivar regimen, and wherein the historical growing condition is associated with a historical crop yield;

b) creating a first training set comprising:

i) a first plurality the collected historical growing conditions wherein each historical growing condition is associated with the historical crop yield; and ii) a second plurality the collected historical growing conditions wherein each historical growing condition is disassociated from the historical crop yield;

c) training the neural network in a first stage using the first training set to determine a predicted crop yield;

d) creating a second training set for a second stage of training comprising the first training set and one or more of the second plurality of the collected historical growing conditions wherein a difference between the determined crop yield and the predicted crop yield is greater than a set amount; and e) training the neural network in a second stage using the second training set;

wherein the cultivar regimen recommendation, the historical cultivar regimen, or both comprise a fertilizer quantity adjustment, a fertilizer adjustment, a pruning quantity adjustment, a pruning location adjustment, a pesticide quantity adjustment, a pesticide adjustment, a planting date adjustment, a harvesting date adjustment, an irrigation quantity adjustment, an irrigation time of day adjustment, an irrigation schedule adjustment, a crop adjustment, or any combination thereof; and wherein the historical growing condition comprises a wind speed, a wind direction, a gust speed, a gust direction, a rainfall quantity, a soil moisture, a light measurement, a humidity, a crop dimension, a soil pH, subsurface plant and/or tree root growth and propagation, above surface plant and/or tree growth and propagation, soil textural properties, soil temperature, soil ion concentration, soil pore fluid composition, a gamma-ray measurement, a picture, an audio track, a video, aerial imagery, satellite imagery, a chemical composition, an atmospheric pressure, an $O_2$ quantity, a $N_2$ quantity, a $CO_2$ quantity, a sporadic light measurement, a fruit growth measurement, a reflectance, an infrared measurement, a mid-infrared measurement, near-infrared measurement, a fruit density, a GPS position, a temperature, or any combination thereof.

2. A computer-implemented system comprising: a digital processing device comprising: at least one processor, an operating system configured to perform executable instructions, a memory, and a computer program including instructions executable by the digital processing device to create an application to train a neural network to determine a cultivar regimen recommendation, the application configured to perform at least the following:

a) collecting from a database a plurality of historical growing conditions, wherein each historical growing condition comprises a historical cultivar condition and a historical cultivar regimen, and wherein the historical growing condition is associated with a historical crop yield;

b) creating a first training set comprising:

i) a first plurality the collected historical growing conditions wherein each historical growing condition is associated with the historical crop yield; and ii) a second plurality the collected historical growing conditions wherein each historical growing condition is disassociated from the historical crop yield;

c) training the neural network in a first stage using the first training set to determine a predicted crop yield;

d) creating a second training set for a second stage of training comprising the first training set and one or more of the second plurality of the collected historical growing conditions wherein a difference between the determined crop yield and the predicted crop yield is greater than a set amount; and e) training the neural network in a second stage using the second training set;

wherein the cultivar regimen recommendation, the historical cultivar regimen, or both comprise a fertilizer quantity adjustment, a fertilizer adjustment, a pruning quantity adjustment, a pruning location adjustment, a pesticide quantity adjustment, a pesticide adjustment, a planting date adjustment, a harvesting date adjustment, an irrigation quantity adjustment, an irrigation time of day adjustment, an irrigation schedule adjustment, a crop adjustment, or any combination thereof; and wherein the historical growing condition comprises a wind speed, a wind direction, a gust speed, a gust direction, a rainfall quantity, a soil moisture, a light measurement, a humidity, a crop dimension, a soil pH, subsurface plant and/or tree root growth and propagation, above surface plant and/or tree growth and propagation, soil textural properties, soil temperature, soil ion concentration, soil pore fluid composition, a gamma-ray measurement, a picture, an audio track, a video, aerial imagery, satellite imagery, a chemical composition, an atmospheric pressure, an $O_2$ quantity, a $N_2$ quantity, a $CO_2$ quantity, a sporadic light measurement, a fruit growth measurement, a reflectance, an infrared measurement, a mid-infrared measurement, near-infrared measurement, a fruit density, a GPS position, a temperature, or any combination thereof.

3. A non-transitory computer-readable storage media encoded with a computer program including instructions executable by a processor to create an application to train a neural network to determine a cultivar regimen recommendation, the application configured to perform at least the following:

a) collecting from a database a plurality of historical growing conditions, wherein each historical growing condition comprises a historical cultivar condition and a historical cultivar regimen, and wherein the historical growing condition is associated with a historical crop yield;

b) creating a first training set comprising:

i) a first plurality the collected historical growing conditions wherein each historical growing condition is associated with the historical crop yield; and ii) a second plurality the collected historical growing conditions wherein each historical growing condition is disassociated from the historical crop yield;

c) training the neural network in a first stage using the first training set to determine a predicted crop yield;

d) creating a second training set for a second stage of training comprising the first training set and one or more of the second plurality of the collected historical growing conditions wherein a difference between the determined crop yield and the predicted crop yield is greater than a set amount; and e) training the neural network in a second stage using the second training set;

wherein the cultivar regimen recommendation, the historical cultivar regimen, or both comprise a fertilizer quantity adjustment, a fertilizer adjustment, a pruning quantity adjustment, a pruning location adjustment, a pesticide quantity adjustment, a pesticide adjustment, a planting date adjustment, a harvesting date adjustment, an irrigation quantity adjustment, an irrigation time of day adjustment, an irrigation schedule adjustment, a crop adjustment, or any combination thereof; and wherein the historical growing condition comprises a wind speed, a wind direction, a gust speed, a gust direction, a rainfall quantity, a soil moisture, a light measurement, a humidity, a crop dimension, a soil pH, subsurface plant and/or tree root growth and propagation, above surface plant and/or tree growth and propagation, soil textural properties, soil temperature, soil ion concentration, soil pore fluid composition, a gamma-ray measurement, a picture, an audio track, a video, aerial imagery, satellite imagery, a chemical composition, an atmospheric pressure, an $O_2$ quantity, a $N_2$ quantity, a $CO_2$ quantity, a sporadic light measurement, a fruit growth measurement, a reflectance, an infrared measurement, a mid-infrared measurement, near-infrared measurement, a fruit density, a GPS position, a temperature, or any combination thereof.

* * * * *